(12) United States Patent
Smits et al.

(10) Patent No.: US 12,025,807 B2
(45) Date of Patent: *Jul. 2, 2024

(54) SYSTEM AND METHOD FOR 3-D PROJECTION AND ENHANCEMENTS FOR INTERACTIVITY

(71) Applicants: Gerard Dirk Smits, Los Gatos, CA (US); Dan Kikinis, Saratoga, CA (US)

(72) Inventors: Gerard Dirk Smits, Los Gatos, CA (US); Dan Kikinis, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,278

(22) Filed: Apr. 13, 2018

(65) Prior Publication Data

US 2019/0278091 A1    Sep. 12, 2019

Related U.S. Application Data

(63) Continuation of application No. 13/877,652, filed as application No. PCT/US2011/054751 on Oct. 4,
(Continued)

(51) Int. Cl.
*G02B 27/01* (2006.01)
*G03B 35/18* (2006.01)
(Continued)

(52) U.S. Cl.
CPC ......... *G02B 27/0176* (2013.01); *G03B 35/18* (2013.01); *H04N 13/302* (2018.05); *H04N 13/356* (2018.05); *H04N 13/363* (2018.05)

(58) Field of Classification Search
CPC ............ G02B 27/0176; H04N 13/302; H04N 13/356; H04N 13/363; G03B 35/18
See application file for complete search history.

(56) References Cited

U.S. PATENT DOCUMENTS

| | | | |
|---|---|---|---|
| 4,019,262 A | 4/1977 | Breglia et al. | |
| 4,340,274 A | 7/1982 | Spooner | |

(Continued)

FOREIGN PATENT DOCUMENTS

| | | | |
|---|---|---|---|
| CN | 1633801 A | 6/2005 | |
| CN | 1902530 A | 1/2007 | |

(Continued)

OTHER PUBLICATIONS

Office Communication for U.S. Appl. No. 15/444,182 dated Sep. 13, 2018, pp. 1-11.

(Continued)

*Primary Examiner* — Wing H Chow
(74) *Attorney, Agent, or Firm* — John W. Branch; Branch Partners PLLC

(57) ABSTRACT

A system projects a user-viewable, computer-generated or -fed image, wherein a head-mounted projector is used to project an image onto a retro-reflective surface, so only the viewer can see the image. The projector is connected to a computer that contains software to create virtual 2-D and or 3-D images for viewing by the user. Further, one projector each is mounted on either side of the user's head, and, by choosing for example a retro angle of less than about 10 degrees, each eye can only see the image of one of the projectors at a given distance up to 3 meters, in this example, from the retro-reflective screen. The retro angle used may be reduced with larger viewing distance desired. These projectors use lasers to avoid the need for focusing, and in some cases these projectors use instead of lasers highly collimated LED light sources to avoid the need for focusing.

5 Claims, 66 Drawing Sheets

Related U.S. Application Data 2011, now Pat. No. 9,946,076, which is a continuation of application No. 13/252,126, filed on Oct. 3, 2011, now abandoned.

(60) Provisional application No. 61/516,242, filed on Mar. 30, 2011, provisional application No. 61/404,538, filed on Oct. 4, 2010.

(51) Int. Cl.
  *H04N 13/302* (2018.01)
  *H04N 13/356* (2018.01)
  *H04N 13/363* (2018.01)

(56) References Cited

U.S. PATENT DOCUMENTS

| | | | |
|---|---|---|---|
| 4,820,041 A | 4/1989 | Davidson et al. | |
| 4,988,187 A | 1/1991 | Kuriyama | |
| 5,052,820 A | 10/1991 | McGinmss et al. | |
| 5,107,122 A | 4/1992 | Barkan et al. | |
| 5,115,230 A | 5/1992 | Smoot | |
| 5,218,427 A | 6/1993 | Koch | |
| 5,245,398 A | 9/1993 | Ludden | |
| 5,455,568 A | 10/1995 | Lew et al. | |
| 5,506,682 A | 4/1996 | Pryor | |
| 5,521,722 A | 5/1996 | Colvin et al. | |
| 5,559,322 A | 9/1996 | Jacoby et al. | |
| 5,572,251 A | 11/1996 | Ogawa | |
| 5,580,140 A | 12/1996 | Katz et al. | |
| 5,661,506 A | 8/1997 | Lazzouni et al. | |
| 5,793,491 A | 8/1998 | Wangier et al. | |
| 5,812,664 A | 9/1998 | Bernobich et al. | |
| 5,914,783 A | 6/1999 | Barrus | |
| 5,930,378 A | 7/1999 | Kubota et al. | |
| 6,009,374 A | 12/1999 | Urahashi | |
| 6,101,038 A * | 8/2000 | Hebert | H04B 10/1143 345/59 |
| 6,115,022 A | 9/2000 | Mayer, III et al. | |
| 6,130,706 A | 10/2000 | Hart, Jr. et al. | |
| 6,195,446 B1 | 2/2001 | Skoog | |
| 6,307,526 B1 | 10/2001 | Mann | |
| 6,404,416 B1 | 6/2002 | Kahn et al. | |
| 6,535,182 B2 | 3/2003 | Stanton | |
| 6,535,275 B2 | 3/2003 | McCaffrey et al. | |
| 6,543,899 B2 | 4/2003 | Covannon et al. | |
| 6,545,670 B1 | 4/2003 | Pryor | |
| 6,670,603 B2 | 12/2003 | Shimada et al. | |
| 6,692,994 B2 | 2/2004 | Davis et al. | |
| 6,704,000 B2 | 3/2004 | Carpenter | |
| 6,710,767 B1 | 3/2004 | Hasegawa et al. | |
| 6,766,066 B2 | 7/2004 | Kitazawa | |
| 6,843,564 B2 | 1/2005 | Putilin et al. | |
| 6,843,568 B2 | 1/2005 | Schenk et al. | |
| 6,894,823 B2 | 5/2005 | Taylor et al. | |
| 6,982,683 B2 | 1/2006 | Stanton | |
| 7,006,142 B2 | 2/2006 | Seo | |
| 7,023,536 B2 | 4/2006 | Zhang et al. | |
| 7,027,222 B2 | 4/2006 | Takahashi et al. | |
| 7,116,455 B2 | 10/2006 | Yamoaka | |
| 7,119,965 B1 | 10/2006 | Rolland et al. | |
| 7,144,117 B2 | 12/2006 | Kojima | |
| 7,182,465 B2 | 2/2007 | Fuchs et al. | |
| 7,203,383 B2 | 4/2007 | Fisher | |
| 7,232,229 B2 | 6/2007 | Peeters et al. | |
| 7,262,765 B2 | 8/2007 | Brown et al. | |
| 7,278,745 B2 | 10/2007 | Engle | |
| 7,280,211 B2 | 10/2007 | Horibe et al. | |
| 7,283,301 B2 | 10/2007 | Peeters et al. | |
| 7,289,110 B2 | 10/2007 | Hansson | |
| 7,303,289 B2 | 12/2007 | Fujiwara | |
| 7,348,528 B2 | 3/2008 | Marshall | |
| 7,349,553 B2 | 3/2008 | Rodriguez | |
| 7,359,041 B2 | 4/2008 | Xie et al. | |
| 7,375,804 B2 | 5/2008 | Liebman et al. | |
| 7,377,656 B2 | 5/2008 | Nojima et al. | |
| 7,401,920 B1 * | 7/2008 | Kranz | A61B 3/113 351/209 |
| 7,440,691 B2 | 10/2008 | Beniyama et al. | |
| 7,511,847 B2 | 3/2009 | Siiverbrook et al. | |
| 7,554,652 B1 | 7/2009 | Babin et al. | |
| 7,667,598 B2 | 2/2010 | Yenisch et al. | |
| 7,787,134 B2 | 8/2010 | Kohnen et al. | |
| 7,905,567 B2 | 3/2011 | Orsley | |
| 7,911,444 B2 | 3/2011 | Yee | |
| 8,115,728 B2 | 2/2012 | Feng | |
| 8,123,928 B2 | 2/2012 | Cayouette et al. | |
| 8,169,447 B2 | 5/2012 | Bhogal et al. | |
| 8,170,329 B2 | 5/2012 | Seko et al. | |
| 8,189,176 B2 | 5/2012 | Moir | |
| 8,213,022 B1 | 7/2012 | Riza et al. | |
| 8,259,239 B2 | 9/2012 | Hua | |
| 8,282,222 B2 | 10/2012 | Smits | |
| 8,297,758 B2 | 10/2012 | Choi et al. | |
| 8,330,942 B2 | 12/2012 | Nordenfelt et al. | |
| 8,355,117 B2 | 1/2013 | Niclass | |
| 8,430,512 B2 | 4/2013 | Smits | |
| 8,493,573 B2 | 7/2013 | Chinn et al. | |
| 8,558,810 B2 | 10/2013 | Guo | |
| 8,573,783 B2 | 11/2013 | Smits | |
| 8,636,367 B1 | 1/2014 | Callison et al. | |
| 8,665,435 B2 | 3/2014 | Hidaka | |
| 8,696,141 B2 | 4/2014 | Smits | |
| 8,711,370 B1 | 4/2014 | Smits | |
| 8,718,326 B2 | 5/2014 | Yoon et al. | |
| 8,773,512 B1 | 7/2014 | Rafii | |
| 8,780,161 B2 | 7/2014 | Samadani et al. | |
| 8,797,531 B2 | 8/2014 | Knox et al. | |
| 8,867,827 B2 | 10/2014 | Yeatman, Jr. et al. | |
| 8,941,817 B2 | 1/2015 | Laudrain | |
| 8,947,755 B2 | 2/2015 | Konuma et al. | |
| 8,953,242 B2 | 2/2015 | Larson et al. | |
| 8,957,847 B1 | 2/2015 | Karakotsios et al. | |
| 8,994,780 B2 | 3/2015 | Moore | |
| 9,026,596 B2 | 5/2015 | Perez et al. | |
| 9,045,226 B2 | 6/2015 | Piasecki et al. | |
| 9,080,866 B1 | 7/2015 | Dowdall et al. | |
| 9,097,800 B1 | 8/2015 | Zhu | |
| 9,131,192 B2 | 9/2015 | Ubillos et al. | |
| 9,134,799 B2 | 9/2015 | Mark | |
| 9,151,607 B2 | 10/2015 | Davies et al. | |
| 9,244,339 B2 | 1/2016 | Wang | |
| 9,323,055 B2 | 4/2016 | Baillot | |
| 9,366,519 B2 | 6/2016 | Danbury et al. | |
| 9,377,533 B2 | 6/2016 | Smits | |
| 9,392,225 B2 | 7/2016 | Eisenberg | |
| 9,454,014 B2 | 9/2016 | Kurashige et al. | |
| 9,562,764 B2 | 2/2017 | France | |
| 9,581,883 B2 | 2/2017 | Smits | |
| 9,599,713 B2 | 3/2017 | Giger et al. | |
| 9,618,610 B2 | 4/2017 | Kao et al. | |
| 9,703,473 B2 | 7/2017 | Schillings et al. | |
| 9,813,673 B2 | 11/2017 | Smits | |
| 9,842,514 B2 | 12/2017 | Hoelzer et al. | |
| 9,854,196 B2 | 12/2017 | Liu et al. | |
| 9,864,440 B2 | 1/2018 | Geller et al. | |
| 9,939,233 B2 | 4/2018 | Scott et al. | |
| 9,946,076 B2 * | 4/2018 | Smits | G02B 30/26 |
| 9,952,033 B2 | 4/2018 | Martini et al. | |
| 9,961,337 B2 | 5/2018 | Stroetmann | |
| 10,037,017 B2 | 7/2018 | Wooldridge et al. | |
| 10,052,927 B2 | 8/2018 | Maise et al. | |
| 10,067,230 B2 | 9/2018 | Smits | |
| 10,261,183 B2 | 4/2019 | Smits | |
| 10,331,021 B2 | 6/2019 | Smits | |
| 10,564,284 B2 | 2/2020 | Smits | |
| 10,614,734 B2 | 4/2020 | Peuhkurinen et al. | |
| 10,962,867 B2 | 3/2021 | Smits | |
| 2001/0043165 A1 | 11/2001 | Stanton | |
| 2002/0011987 A1 | 1/2002 | Kitazawa | |
| 2002/0036765 A1 | 3/2002 | McCaffrey et al. | |
| 2002/0039138 A1 | 4/2002 | Edelson et al. | |
| 2002/0040971 A1 | 4/2002 | Ono | |
| 2002/0067466 A1 | 6/2002 | Covannon et al. | |

(56) References Cited

U.S. PATENT DOCUMENTS

| | | |
|---|---|---|
| 2002/0089489 A1 | 7/2002 | Carpenter |
| 2002/0100884 A1 | 8/2002 | Maddock |
| 2002/0139920 A1 | 10/2002 | Seibel et al. |
| 2002/0145588 A1 | 10/2002 | McCahon et al. |
| 2002/0149694 A1 | 10/2002 | Seo |
| 2003/0010888 A1 | 1/2003 | Shirnada et al. |
| 2003/0045034 A1 | 3/2003 | Davis et al. |
| 2003/0156260 A1 | 6/2003 | Pugin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222649 A1 | 12/2003 | Starkweather |
| 2004/0003409 A1 | 1/2004 | Berstis |
| 2004/0006424 A1 | 1/2004 | Joyce et al. |
| 2004/0041996 A1 | 3/2004 | Abe |
| 2004/0054359 A1 | 3/2004 | Ruiz et al. |
| 2004/0100508 A1 | 5/2004 | Hansson |
| 2004/0114834 A1 | 6/2004 | Fisher |
| 2004/0179254 A1 | 9/2004 | Lewis et al. |
| 2004/0218155 A1 | 11/2004 | Schenk et al. |
| 2004/0240754 A1 | 12/2004 | Smith et al. |
| 2004/0263874 A1 | 12/2004 | Silverbrook et al. |
| 2005/0024586 A1 | 2/2005 | Teiwes et al. |
| 2005/0030305 A1 | 2/2005 | Brown et al. |
| 2005/0035943 A1 | 2/2005 | Kojirna |
| 2005/0052635 A1 | 3/2005 | Xie et al. |
| 2005/0083248 A1 | 4/2005 | Blocca et al. |
| 2005/0099664 A1 | 5/2005 | Yamaoka |
| 2005/0159893 A1 | 7/2005 | Isaji et al. |
| 2005/0195375 A1 | 9/2005 | Fujiwara |
| 2005/0195387 A1 | 9/2005 | Zhang et al. |
| 2005/0219530 A1 | 10/2005 | Horibe et al. |
| 2005/0254726 A1 | 11/2005 | Fuchs et al. |
| 2005/0273830 A1 | 12/2005 | Silver et al. |
| 2006/0028328 A1 | 2/2006 | Cresse |
| 2006/0028374 A1 | 2/2006 | Fullerton |
| 2006/0028375 A1 | 2/2006 | Honda et al. |
| 2006/0028622 A1 | 2/2006 | Nojirna et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyarna et al. |
| 2007/0064242 A1 | 3/2007 | Childers |
| 2007/0103699 A1 | 5/2007 | Kohnen et al. |
| 2007/0138371 A1 | 6/2007 | Marshall |
| 2007/0182949 A1 | 6/2007 | Niclass |
| 2007/0211329 A1 | 9/2007 | Haase et al. |
| 2007/0273610 A1 | 11/2007 | Baillot |
| 2008/0018591 A1 | 1/2008 | Pittel et al. |
| 2008/0174516 A1* | 7/2008 | Xiao .............. H04N 9/3147 345/1.3 |
| 2008/0266169 A1 | 10/2008 | Akita |
| 2008/0291213 A1 | 11/2008 | Bhogal |
| 2008/0309913 A1 | 12/2008 | Fallon |
| 2008/0316026 A1 | 12/2008 | Yenisch et al. |
| 2008/0317077 A1 | 12/2008 | Hoving et al. |
| 2009/0059381 A1* | 3/2009 | Jannard .............. A61B 5/6814 359/630 |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0013860 A1 | 1/2010 | Mandella et al. |
| 2010/0014750 A1 | 1/2010 | Seko et al. |
| 2010/0045967 A1 | 2/2010 | Moir |
| 2010/0110385 A1 | 5/2010 | Choi et al. |
| 2010/0142856 A1 | 6/2010 | Takeuchi et al. |
| 2010/0149518 A1 | 6/2010 | Nordenfelt et al. |
| 2010/0235006 A1 | 9/2010 | Brown |
| 2010/0246902 A1 | 9/2010 | Rowe et al. |
| 2010/0305857 A1 | 12/2010 | Byrne et al. |
| 2010/0326311 A1 | 12/2010 | Simon |
| 2010/0328054 A1 | 12/2010 | Yim et al. |
| 2010/0328306 A1* | 12/2010 | Chau .............. G06F 3/0418 345/173 |
| 2011/0001793 A1 | 1/2011 | Moriyarna et al. |
| 2011/0102763 A1 | 5/2011 | Brown et al. |
| 2011/0115747 A1 | 5/2011 | Powell et al. |
| 2011/0123113 A1 | 5/2011 | Berretty et al. |
| 2011/0211243 A1 | 9/2011 | Smits |
| 2011/0249157 A1 | 10/2011 | Fredernbach et al. |
| 2011/0304842 A1 | 12/2011 | Kao et al. |
| 2012/0017147 A1 | 1/2012 | Mark |
| 2012/0050528 A1 | 3/2012 | Davies et al. |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0229818 A1 | 9/2012 | Chinn et al. |
| 2012/0236379 A1 | 9/2012 | da Silva et al. |
| 2012/0250152 A1 | 10/2012 | Larson et al. |
| 2012/0262696 A1 | 10/2012 | Eisele et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0135198 A1* | 5/2013 | Hodge ............... G06F 1/3265 345/156 |
| 2013/0170006 A1 | 7/2013 | Kurashige et al. |
| 2013/0176561 A1 | 7/2013 | Hidaka |
| 2013/0215487 A1 | 9/2013 | Konuma et al. |
| 2013/0229669 A1 | 9/2013 | Smits |
| 2013/0239057 A1 | 9/2013 | Ubillos et al. |
| 2013/0258108 A1 | 10/2013 | Ono et al. |
| 2013/0293396 A1 | 11/2013 | Selevan |
| 2013/0293760 A1 | 11/2013 | Nisenzon et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0204385 A1 | 7/2014 | Ouyang et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0284457 A1 | 9/2014 | Smits |
| 2014/0285818 A1 | 9/2014 | Holz |
| 2014/0307248 A1 | 10/2014 | Giger et al. |
| 2014/0350836 A1 | 11/2014 | Stettner et al. |
| 2014/0354514 A1* | 12/2014 | Aronsson .............. G06F 3/013 345/7 |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0160332 A1 | 6/2015 | Sebastian et al. |
| 2015/0169082 A1 | 6/2015 | Li et al. |
| 2015/0225783 A1 | 8/2015 | Mears et al. |
| 2015/0233703 A1 | 8/2015 | Martini et al. |
| 2015/0279114 A1 | 10/2015 | Yonekubo |
| 2015/0285625 A1 | 10/2015 | Deane |
| 2015/0286293 A1 | 10/2015 | Gruhlke et al. |
| 2015/0301180 A1 | 10/2015 | Stettner et al. |
| 2016/0004126 A1 | 1/2016 | Leister |
| 2016/0011312 A1 | 1/2016 | Leyva |
| 2016/0014403 A1 | 1/2016 | Stroetrnann |
| 2016/0041266 A1 | 2/2016 | Smits |
| 2016/0047895 A1 | 2/2016 | Dussan |
| 2016/0050345 A1 | 2/2016 | Longbotharn et al. |
| 2016/0139266 A1 | 5/2016 | Montoya et al. |
| 2016/0162747 A1 | 6/2016 | Singh et al. |
| 2016/0259038 A1 | 9/2016 | Retterath et al. |
| 2016/0259058 A1 | 9/2016 | Verheggen et al. |
| 2016/0282468 A1 | 9/2016 | Gruver et al. |
| 2016/0306044 A1 | 10/2016 | Smits |
| 2016/0313553 A1 | 10/2016 | Song et al. |

(56) References Cited

U.S. PATENT DOCUMENTS

| | | |
|---|---|---|
| 2016/0335778 A1 | 11/2016 | Smits |
| 2016/0349526 A1 | 12/2016 | Kurashige et al. |
| 2017/0003392 A1 | 1/2017 | Bartlett et al. |
| 2017/0010104 A1 | 1/2017 | Aviel |
| 2017/0045358 A1 | 2/2017 | Masuda et al. |
| 2017/0052065 A1 | 2/2017 | Sharma et al. |
| 2017/0097407 A1 | 4/2017 | Shpunt et al. |
| 2017/0108443 A1 | 4/2017 | Kurihara et al. |
| 2017/0131090 A1 | 5/2017 | Bronstein et al. |
| 2017/0176575 A1 | 6/2017 | Smits |
| 2017/0176596 A1 | 6/2017 | Shpunt et al. |
| 2017/0208292 A1 | 7/2017 | Smits |
| 2017/0242104 A1 | 8/2017 | Dussan |
| 2017/0299721 A1 | 10/2017 | Eichenholz et al. |
| 2017/0363724 A1 | 12/2017 | Reid |
| 2018/0039852 A1 | 2/2018 | Nakamura et al. |
| 2018/0113216 A1 | 4/2018 | Kremer et al. |
| 2018/0120931 A1 | 5/2018 | Shpunt et al. |
| 2018/0180733 A1 | 6/2018 | Smits |
| 2018/0189574 A1 | 7/2018 | Brueckner et al. |
| 2019/0011567 A1 | 1/2019 | Pacala et al. |
| 2019/0080612 A1 | 3/2019 | Weissman et al. |
| 2019/0285877 A1 | 9/2019 | Ogino et al. |
| 2020/0013185 A1 | 1/2020 | Yoshimura |
| 2020/0132984 A1 | 4/2020 | Tsao et al. |
| 2020/0133106 A1 | 4/2020 | Smits |
| 2020/0192082 A1 | 6/2020 | Zhou et al. |
| 2020/0310114 A1 | 10/2020 | Tanabe |
| 2021/0157012 A1 | 5/2021 | Wajnberg et al. |

FOREIGN PATENT DOCUMENTS

| | | |
|---|---|---|
| CN | 201159795 Y | 12/2008 |
| CN | 101750012 A | 6/2010 |
| CN | 102084290 A | 6/2011 |
| CN | 102576156 A | 7/2012 |
| CN | 103608642 A | 2/2014 |
| CN | 103797328 A | 5/2014 |
| CN | 105066953 A | 11/2015 |
| DE | 102015205826 A1 | 10/2015 |
| EP | 0583060 A2 | 2/1994 |
| EP | 0722109 A1 | 7/1996 |
| EP | 1213597 A2 | 6/2002 |
| EP | 2148220 A1 | 1/2010 |
| EP | 2711667 A1 | 3/2014 |
| GB | 2510001 A | 7/2017 |
| JP | 11119184 A | 4/1999 |
| JP | 2000-304508 A | 11/2000 |
| JP | 2001045381 A | 2/2001 |
| JP | 2003029201 A | 1/2003 |
| JP | 2004132914 A | 4/2004 |
| JP | 2005519338 A | 6/2005 |
| JP | 2010-197227 A | 9/2010 |
| JP | 2011197674 A | 10/2011 |
| JP | 2013097138 A | 5/2013 |
| JP | 2015-025901 A | 2/2015 |
| KR | 10-2011-0115752 A | 10/2011 |
| KR | 101665938 B1 | 10/2016 |
| WO | 1992//89718 A1 | 10/1992 |
| WO | 2000/034818 A1 | 6/2000 |
| WO | 2002004247 A1 | 1/2002 |
| WO | 2002037166 A1 | 5/2002 |
| WO | 2005010739 A1 | 2/2005 |
| WO | 2006/063577 A1 | 6/2006 |
| WO | 2008152647 A2 | 12/2008 |
| WO | 2009/049272 A2 | 4/2009 |
| WO | 2011/109402 A2 | 9/2011 |
| WO | 2012/054231 A2 | 4/2012 |
| WO | 2013079099 A1 | 6/2013 |
| WO | 2014141115 A2 | 9/2014 |
| WO | 2016033036 A2 | 3/2016 |
| WO | 2016130997 A1 | 8/2016 |
| WO | 2016168378 A1 | 10/2016 |
| WO | 2017040066 A1 | 3/2017 |
| WO | 2017106875 A1 | 6/2017 |

OTHER PUBLICATIONS

Office Communication for U.S. Appl. No. 16/049,380 dated Sep. 27, 2018, pp. 1-40.
Office Communication for U.S. Appl. No. 16/140,485 dated Nov. 23, 2018, pp. 1-58.
International Search Report and Written Opinion in International Patent Application No. PCT/US18/32078 dated Nov. 16, 2018; pp. 1-16.
Office Communication for U.S. Appl. No. 15/694,532 dated Jul. 10, 2018, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49.
International Search Report and Written Opinion for International Patent Application No. PCT/US2017/059282 dated Aug. 10, 2018, pp. 1-3.
Office Communication for U.S. Appl. No. 16/114,139 dated Apr. 19, 2019, pp. 1-50.
International Search Report and Written Opinion for International Application No. PCT/US2017/014616 dated May 1, 2017, 11 pages.
Official Communication for U.S. Appl. No. 15/384,227 dated Feb. 7, 2017, 8 pages.
Official Communication for U.S. Appl. No. 15/384,227 dated Jul. 19, 2017, 5 pages.
Official Communication for U.S. Appl. No. 14/671,904 dated Aug. 18, 2017, 7 pages.
Official Communication for U.S. Appl. No. 15/194,502 dated Aug. 15, 2017, 7 pages.
Official Communication for U.S. Appl. No. 15/411,959 dated Aug. 29, 2017, 5 pages.
Official Communication for U.S. Appl. No. 13/877,652 dated Dec. 6, 2017, 8 pages.
Official Communication for U.S. Appl. No. 15/799,149 dated Jan. 10, 2018, 7 pages.
Official Communication for U.S. Appl. No. 15/444,182 dated Feb. 14, 2018, 8 pages.
Official Communication for U.S. Appl. No. 15/194,502 dated Feb. 12, 2018, 9 pages.
Official Communication for U.S. Appl. No. 15/804,392 dated Feb. 9, 2018, 10 pages.
Official Communication for U.S. Appl. No. 15/804,909 dated Feb. 12, 2018, 14 pages.
Official Communication for U.S. Appl. No. 15/098,285 dated Apr. 19, 2018, 69 pages.
International Search Report and Written Opinion for International Patent Application No. PCT/US2017/068377 dated Apr. 17, 2018, 12 pages.
Office Communication for U.S. Appl. No. 15/411,959 dated May 11, 2017, 8 pages.
Savage, P., "GDC 2013: Valv's Michael Abrash on the challenges of VR—a 'new world is emerging'," PCGamer, Apr. 2, 2013, 6 pages.
European Search Report for European Patent Application No. 08837063.0 dated Nov. 19, 2010, 8 pages.
Communication Pursuant to Article 94(3) EPC in European Patent Application No. 08837063.0 dated Dec. 27, 2011, 5 pages.
Communication Pursuant to Article 94(3) EPC in European Patent Application No. 08837063.0 dated Oct. 22, 2012, 6 pages.
International Search Report and Written Opinion in International Patent Application No. PCT/US2008/079663 dated Apr. 30, 2009, 5 pages.
International Search Report and Written Opinion in International Patent Application No. PCT/US2011/026691 dated Oct. 24, 2011, 7 pages.
International Search Report in International Patent Application No. PCT/US2011/054751 dated Jan. 30, 2012, 1 page.

(56) References Cited

OTHER PUBLICATIONS

International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S, Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/858,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Communication for U.S. Appl. No. 14/636,062 dated Sep. 25, 2015, 8 pages.
Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, 10 pages.
Official Communication for U.S. Appl. No. 14/218,643 dated Jun. 23, 2016, 11 pages.
Official Communication for U.S. Appl. No. 13/677,652 dated Aug. 12, 2016, 22 pages.
Official Communication for U.S. Appl. No. 15/194,502 dated Aug. 19, 2016, 12 pages.
Official Communication for U.S. Appl. No. 14/636,062 dated Aug. 24, 2016, 9 pages.
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. No. 14/218,643 dated Nov. 1, 2016, 10 pages.
Kanzawa, Y., et al., "Human Skin Detection by Visible and Near-infrared imaging," IAPR Conference on Machine Vision Applications, Jun. 13-15, 2011, Nara Japan, 5 pages.
Office Communication for U.S. Appl. No. 13/877,652 dated May 31 2017, 23 pages.
Office Communication for U.S. Appl. No. 15/194,502 dated Mar. 9, 2017, 7 pages.
International Search Report and Written Opinion for International Application No. PCT/US2016/067626 dated Mar. 16, 2017, 12 pages.
Office Communication for U.S. Appl. No. 14/671,904 dated May 5, 2017, 11 pages.
Office Communication for U.S. Appl. No. 15/411,959 dated May 11, 2017, 9 pages.
Office Communication for U.S. Appl. No. 16/679,110 dated Feb. 13, 2020, pp. 1-10.
Office Communication for U.S. Appl. No. 16/435,392 dated Feb. 21, 2020, pp. 1-10.
Office Communication for U.S. Appl. No. 16/384,761 dated Nov. 29, 2019, pp. 1-39.
Office Communication for U.S. Appl. No. 15/976,269 dated Oct. 8, 2019, pp. 1-14.
Office Communication for U.S. Appl. No. 16/165,631 dated Dec. 27, 2019, pp. 1-13.
Office Communication for U.S. Appl. No. 16/140,485 dated Aug. 9, 2019, pp. 1-5.
Office Communication for U.S. Appl. No. 16/114,139 dated Aug. 2, 2019, pp. 1-21.
Office Communication for U.S. Appl. No. 16/140,485 dated Sep. 20, 2019, pp. 1-16.
Office Communication for U.S. Appl. No. 15/976,269 dated Sep. 6, 2019, pp. 1-27.
Office Communication for U.S. Appl. No. 16/443,702 dated Oct. 3, 2019, pp. 1-16.
Office Communication for U.S. Appl. No. 16/398,139 dated Sep. 27, 2019, pp. 1-17.
Office Communication for U.S. Appl. No. 16/530,818 dated Oct. 16, 2019, pp. 1-13.
Office Communication for U.S. Appl. No. 16/165,631 dated Oct. 8, 2019, pp. 1-11.
Office Communication for U.S. Appl. No. 16/114,139 dated Sep. 9, 2019, pp. 1-8.
Office Communication for U.S. Appl. No. 16/140,485 dated Jun. 3, 2019, pp. 1-58.
Office Communication for U.S. Appl. No. 15/976,269 dated Jul. 8, 2019, pp. 1-36.
Office Communication for U.S. Appl. No. 16/384,761 dated Jun. 21, 2019, pp. 1-93.
Office Communication for U.S. Appl. No. 16/261,528 dated May 17, 2019, pp. 1-82.
Office Communication for U.S. Appl. No. 16/165,631 dated Jul. 19, 2019, pp. 1-27.
Office Communication for U.S. Appl. No. 16/398,139 dated Jun. 6, 2019, pp. 1-53.
International Search Report and Written Opinion for International Patent Application No. PCT/US2018/056757 dated Mar. 11, 2019, pp. 1-12.
European Supplementary Search Report for European Patent Application No. 16876940.4 dated May 8, 2019, pp. 1-8.
Office Communication for U.S. Appl. No. 16/165,631 dated Apr. 1, 2019, pp. 1-23.
Office Communication for U.S. Apl. No. 15/444,182 dated Mar. 20, 2019, pp. 1-10.
Office Communication for U.S. Appl. No. 15/194,502 dated Mar. 6, 2019, pp. 1-11.

(56) References Cited

OTHER PUBLICATIONS

Office Communication for U.S. Appl. No. 16/223,043 dated Mar. 14, 2019, pp. 1-46.
Office Communication for U.S. Appl. No. 15/976,269 dated Mar. 25, 2019, pp. 1-49.
Office Communication for U.S. Appl. No. 15/194,502 dated Jan. 3, 2019, pp. 1-15.
Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Office Communication for U.S. Appl. No. 16/659,513 dated Mar. 20, 2020, pp. 1-12.
Office Communication for Chinese Patent Application No. 201780018948.1 dated Mar. 27, 2020, pp. 1-7.
Office Communication for U.S. Appl. No. 16/530,818 dated Apr. 6, 2020, pp. 1-5.
Extended European Search Report for EP Patent Application No. 17878671.1 dated May 7, 2020, pp. 1-11.
Office Communication for U.S. Appl. No. 16/820,523 dated Apr. 22, 2020, pp. 1-10.
Extended European Search Report for EP Patent Application No. 17742125.2 dated Jul. 29, 2019, pp. 1-13.
Li et al., "Facial Performance Sensing Head-Mounted Display." ACM Transactions on Graphics (TOG), vol. 34, No. 4, 2015, pp. 1-9.
Seymour, "Facing Second Son—fxguide," Feb. 2, 2015, https://www.fxguide.com/fxfeatured/facing-second-son/, retrieved on Jul. 19, 2019, pp. 1-18.
Rolland et al., "Development of Head-Mounted Projection Displays for Distributed, Collaborative, Augmented Reality Applications." Presence: Teleoperators & Virtual Environments, vol. 14, No. 5, 2005, pp. 528-549.
International Search Report and Written Opinion for International Patent Application No. PCT/US2019/015739 dated May 17, 2019, pp. 1-7.
Office Communication for Japanese Patent Application No. 2018551896 mailed Oct. 26, 2020, pp. 1-11.
Office Communication for U.S. Appl. No. 16/659,513 mailed Nov. 25, 2020, pp. 1-6.
Office Communication for U.S. Appl. No. 16/435,392 mailed Dec. 1, 2020, pp. 1-13.
Office Communication for U.S. Appl. No. 16/679,110 mailed Dec. 7, 2020, pp. 1-6.
Office Communication for U.S. Appl. No. 16/443,702 mailed Dec. 18, 2020, pp. 1-3.
Examination Report for European Patent Application No. 16876940.4 mailed May 28, 2020, pp. 1-5.
Office Communication for U.S. Appl. No. 16/435,392 mailed Aug. 10, 2020, pp. 1-7.
Office Communication for U.S. Appl. No. 16/679,110 mailed Aug. 18, 2020, pp. 1-9.
Office Communication for U.S. Appl. No. 16/443,702 mailed Sep. 18, 2020, pp. 1-14.
Office Communication for U.S. Appl. No. 16/435,392 mailed Oct. 23, 2020, pp. 1-4.
Office Communication for U.S. Appl. No. 16/820,523 mailed Nov. 2, 2020, pp. 1-6.
Partial Supplementary European Search Report for European Patent Application No. 18797782.2 mailed Jan. 19, 2021, pp. 1-19.
Office Communication for U.S. Appl. No. 16/443,702 mailed Feb. 8, 2021, pp. 1-12,.
Extended European Search Report for European Patent Application No. 18797782.2 mailed May 27, 2021, pp. 1-21.
Examination Report for European Patent Application No. 11834848.1 mailed Jun. 7, 2019, pp. 1-6.
Examination Report for European Patent Application No. 17742125.2 mailed Nov. 19, 2020, pp. 1-7.
Office Communication for Chinese Patent Application No. 201880030862.5 mailed Jun. 9, 2021, pp. 1-23.
Office Communication for U.S. Appl. No. 16/679,110 mailed Mar. 17, 2021, pp. 1-8.
Extended European Search Report for European Patent Application No. 20201393.4 mailed Apr. 22, 2021, pp. 1-9.
Duchowski, Andrew T. et al., "Gaze-Contingent Displays: A Review," Cyberpsychology & Behavior, 2004, vol. 7, No. 6, pp. 621-634.
International Search Report and Written Opinion for International Patent Application No. PCT/US2021/020359 mailed May 11, 2021, pp. 1-7.
Office Communication for U.S. Appl. No. 16/443,702 mailed Jun. 1, 2021, pp. 1-5.
Examination Report for European Patent Application No. 17878671.1 mailed May 14, 2021, pp. 1-5.
Office Communication for Japanese Patent Application No. JP 2019-561820 mailed Mar. 7, 2022, pp. 1-11.
Office Communication for U.S. Appl. No. 17/214,505 mailed Mar. 16, 2022, pp. 1-12.
Office Communication for Japanese Patent Application No. JP 2019-535248 mailed Nov. 17, 2021, pp. 1-7.
Kasai, Takeshi et al., "A Real Time Measurement System of 3-D Motion Using Multiple Cameras," Society of Biomechanisms Japan, 1986, vol. 8, pp. 1-32.
Office Communication for Chinese Patent Application No. 201680082143.9 mailed Nov. 30, 2021, pp. 1-33.
Office Communication for U.S. Appl. No. 17/189,204 mailed Jan. 11, 2022, pp. 1-24.
Examination Report for European Patent Application No. 16876940.4 mailed Jul. 30, 2021, pp. 1-4.
Extended European Search Report for European Patent Application No. 17885850.2 mailed May 25, 2020, pp. 1-8.
Examination Report for European Patent Application No. 17885850.2 mailed Aug. 30, 2021, pp. 1-5.
Office Communication for U.S. Appl. No. 17/189,204 mailed May 2, 2022, pp. 1-14.
Office Communication for U.S. Appl. No. 16/790,592 mailed May 19, 2022, pp. 1-10.
Office Communication for Japanese Patent Application No. JP 2019-535248 mailed Jul. 4, 2022, pp. 1-5.
Office Communication for U.S. Appl. No. 17/214,505 mailed Aug. 26, 2022, pp. 1-13.
Office Communication for U.S. Appl. No. 16/708,198 mailed Aug. 26, 2022, pp. 1-5.
Office Communication for U.S. Appl. No. 17/214,505 mailed Sep. 12, 2022, pp. 1-2.
Examination Report for European Patent Application No. 20201393.4 mailed Sep. 15, 2022, pp. 1-6.
Office Communication for U.S. Appl. No. 17/187,069 mailed Dec. 5, 2022, pp. 1-11.
Office Communication for Chinese Patent Application No. 201780084810.1 mailed Nov. 22, 2022, pp. 1-21.
Mak, D.K., "Locating Flaws in Three-Dimensional Space Using A Transmitter-Receiver System," NDT, Nov. 1990, vol. 12, No. 11, pp. 1-9.
Gu, Liming, "Research on Key Technologies of Photon Beam Position Measurement at Hls," A dissertation for Doctor's degree, University of Science and Technology of China, May 2011, pp. 1-248.
Chen, Junqing et al., "Digital Camera Imaging System Simulation," IEEE Transactions on Electron Devices, Nov. 2009, vol. 56, Iss. 11, pp. 2496-2505.
Office Communication for Chinese Patent Application No. 201780076900.6 mailed Dec. 5, 2022, pp. 1-15.
Office Communication for Japanese Patent Application No. JP 2019-535248 mailed Jan. 10, 2023, pp. 1-4.
Office Communication for U.S. Appl. No. 16/938,968 mailed Jan. 26, 2023, pp. 1-11.
Office Communication for U.S. Appl. No. 16/708, 198 mailed Mar. 6, 2023, pp. 1-5.
Office Communication for U.S. Appl. No. 16/790,592 mailed Mar. 8, 2023, pp. 1-5.
Office Communication for U.S. Appl. No. 17/850, 102 mailed Mar. 14, 2023, pp. 1-28.

(56) References Cited

OTHER PUBLICATIONS

Office Communication for U.S. Appl. No. 17/188,483 mailed May 22, 2023, pp. 1-10.
Office Communication for U.S. Appl. No. 17/187,069 mailed Jun. 28, 2023, pp. 1-11.

\* cited by examiner

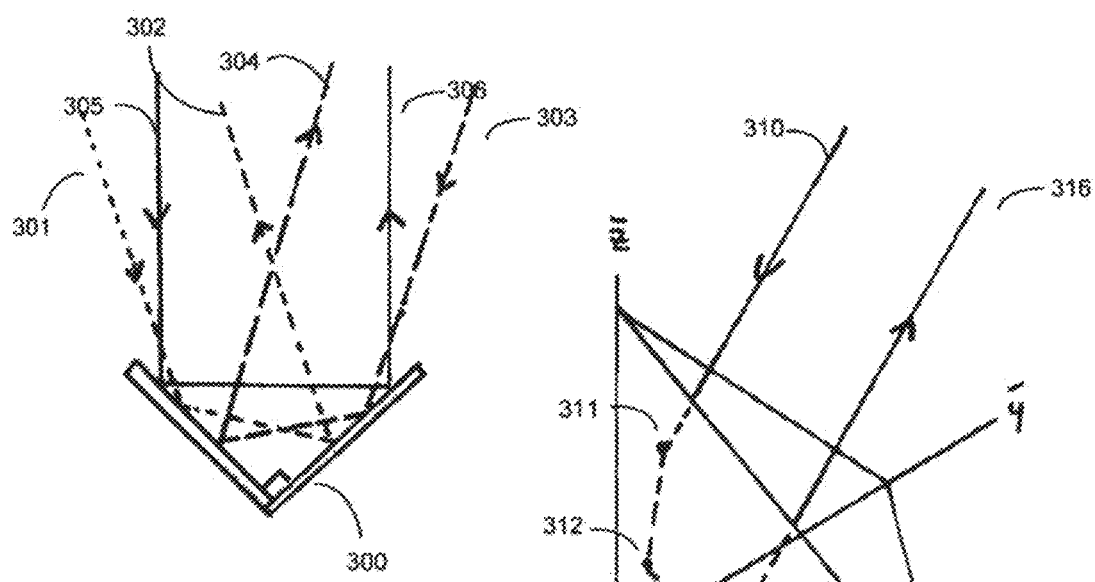
Figure 3a
Figure 3b
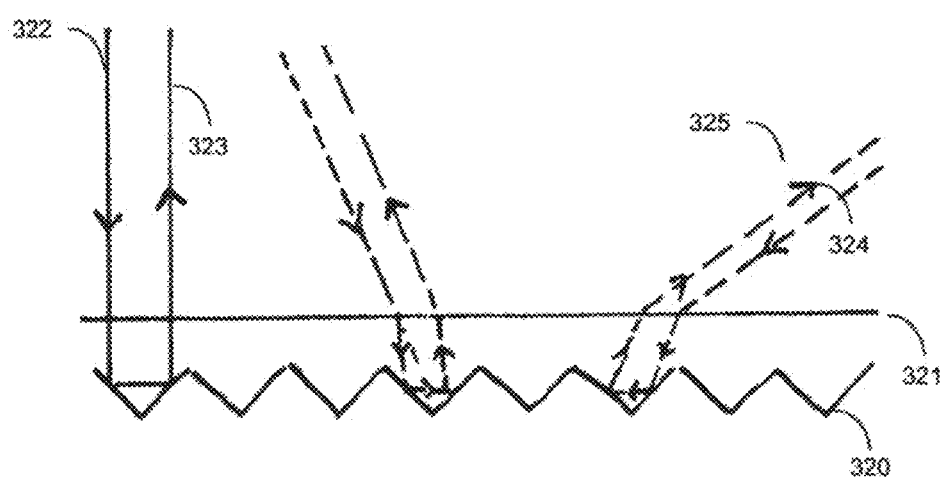
Figure 3c

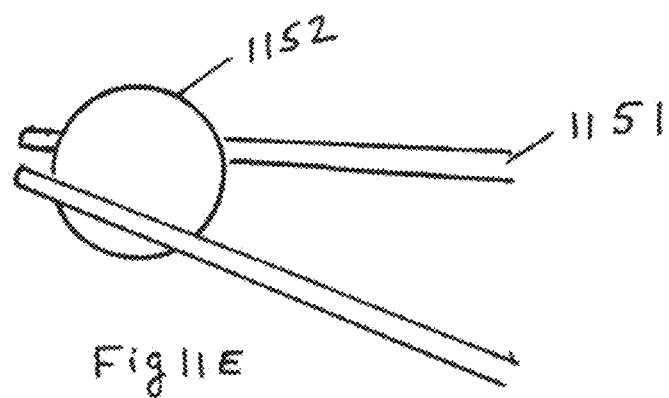
Fig 11E
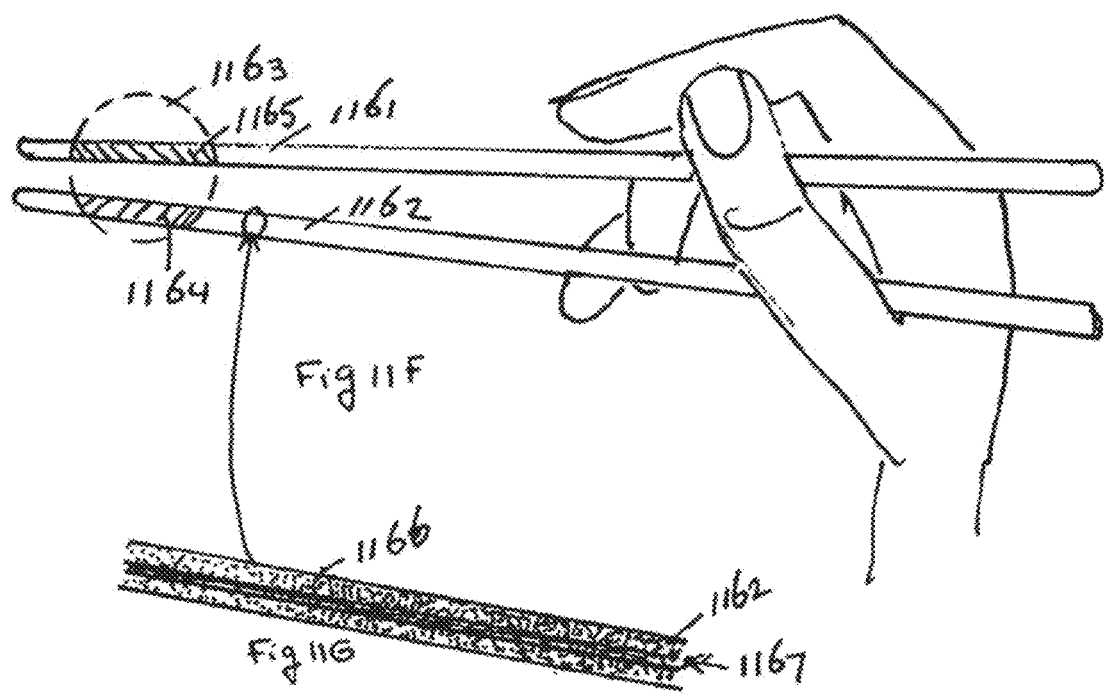
Fig 11F
Fig 11G

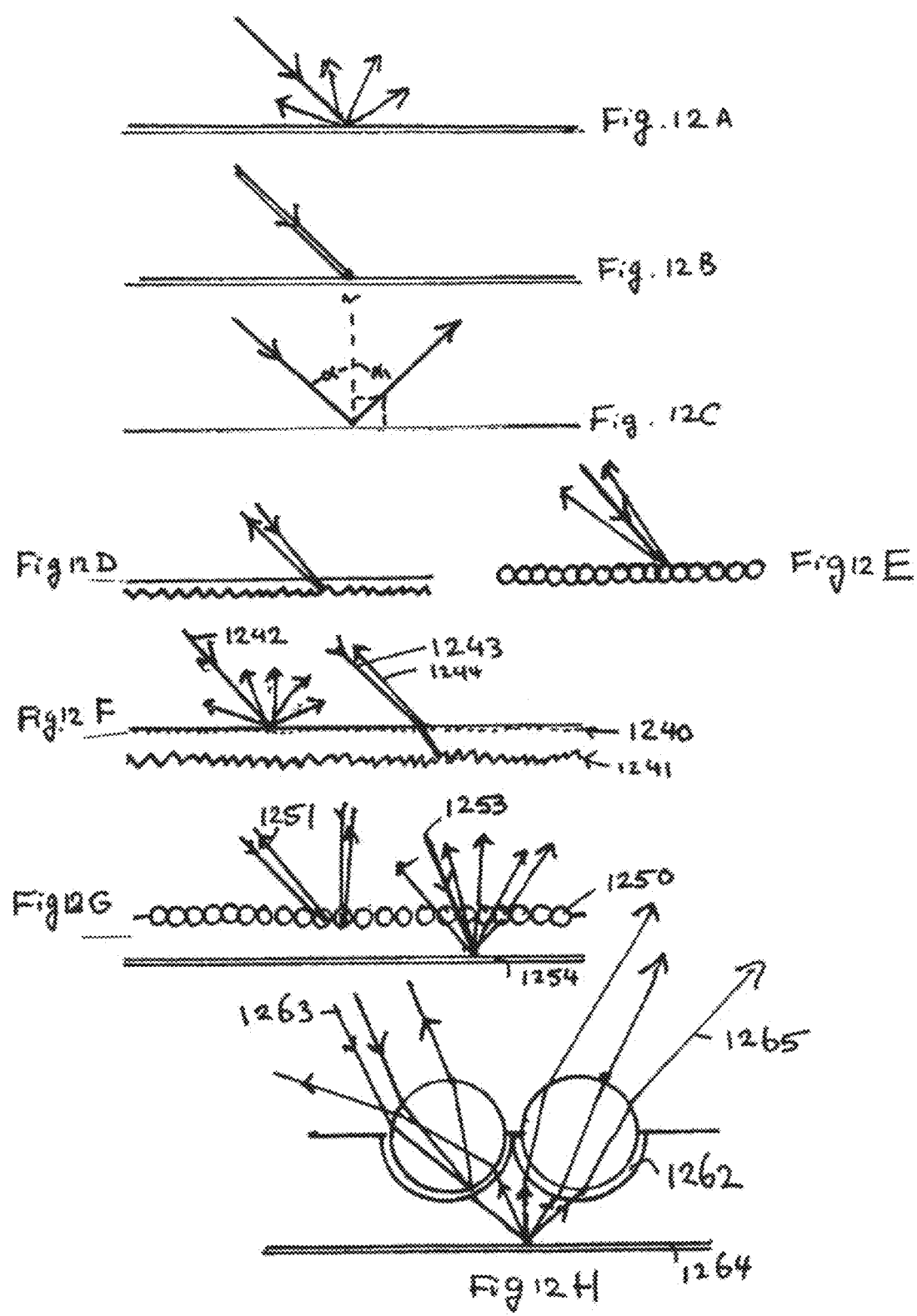

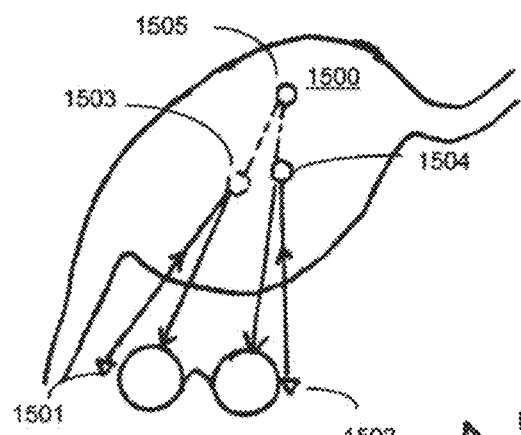
Figure 15a
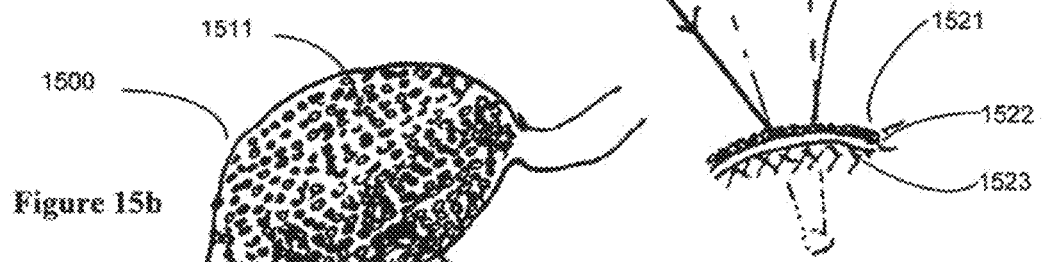
Figure 15b
Figure 15c
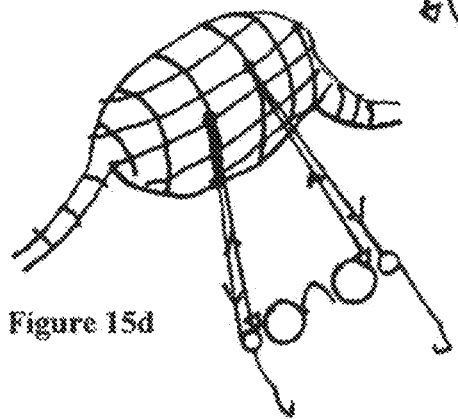
Figure 15d
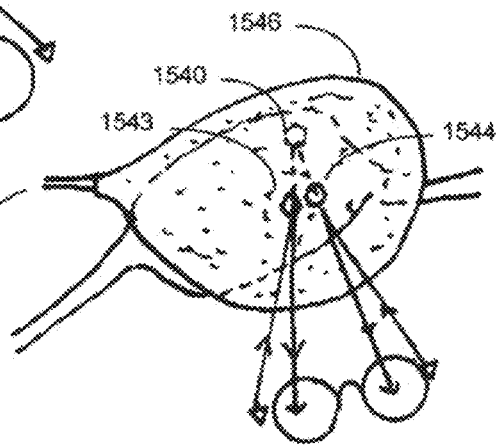
Figure 15e

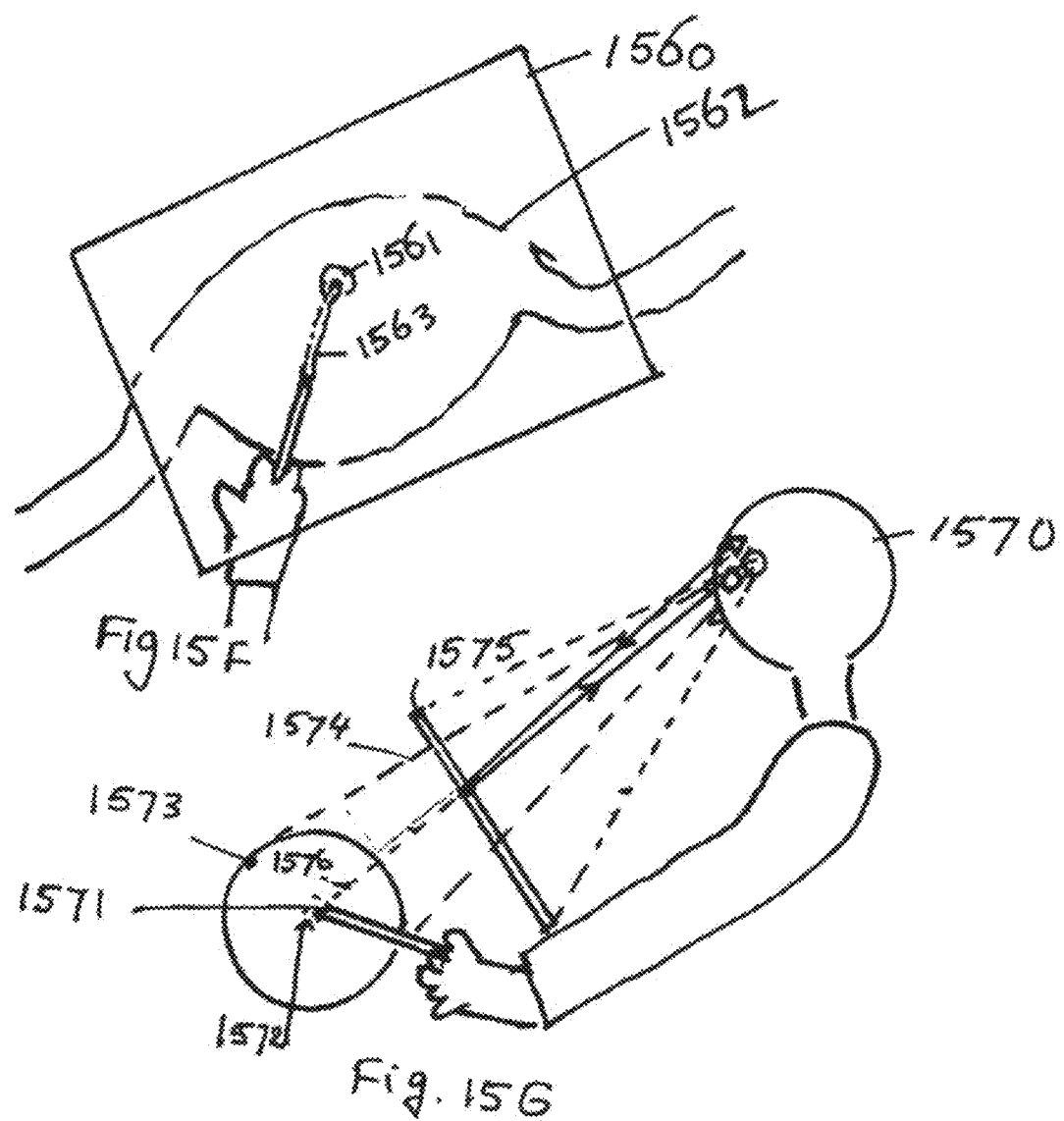

Spherical element

Cube corner element

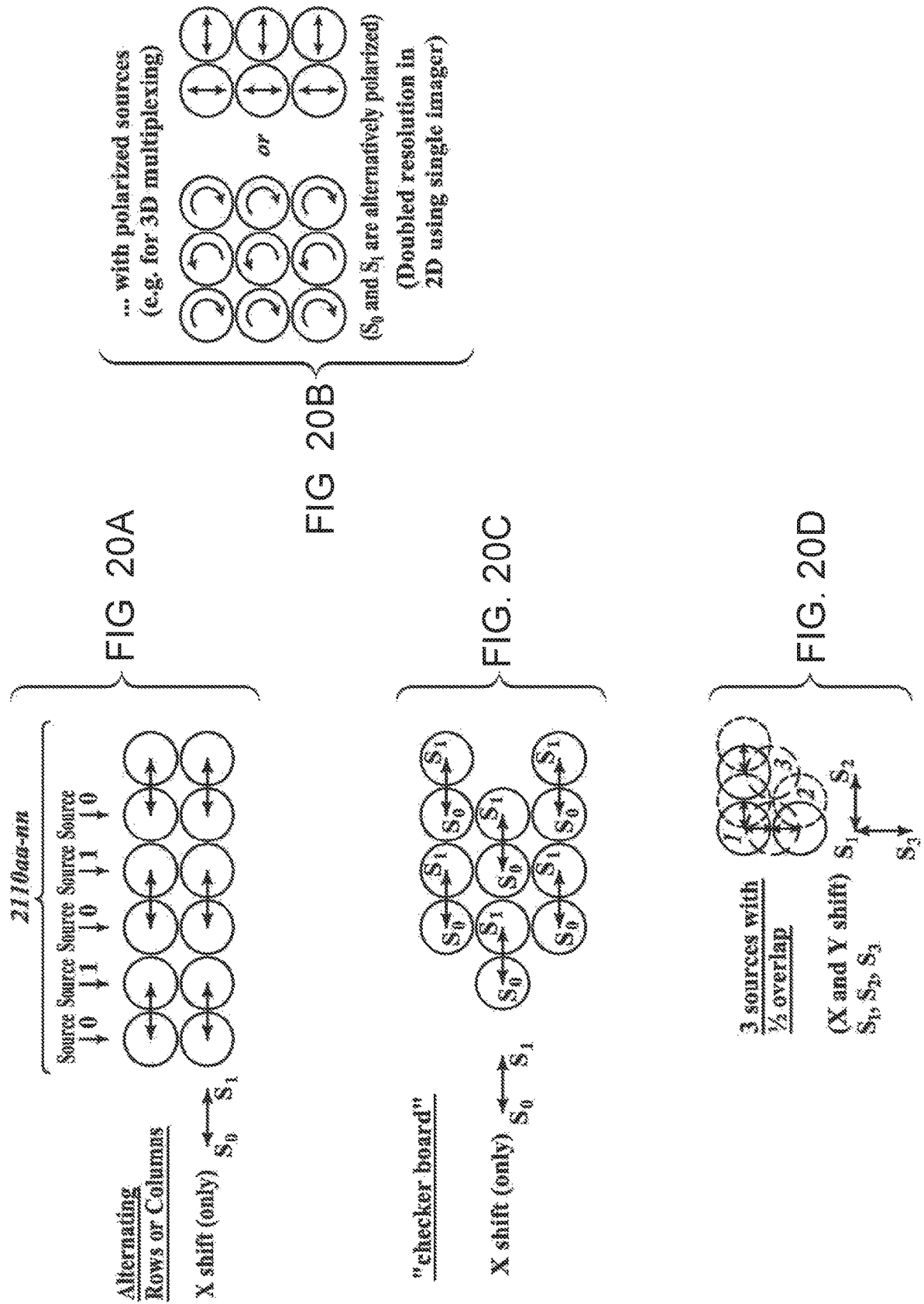

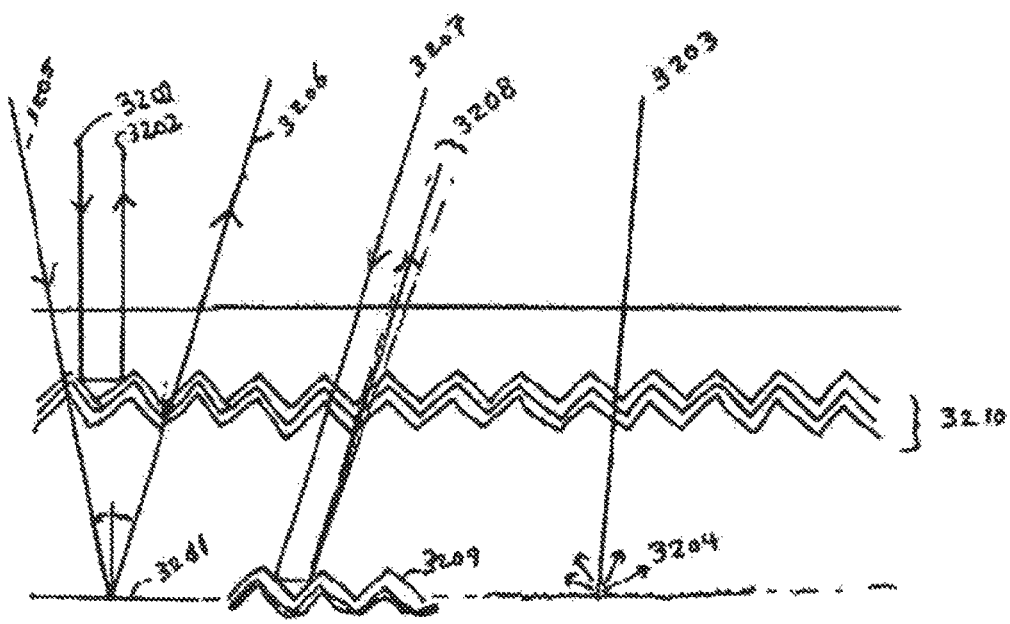
FIG. 31A
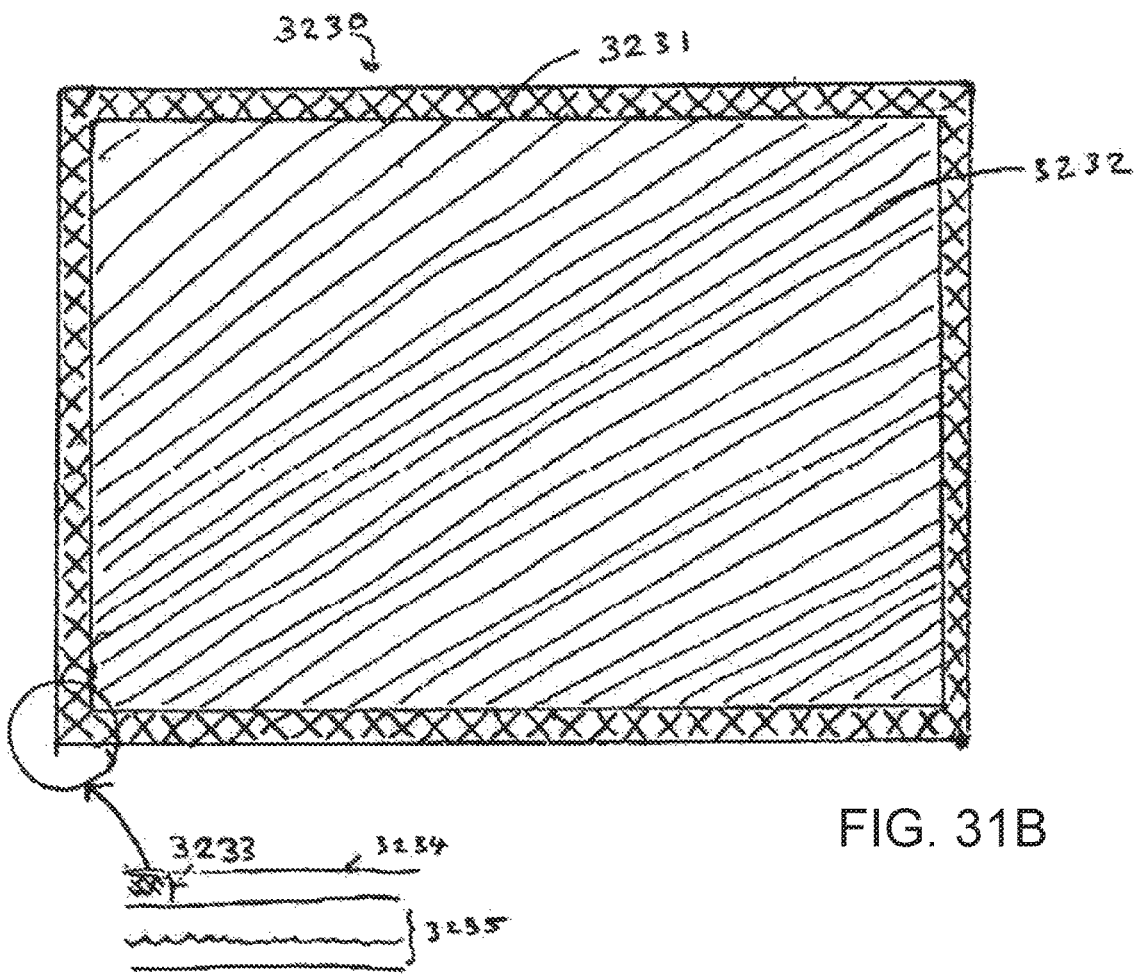
FIG. 31B
FIG. 31C

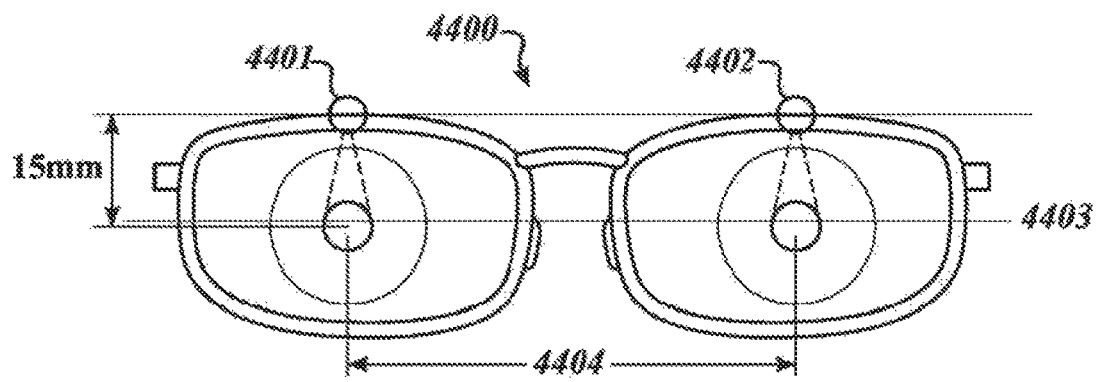
FIG. 43A
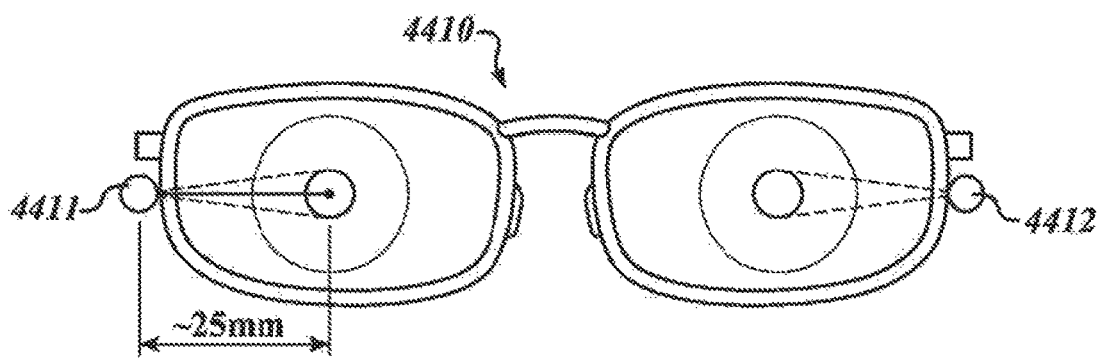
FIG. 43B
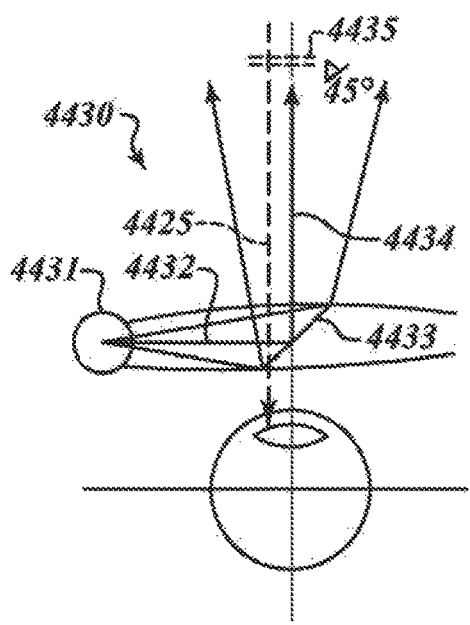 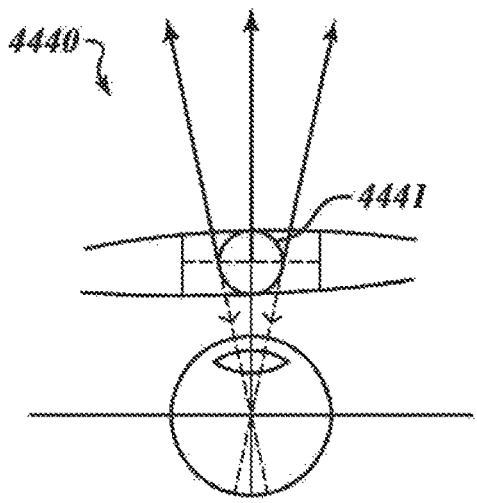
FIG. 43C              FIG. 43D Retro reflecting structures with sub apertures (fig 45C & 45E show alpha rotation of plane1)

SYSTEM AND METHOD FOR 3-D PROJECTION AND ENHANCEMENTS FOR INTERACTIVITY

CROSS-REFERENCE TO RELATED APPLICATION

This Utility Patent Application is a Continuation of U.S. patent application Ser. No. 13/877,652 filed on Jun. 26, 2013, now U.S. Pat. No. 9,946,076 issued on Apr. 17, 2018, which is a U.S. National Phase of International Patent Application No. PCT/US2011/054751 filed on Oct. 4, 2011, which is a continuation of U.S. patent application Ser. No. 13/252,126 filed on Oct. 3, 2011, which claims the benefit of U.S. Provisional Patent Application Ser. No. 61/404,538, filed on Oct. 4, 2010, and also claims the benefit of U.S. Provisional Patent Application Ser. No. 61/516,242 filed on Mar. 30, 2011, the benefit of each of the foregoing is hereby claimed. The subject matter of all of the foregoing is incorporated herein by reference in their entirety.

BACKGROUND OF THE INVENTION

1. Field of the Invention

This invention relates generally to personal visualization devices, in some cases with 3-D and/or color.

2. Description of the Related Art

Currently, projection of 3-D video images requires bulky and expensive projection equipment, plus special glasses for the viewer and special theater-quality screens. Thus viewing 3-D videos is an expensive and specialized experience.

As the world becomes more and more mobile, users want the ability to take all kinds of interaction with them. One phenomenon is the emerging craze for tablets. The problem is defining the "right" size, and how much connectivity to add. Also, there is the increasing cost with the size of the screen as well as the weight, and the monetary loss should an unfortunate incident occur to such a device, like losing it, dropping it, spilling on it, etc.

Also, as more and more 3-D is available in places such as movie theaters, PCs, TVs, and home entertainment systems, users want that experience "to go," but so far only a few devices are available, typically with very small screens using lenticular lenses. This approach requires a very precise location, and it can cause all kinds of undesired effects, to a degree that some manufacturers have substantial warning labels, or outright do not recommend that young children use them at all.

Also, currently even the most advanced premium venue-based stereo 3-D projection systems, such as Imax 3D™, are not capable of faithfully and exactly re-creating all the 3-D spatial clues required for each individual viewer's vantage point. Thus, such systems are essentially reducing the experience to the lowest common denominator. Furthermore, the one-size-fits-all "3-D" view does not allow for realistic motion parallax and other such strong spatial-awareness clues. More advanced experimental systems that do try to accommodate such natural spatial clues require special additional eyewear optics, which tend to impose severe restrictions on eye motion and field of view and suffer from unacceptable image ego motion correction latency—causing visual discomfort, disorientation and nausea, and impeding natural interaction.

SUMMARY OF THE INVENTION

The present invention overcomes the limitations of the prior art by providing enhanced systems and methods for 2-D and 3-D image projection.

One aspect of the invention is that it is lightweight, very power-efficient, portable, relatively low-cost, and private, which system may be used by one user only for viewing any type of audio/video presentation, or by two or multiple users for conferencing, game-playing, teaching, and other, similar multi-person interactions.

Other aspects of the invention include a system and method offering very inexpensive and even spill-proof or spill-resistant screens that are light-weight and low-cost and can offer high-quality images on the go.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 3A-C show examples of retro reflective surfaces formed by a corner cube embossed pattern.

FIGS. 8A-F give examples of the use of selective absorption filters or selective reflectors to suppress ambient light and increase image contrast in the field of view.

FIGS. 11A-H show examples of multiplayer games and 3-D interaction surfaces.

FIGS. 15A-G show examples of a stereoscopic micro projector for in situ 3-D imaging.

FIG. 20A-E show how three primaries of each set may be combined, resulting in two complementary full color pixel patterns.

FIGS. 31A-C show "invisible' embedded retro-reflective fiducials.

FIGS. 43A-H show examples of dual-projection systems embedded in thin eye wear.

Figure 1A:
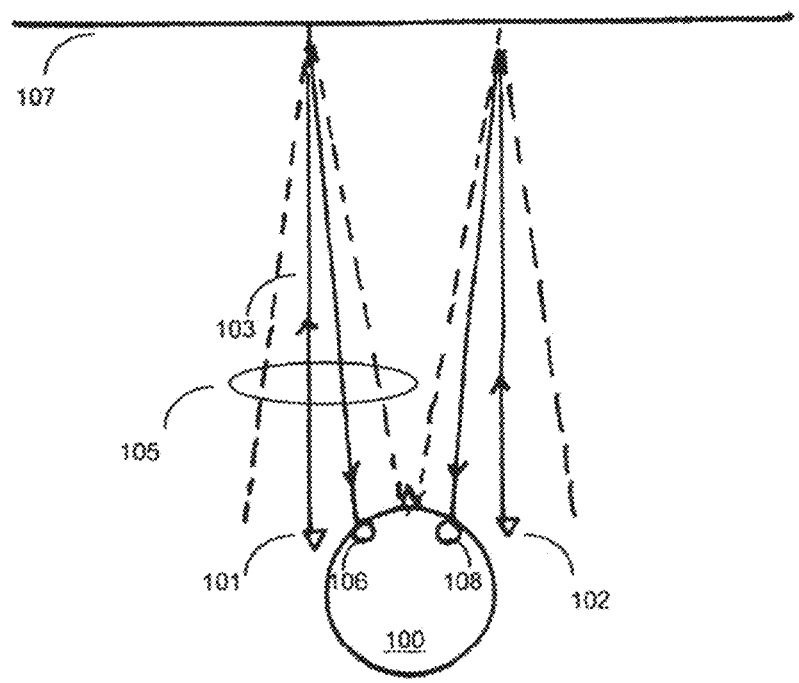
FIGS. 1A-B show an exemplary stereoscopic projection using a retro-reflective screen.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Stereoscopic 3-D Micro Projector

Two micro projectors each project one image from two separate positions so that the image of each projector can only be seen by one eye. Stereoscopic images are projected with the left image and right image projected separately by each of the projectors. The images are projected onto a retro-reflective screen surface, in such a way that the light from each projector is primarily reflected back to the position of that projector. The left image projector is mounted close to the left eye; its light can only be seen by the left eye. Similarly a right image projector is mounted on the opposite side of the head and its light therefore can only be seen by the right eye.

A good example of the use of such a system would be for a mobile device user, preferably a smart phone user, by mounting these two projectors on e.g., a headset or glasses (or glasses frame) and placing or unfolding a retro-reflective surface (or "placemat") on any work surface, such as a coffee table or desk or tray table. Now each 3-D image can be projected in the visual space defined by that work surface.

The main advantages of such a system would be the following:

1. A display system of ultimate power efficiency. Since most of the projected power is reflected back within a very narrow view cone, the system would therefore be easily over 10× more efficient than already efficient pico projection. The result would be a luminous image within a broad field of view.

2. An unobstructed 3-D view, not requiring active or passive specialized 3-D glasses, and hence compatible with the user's corrective eyewear. Also, no light losses introduced through active shutters, reduced duty cycles, etc.

3. A highly resolved 3-D image capability with a comfortable natural focal point. The images are projected at a comfortable distance, so they can be easily resolved through natural accommodation without requiring magnifying or reading glasses. This would make them much easier to use as compared to mobile displays that incorporate a lenticular surface (e.g., Nintendo DS 3-D). While the latter type displays also do not require glasses, they can be hard to use for older users without requiring reading glasses, and they also typically severely limit the useable range of head to device position.

4. A high degree of viewer privacy is ensured because the view is restricted to a very narrow area of view (cone) of the user.

5. The ability to share a working surface, in this case the retro-reflective screen area, by multiple viewers with each having an individual view in 3-D. Each viewer is provided with a different perspective. For example, special finished conference room tables may allow all users to have an area in front of them.

6. An improved social interaction during collaboration and playing games.

The participants can naturally be seated facing each other around a coffee table or a conference table and maintain eye contact with each other. Participants do not have to face screen a screen that blocks the view to others. They do not wear special eyewear obscuring their face.

7. The same screen can provide different images on the same screen (2-D or 3-D) as required e.g., in a control center or operating room. These views may or may not be shared by any or all participants depending on the situation. (Viewers may "channel select" from multiple channels.)

8. An especially power efficient means of creating multiple 3-D views on a single screen. Since each view is provided in a small fraction of the total 3-D view space and each view only needs to be projected to that space, the total energy required to create the sum of all these views is smaller than the equivalent energy required for a shared standard 2-D view. Typically, conventional 3-D methods require 3 to 6 times more energy than 2-D to achieve the same perceived luminosity.

9. Additional power efficiency can be realized by only illuminating objects to which the viewer directs his or her attention and suppressing or darkening the background.

10. When a large surface is used, the projection can be focused on where the viewer is actually directing his attention, thus a very large document can be read, or multiple documents can be opened and perused simultaneously by moving one's gaze toward various different positions in the field of view. Furthermore, when attention is focused on a certain object it can be enlarged, or provided with additional contrast for easier viewing.

11. People with vision problems could, for example, read a "newspaper" that is draped across the coffee table (actually, the special reflective cloth is on the table), and the area they are reading would be automatically enlarged. This would be independent of any 3-D features. Due to the retro-reflective aspects of the screen, a large view and a very bright image can be accomplished with a minimum of energy thus approaching the efficiency of a retinal projection without the restriction of view or any of the other uncomfortable aspects of such retinal projection. Also external light would not interfere. Due to the narrow reflection angle only light sources directly behind the user's head and pointing at the screen could interfere. A hat could provide in those situations a "dark halo", effectively blocking extraneous interference.

12. Since typically only milliwatts of illumination are required, in case of a flying spot projector laser safety for the eye is more easily accomplished while still projecting exceptionally bright 3-D images.

13. Gaze tracking with unrestricted 3-D head movements enables a natural 3-D motion parallax. The projectors' stereoscopic perspective can be used as a proxy for the direction of the gaze toward the screen and the viewed object on, in front of, behind, below or above it. By rapidly adjusting the projected image in 3-D accordingly, the system can accomplish a very natural motion-accurate 3-D parallax effect where, for example, objects are realistically occluded when the head is moved while viewing a 3-D scene at a relatively close distance.

14. The projector(s) can also contain 3-D accelerometers to track head motion accurately. Additionally or alternatively, marks on the reflective material can be tracked by camera(s) mounted at the projector, either or both in visible or invisible light (IR, UV).

15. Cameras or point sensor or line-scanning sensors can also be used to correct for brightness differences stemming from reflection differences based on angle of impact on screen surface. For simplicity, in the context of this document, referring to one shall include reference to any and all of them where applicable.

Screen Options

The application would require a retro-reflective projection surface. Such a surface is currently realizable using microscopic glass beads. The beads are very small: typically between 5 to 100μ, typically smaller than an individual pixel. Each light beam hitting such a bead is primarily reflected back toward the origin of the beam rather than in a standard reflection which would be specular and away from the origin of the beam at an angle equal to the incoming angle by the laws of reflection.

Alternatively, a micro patterned structure can be embossed into a hard surface—plastic or glass-creating a retro-reflective surface. The so-called corner cube is a very efficient retro-reflector. A surface consisting of millions of such tiny corner cubes would also act as a retro-reflecting surface. A corner cube pattern can be formed on the top surface purely as a front mirror structure, or it can be embossed as a rear mirror structure allowing for a more easily cleanable smooth top surface which can contain additional filters or anti-reflective coatings as desired.

Figure 16:
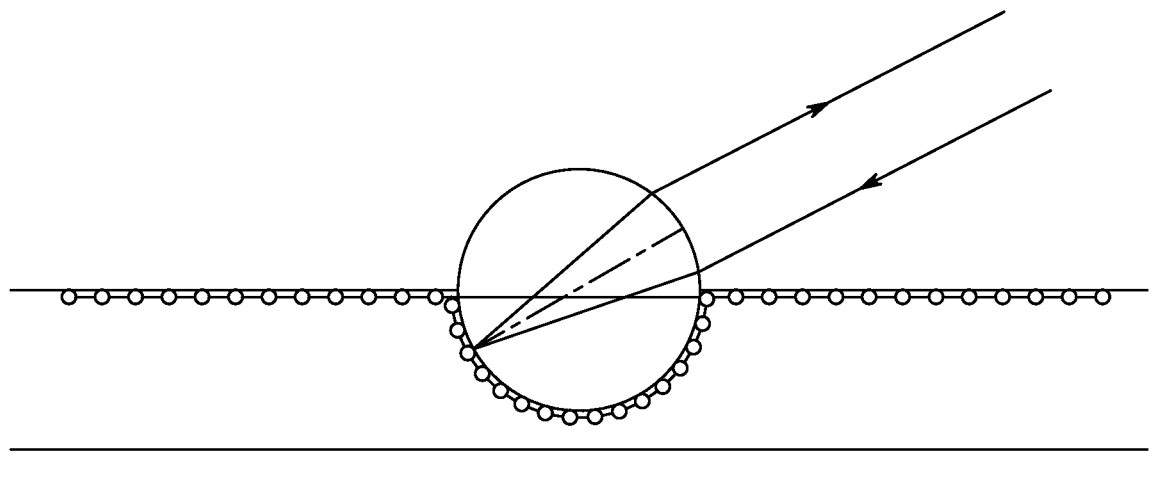
FIG. 16 shows two examples of structures that can be deployed to create retro-reflective surfaces.
Figure 16:
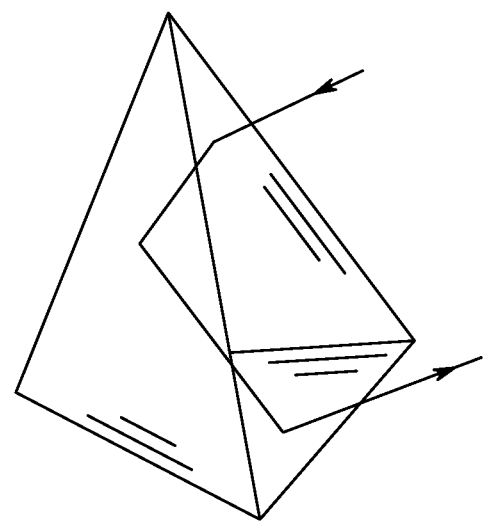
Figure 17:
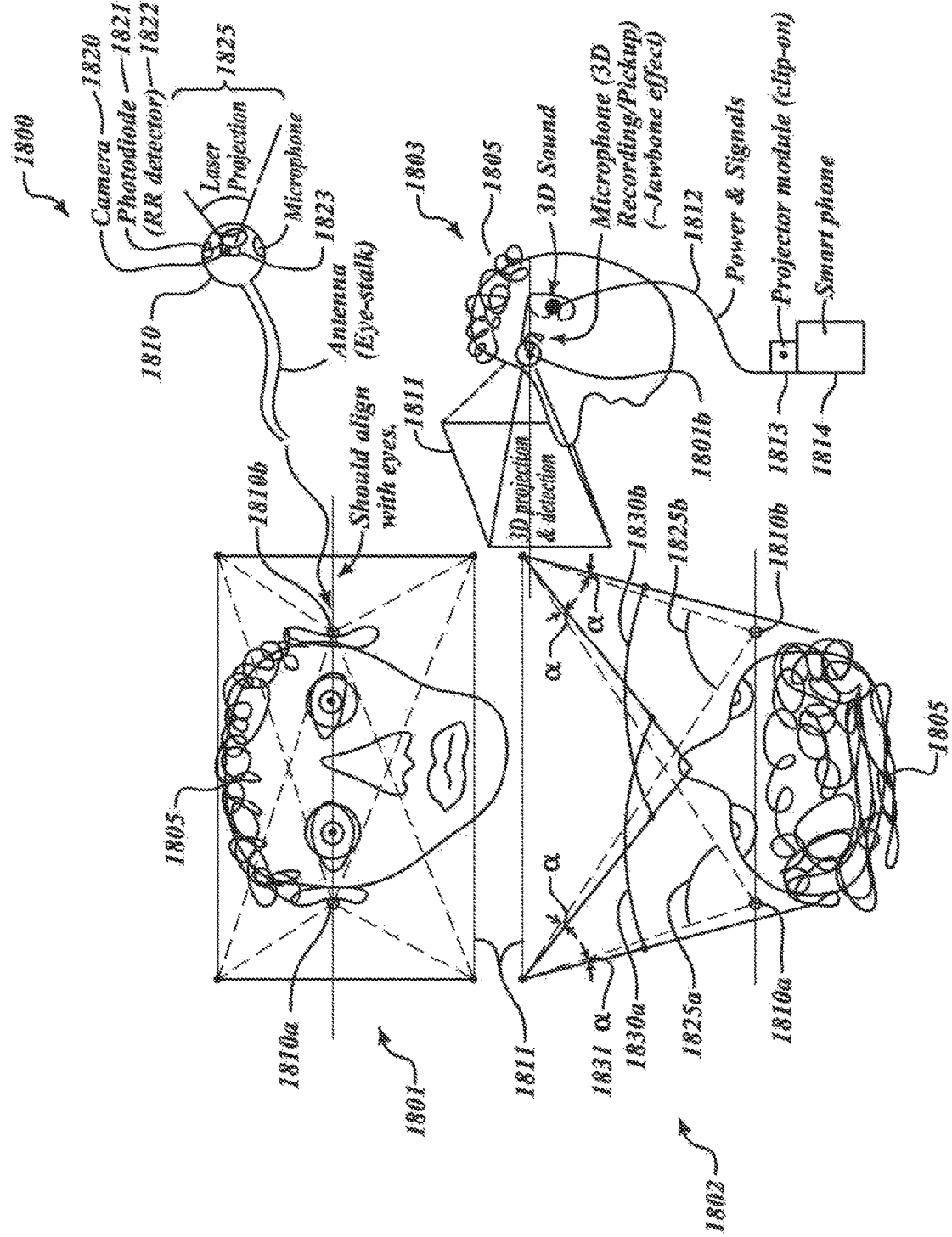
FIG. 17 shows two aspects of a personal viewer.

FIG. 16 shows two examples of structures that can be deployed to create retro-reflective surfaces. They are typically partially embedded or created as part of a meta structure, which will be also discussed throughout. For mobile applications it is conceivable to simply have a "placemat" arrangement where a cloth or scrollable material would be rolled out or unfolded and draped on a hard surface such as a table. The retro-reflective structures would be attached to, embedded into, or created as part of such a cloth or sheet material. Since a pico projector or micro projector or nano projector based on scanning lasers or high efficiency collimated light emitting diodes (LEDs) would not have a focal point, the angle and orientation and absolute flatness of the screen is not critical. In fact the projector would determine the location of the screen e.g., by edge fiducials, and the image-if desired-could be "attached" to the screen surface. That is, the image can be stabilized in a position referenced to the surface (moving or not) independent of the relative motion between the viewer, the projectors and the projection surface.

A good example would be that a newspaper could be projected onto a retro-reflective placemat in the exact position of the mat: either flat on the table, or, alternatively, the image of the paper could be positioned (in 3-D if needed) at a more comfortable angle for the viewer, which would presumably be orthogonal to his or her view.

Alternatively, the retro-reflective surface itself might be angled orthogonal toward the viewer's gaze in the form of a foldable screen. Additionally, the retro-reflective screen might be shaped like a newspaper or magazine folded in two halves with optionally the folding and unfolding action causing the pages to advance, as if reading a printed newspaper.

Interactive User Interface (UI) Options

Interactive features are optionally enabled by feedback loops based on the reflection of the scanning laser on the projection surface and based on the disruption of that scan pattern, e.g., by tracking with earlier mentioned cameras hands or fingers that would "turn the page of the newspaper" as in the previous example.

An infrared or low-power strobe scan detects the screen surface. The image, for example, a newspaper—is "attached" to the screen. When the screen is detected within the viewer's area of focus, the paper is projected or the movies played. If the viewer is interrupted and looks away from the screen, the projector detects the changed viewing condition, projection ceases and the movie is paused. For "hands-free" operation based solely on gaze or the position or orientation of the head, in situations such as, for example, for car navigation screens or in an operating room, this stop action could be important.

Projected 3-D objects can now be manipulated in 3-D. For example, when the light from the projection beams reflects off fingers, or by touching the object with a Magic Wand™, optionally with its own retro-reflective structures embedded so it is more easily located. The 3-D location of such a Magic Wand, fingers or Magic Chopsticks™ can be determined by standard stereoscopic analysis of the field of view—namely by comparing the left and right image and extracting the 3-D field of view spatial coordinates from the two views. (Magic Wand™ Magic Chopsticks™ and other input devices enabled by augmented reality capability of the proposed system are described in more detail elsewhere and in the drawings). Alternatively, pulsed infrared or visible signals can be used as a scanning laser or LIDAR. Accurate 3-D depth of field measurements can be done using the phase or timing information derived from the reflected light.

In yet other cases, around a fiduciary marking, a small set of command buttons could be printed on the surface, or in yet other cases, buttons could be projected at the "near edge" of the viewing field, allowing one to "tap" on them, and the cameras (visible or invisible light) or in beam reflection could pick up on that motion.

Additionally, structured light patterns can be projected by the projectors and detected by a standard CMOS camera or by sensors (e.g., a fast photo cell detector) mounted in line with or closely to the projector mirror or lens detecting the scanning beam as it retro reflected back towards its point of departure (e.g., the scanning mirror or projection lens). Such patterns can also be used accurately to determine the precise location of fingers or any other object reflecting the projected pattern.

Additionally, the smart phone (or other, suitable electronic device) itself, typically equipped with accelerometers today, could be used as a physical "magic wand" and waved in the air, flipped, turned etc as needed to interact with the content and/or the application running to generate the 3-D view.

Support for Laser Pointing Devices

In addition to the above means of interacting with the projected images, the screen characteristics can be modified to allow for the use of laser pointing devices with their output being detected by the cameras. As described elsewhere, the screen might be designed to be retro-reflective to the precise and narrow wavelengths of the primaries rendering the visible image, and the screen might also (at the same time) be designed to reject all other stray visible light, so as to maintain good contrast of the projected images in an environment with ambient light. That same screen can also (at the same time as providing the other two critical screen functions) be designed to diffusively scatter (& not absorb) a specific wavelength (visible or invisible such as IR) used by the pointing device(s), so that the sensors or cameras that observe the screen can register the position and orientation of the pointer's reflections on the screen. For example, a small cross, projected, for example, by adding a diffractive pattern generating filter to the pointer, would allow the camera to determine the exact origin of the pointing beam. An example is a small IR VCSEL output (850 nm). Such a laser could be a stand-alone pointing device or a tiny add-on inserted into a mobile device, turning it into a pointer. The IR wavelength output of such a pointing device, being neither a primary nor in the remainder of the visible range, would neither be retro-reflected back to the pointer, nor absorbed (filtered out), but diffusively reflected e.g., by a separate layer in the screen.

When using a large screen, fiducial markings can be embedded in the screen—such as crossed lines or crosshatch patterns. By using these fiducials, the head position and vantage point (gaze) toward the screen can be determined. Therefore, a full 6 degrees of freedom can be used as the basis for interaction with the view object. E.g., if an object is approached, it can be scaled up or down to accurately reflect its 3-D position. When the viewer approaches the screen, a far-away object would not change significantly in scale, whereas a close object becomes significantly larger, resulting in a compelling 3-D perspective motion experience.

If an object is fixed relative to the display surface then it can be viewed from all different angles and perspectives simply by walking around. This particular feature alone would make this 3-D micro-projection system the ideal collaboration tool or a fantastic, novel, virtual board game. The image would very much appear to be a holographic projection.

Telepresence

A relatively small retro-reflective screen surface can be large enough for multiple people to interact with a group of people at the same time, using the same surface. Each of the viewers or participants would see other parties, and approximately life-size, through the screen in 3-D. When they look at someone they would see that person's face realistically in 3-D and when another viewer would look at the same person they would also see that person's face in 3-D but the images would be different in terms of perspective, corresponding realistically to their particular position and perspective as it would be in a real meeting. For instance if person A (he or she is an image viewed on the screen) is looking at person B (a viewer in front of the screen) then person C (another viewer also in front of the screen) would not have eye contact with person A.

A light, foldable screen, combined with miniature and lightweight projector headsets, would enable a conveniently mobile multiparty telepresence system that a can be used anywhere, even in your local corner coffee shop.

Virtual Camera Panning Enabled by a Reflecting Screen for Telepresence Applications Having realistic eye-to-eye contact is a key feature in providing a high quality conferencing experience, in fostering natural human interaction and in establishing trust.

It is highly desirable to have stereo cameras that follow and record the gaze of the speaker regardless of his or her head movements. This can be realized by shaping the screen into a spherical (or cylindrical) surface and designing the surface to be specularly reflective so that the cameras that are integrated in the head gear can record the reflection of the user's face on the screen. This can be realized by strobe-illuminating the screen with a light source that is sufficiently different from the projection primaries so as NOT to be retro-reflected, but to be specularly reflected. E.g., if the RR beads selectively reflect the primary red—at 640 nm, e.g., by a narrow band Bragg reflector coated on the beads' back surface—then an additional red illumination provided either by the same projector or by a separate illumination source (e.g., LED) at 660 nm would be specularly reflected by a separate layer in the screen (e.g., in an otherwise transparent top coating). By this method three separate illumination primaries could be added, allowing for color facial video to be captured by the cameras.

Alternatively, a head-mounted white LED strobe would flash. The strobe would be positioned away from the eyes and the recording cameras. One portion of the light of the strobe would be retro-reflected entirely within a narrow cone back to the strobe, while another portion of the light would be reflected by the screen, which then would illuminate the face, and after a second the reflection off the screen would be recorded as an image by each of the two cameras.

Furthermore, to enhance the acquisition of high quality images, the illumination could be strobed at short intervals and time-interlaced with the projector output, so as to prevent interference. The camera is quite sensitive and might be shuttered at extremely short exposures synchronized with the strobe. The additional illumination would not significantly reduce visibility of the screen.

The benefit of the above Virtual Panning Camera arrangement is that the screen can be kept inexpensive, made from easy to recycle materials, and that all electronics is kept confined to the headset, where it can be multiplexed for other functions. The head position is not constrained to the fixed camera angles, and there is no need to add a set of cameras for every party online.

A screen such as envisioned with multiple, wavelength specific, reflective properties could be printed with special inks on plain paper or some filmed, or pre-coated or optically laminated material. Glossy (specular), matte (diffusing), retro-reflective inks, and various color filtering inks are commercially available.

Consequently, this set-up would be very effective for a portable one-to-many telepresence system. Instead of a circular screen, a triptych screen with three separate views (three parties online) would be realizable with only two cameras.

Additional cameras could be added to the head gear to provide views of the right and left side of the head, or this function might be realized by using wide angle cameras.

Since CMOS cameras are tiny and inexpensive, adding cameras does not prohibitively increase the overall system weight, complexity or cost.

Ambient Light Suppression

This section describes various methods to suppress ambient light. When working in ambient light the working surface/projection surface tends to reflect that light, thereby reducing the contrast of the image. To compensate, more light needs to be projected by the projector, requiring therefore more power. This would tend to reduce the battery life of the mobile device as well as increase the cost of the projector. Therefore, a high degree of ambient light suppression is desirable. One method is to add selective absorbers to the screen that would absorb most of the daylight but not the specific wavelengths selected for the projector's primaries. Since typically the laser primaries have extremely narrow bandwidth (LED ones are slightly less narrow), only a very small fraction of the visible spectrum needs to be reflected by the screen. One method for creating such a narrow bandwidth reflector would be to coat the retro-reflective beads with selective absorbing dyes such that only the primary wavelengths are reflected. In some cases, for example, 3 types of coatings are applied to beads, which then are mixed and applied to the retro reflective surface, reflecting only specific wavelengths. Alternatively, the wavelength specific filters and reflectors can be added to the material in which the retro-reflective sphere structures are made.

Alternatively, if a geometrically structured reflector surface is used, as described previously, the same absorbers can be added to the reflector material or separate filter layers can be added on top of it. The top surface of the screen would absorb all of the light except the specific wavelengths of the primary which would be reflected by the structure.

Alternatively, eyeglasses could be constructed to reject all of the light that is not specifically of the wavelength of the primaries. These glasses would also function as regular sunglasses since most of the normal full-spectrum daylight would be significantly attenuated. Note that in such a case a high degree of privacy is ensured. The system favors a very narrow viewing angle shielding the view from others. With sufficient ambient light the projected image would be invisible for anyone not using these glasses.

Estimation of Right and Left Separation

Assume that the projectors are mounted one inch away from the respective eyes and that the separation between right and left eye is approximately 3 inches. With light reflecting from a distance of 30 inches, the angle $\theta G$ between the "good ray" (which would be the one that goes into the correct eye) and the projector is approximately 2°. The angle $\theta B$ toward the other eye ("B" as in "bad" ray; the one that would cause cross talk) is approximately 8°. So the retro-reflective surface must be designed to give a slightly diffuse retro-reflection with a cone of 3 to 5°. This angle is specified as the observation angle, and for an entrance angle between 0° and 45°. The latter angle is the angle between the screen surface and the impinging rays. See the discussion of FIG. 10, below, for additional information, as well as throughout herein.

Note that for a homogeneous image an irregular response of an angled screen (typical lower reflectivity at greater angles) can be compensated for by observing the intensity of the returning light and adjusting for it. (e.g., using a simple CMOS camera to monitor the returning image.)

Additional Cross-Talk Prevention and Compatibility with Existing 3-D Methods

In cases when the viewing distances are larger or when the retro reflective cone is not sufficiently narrow to prevent cross talk between right and left view, cross-talk can be prevented with existing means such as active shutter eyewear, or by using opposite polarization in the right and left projector, or by using a dual set of primaries with slightly different wavelengths and passive left-right discriminating filters in the eyewear.

Further, in some cases, the software can be used to actively suppress parts of the image, creating a virtually increased nose acting as a vision separator.

Switching Between 2-D and 3-D Views

The projector can also project a 2-D image. This image can be aligned to the projection surface so that both the right and left projectors project an identical image or the 2-D image may be strictly coming from one of the projectors.

E.g., when approaching a large projection surface, at some distance, objects are rendered 2-D, but as one approaches the objects are now rendered 3-D. The system would be able to detect the viewing distance and the screen distance and render the 2-D to 3-D transitions smoothly.

Field of View Specific 3-D/2-D View Adjustments

In some case where normally 3-D is not possible (e.g., in the peripheral vision far off center, there is no stereopsis) generating 3-D images would not be necessary or desirable. Therefore, with gaze tracking and taking into account the relative spatial resolution limits, the rendered images can be adjusted to and limited to 2-D in those areas.

This saves computer power; e.g., when one is not looking directly at one of the parties in a multiparty telepresence session, that party does not need to be rendered in 3-D. (See the description of FIG. 5*b*.)

An Ultra Light Version of the 3-D Stereoscopic Projector

The dual projectors can be attached to a headset, e.g., a stereophonic headset with microphone, and have two small protruding projectors. To further minimize the weight and size of the headset, the electronics power supply, serial connection, and lasers or other light sources can be packaged in a small clip-on device no bigger than a cell phone. This device would be connected to the headset via two optical fibers which transport the right and left modulated signals to the scanning mirrors. The projector on each side of the headset consists of a very small scanning mirror, typically a MEMS device of less than 1 mm with a micro lens (or micro lens array) which shines a collimated beam (or beams) on to the scanning mirror.

The Use of LEDs in a Flying Spot Projector

Instead of laser diodes primaries, colored LEDs can be used, because the high gain of the screen reduces the photon budget dramatically. While LEDs tend to be surface emitters with insufficient intensity (power per square micron), at the low power level required, the LED dimension can be kept small enough to allow their light to be collimated to a sufficiently high degree for a flying spot projector of the type described in this document. This approach can significantly reduce the cost of the system and allow the use of very small mirrors, as the energy density is not as high. When low power LEDs are small enough they can be directly coupled ("butt coupled") without lenses to the core of a fiber or a waveguide structure as part of the combiner optics guiding the light to the scanning mirrors.

Clip-on Projectors (Added to Existing Eyewear)

Since a significant proportion of the population requires corrective and/or protective eye wear, a "clip-on" option can further extend the usefulness of the proposed 3-D personal projection system. The added advantage is that this approach enables a smaller spatial offset between the pupils and the projectors, so the eyes see reflected light closer to the center of the cone of retro-reflection, where it tends to be of greater intensity. Narrowing the screen's retro-reflection cone allows for greater cross talk prevention and greater gain, lowering the power requirement to achieve the same luminosity. A dummy glasses frame can be used for people not wearing glasses.

Also, in some cases, ear buds may be part of these clip-on projectors, as well as microphones, providing 3-D sound for sending and receiving, if desired.

In some cases, a small box with a battery and a processor can be worn at the belt, for example, with a cable going to the clip-on units. This case could also contain video encoding and decoding, memory, non-volatile storage and Bluetooth or other suitable connections etc. so only basic driving signals need to go out to the clip-ons or headset, to keep the size and weight low. Alternatively to clip-ons, the projectors and cameras can be attached to a headset-like device, worn over the head, or over the neck like some headsets.

Two-Way Conferencing

By including more than just one camera, for example two cameras each on the left and right side, an image of the user's head can be gleaned and stitched together, one camera for each eye and eye-area, and one camera for each half of the mouth area, allowing to stitch together accurately a "floating head" with correct movements and eye gaze. By using cameras with uni-focus, for a desired range, no adjustment needs to be made for focus, and algorithmic calculations can be made for the retro-reflection shape and brightness distortions introduced.

DRAWINGS

FIG. 1 shows an exemplary stereoscopic projection using a retro-reflective screen, according to the system and method disclosed herein.

In FIG. 1a, viewer 100 is looking at a retro reflective screen 107. On the left side of his head is a left view projector 101, which scans the entire screen with a multicolor laser beam 103. The retro reflective screen reflects the light from beam 103 and a narrow angular cone 105. Some of the reflected light reaches the left eye 106 but none of it reaches the right eye 108. The right eye 108 can only see images projected by right view projector 102. The fully stereoscopic image is seen by the viewer.

Figure 1B:
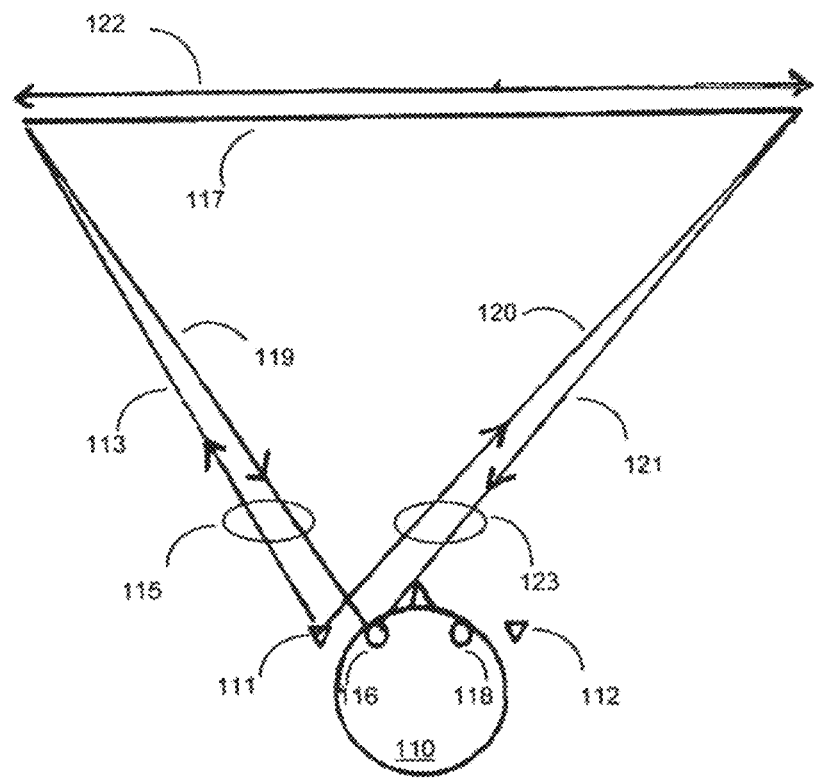

In FIG. 1b the width of view is only bounded by the extent of the screen. In every direction the reflected light from each of the projectors is restricted to a very narrow viewable cone. Viewer 110 has projectors 111 and 112 mounted on the sides of her head. Projector 111 scans a wide range on screen 117. For example, a collimated scan beam 113 reaches on the left side of the retro reflecting screen. Some of the light is reflected back (depicted as beam 119) exclusively to the viewer's left eye 116 as beam 121. Similarly, the same projector 111 can reach the right side of the screen with e.g., beam 120, reflected back to the left eye 116 as beam 121. So the left eye can see range 122, the full sweep of the projector 111. However due to the narrowness of the diffusion cones 115 and 123 created by the retro reflective screen 117, the right eye 118 does not see any of the light created by the left projector 111.

Figure 2:
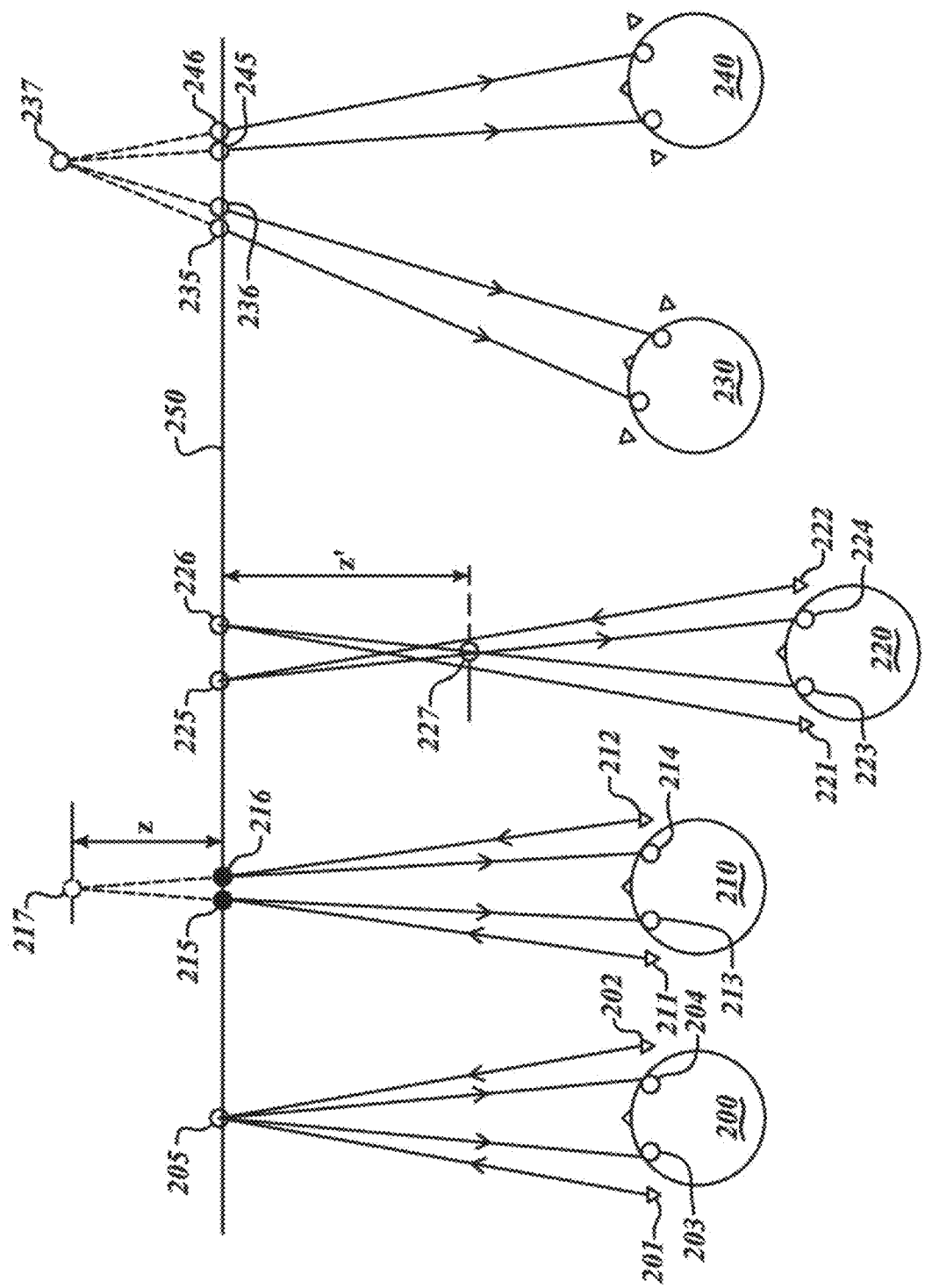
FIG. 2 shows a set of individual 3-D views rendered by stereoscopic projection on a retro-reflective screen.

FIG. 2 shows a set of individual 3-D views rendered by stereoscopic projection on a retro-reflective screen.

Five viewers are in front of one screen 250.

Viewer 200 sees an object 205 projected on the surface of screen 250. The left eye 203 sees only the image created by the left projector 201 and the right eye 204 sees only the image created by the right projector 202. Because each eye sees the object 205 in exactly the same relative position, the depth perception in this instance is the same as a non-stereoscopic projection.

Viewer 210 sees an object 217 in 3-D at a distance z behind the screen 250. The left projector 211 depicts a left view 215 of the object 217 seen by the left eye 213. The right projector 212 projects a right view 216 of object 217.

Viewer 220 sees a 3-D image of object 227 at a distance z' in front of screen 250. Note that the image of the object on the right of the screen 226 is rendered by projector 221 on the left and is seen by the left eye 223, whereas the left image on screen 225 is created by the right projector 222 and seen by the right eye 224. Two viewers 230 and 240 both see object 237 behind the screen, each seeing a full 3-D image of object 237 from their own individual perspective. Note that to create two stereoscopic images, four different images are projected on the screen: 235, 236, 245 and 246.

FIG. 3 shows examples of retro reflective surfaces formed by a corner cube embossed pattern.

FIG. 3a contains an example of a corner cube 300 shown in two dimensions only. Rays 301, 303 and 305 are retro-reflected back in the same direction they came from as rays 302, 304 and 306.

FIG. 3b contains an example of a corner cube structure 314 depicted in 3-D. Ray 310 is reflected three times at points A 311, B 312 and C 313, returning in the same direction as ray 316.

FIG. 3c shows a side view of a retro reflective structure implemented as a corner cube shaped mirror surface on the back of a transparent screen. The acceptance angle of the screen is greater than 90° because prior to retro-reflecting on the mirror structure, impinging on the top surface 321 of the structure, the rays are refracted toward the mirror at the smaller angle than the angle of incidence due to the higher index of refraction of the screen material and Snell's law.

Due to this refraction effect ray 324 is bents towards the reflector surface 320 before being retro-reflected, and returns parallel to 324 as ray 325.

FIG. 4 shows an example of retro-reflective microspheres embedded display surface.

Figure 4A:
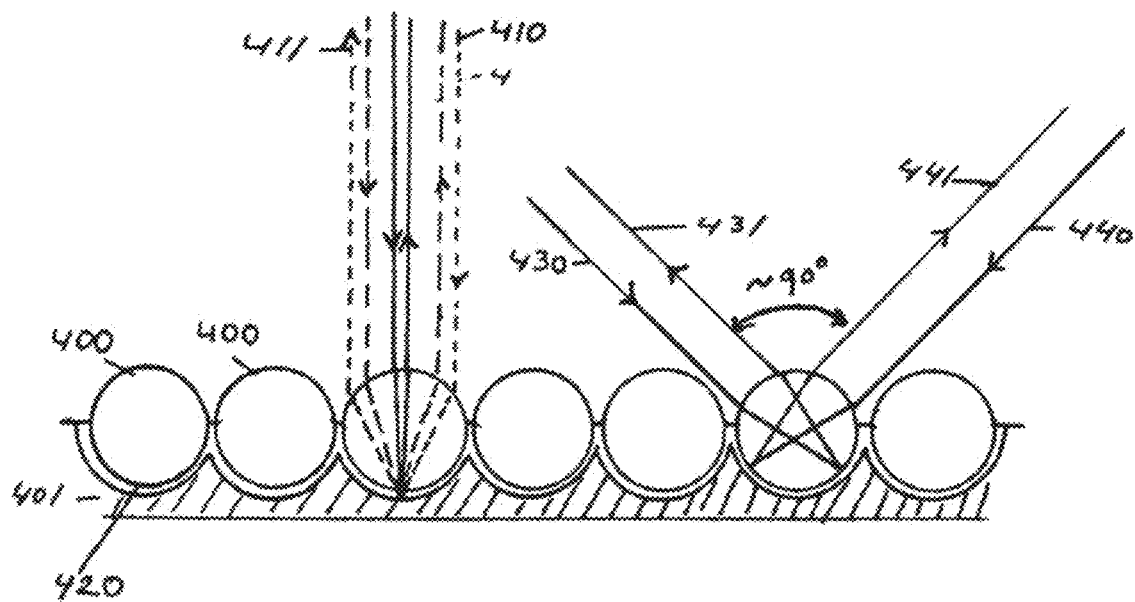
FIGS. 4A-B show an example of retro-reflective microspheres embedded display surface.

In FIG. 4a, microscopic beads 400a-n are inserted in a surface 401. The material 401 is in itself reflective, such as aluminum, silver or any other metallic surface; or (as depicted) a separate reflective layer 420 is added either onto the back of the beads or added to the surface. Ray 410 is first refracted into the glass bead toward the center in the back of the sphere, then reflected on the mirror surface 420 and exits the bead in the same direction that it came as ray 411. Similarly rays 430 and 440 are retro reflected back as rays 431 and 441. It is shown that the acceptance angle of such a display surface is approximately 90°.

Figure 4B:
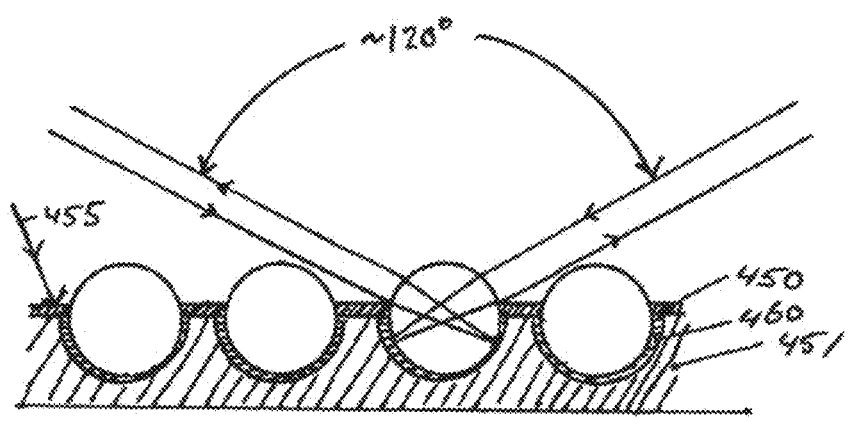

If the beads are not as closely spaced (as shown in FIG. 4b) less of the light is reflected back, and more is absorbed by the surface, but the acceptance angle 457 of the screen would be somewhat wider (up to 120°, as shown). There is a trade-off between the width of the acceptance angle and the total reflectivity (the gain) of the screen. An extra absorption coating 450 is added to the screen material 451, to absorb any light 455 that does not get retro reflected by the beads. Optionally an additional reflective layer 460 undercoating the beads can be added. This layer 460 might be selectively reflective only at specific wavelengths so as only to reflect the projectors narrowband primary colors as described elsewhere.

FIG. 5 shows examples of using stereoscopic projection to implement a telepresence multiparty video interface with good 3D eye to eye alignment.

Figure 5A:
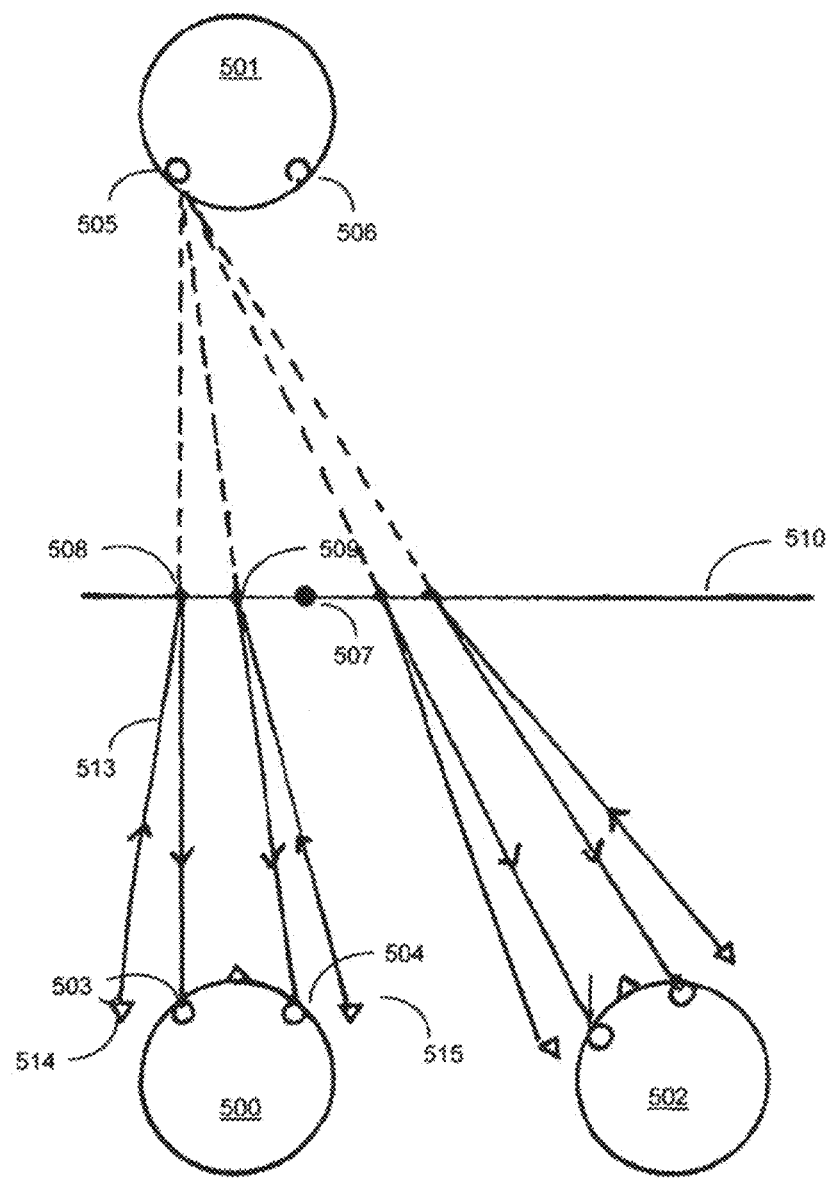
FIGS. 5A-D show examples using stereoscopic projection to implement a telepresence multiparty video interface with good 3-D eye to eye alignment.

In FIG. 5a viewer 500 is looking at a retro-reflective screen 510. On the screen he sees the other party 501 in the form of a stereoscopic image projected by projectors 514 and 515. Projector 514 generates a scanning beam 513. When the beam 513 arrives at position 508 it creates the image of the eye 505 of party 501 as seen by the left eye 503 of viewer 500. Viewer 500 thus has direct eye contact with party 501 because the eyes 503 and 505 are precisely aligned. Simultaneously projector 515 projects the right eye image of 505 at position 509, separate from position 508, so that the right eye 505 of party 501 is in exactly the correct 3-D perspective. Projector 515 also projects the left eye 506 of party 501 at a position (not shown) so that the left eye 506 of party 501 and the right eye 504 of party 500 are correctly aligned with one another. Note that a second observer 502 does not have eye contact with party 501, but sees his face in a realistic 3-D perspective looking away from her. Observer 502 therefore knows that party 501 is addressing viewer 500, not her, as she would be able to naturally observe in a real meeting. Four separate images are generated and projected on the same screen at the same time and seen as two stereoscopic 3-D images without glasses. The total power required to create these four views with the four scanning laser projectors is minimized, because to render each view the laser projectors only have to generate sufficient photons to image a single small object in an exceedingly narrow field of view (face to face, eye to eye). Optionally, the background can remain dark, and because it's the retro-reflective nature, the entire screen reflection is directed at the narrow cone seen only by each eye. Cameras embedded in the screen ensure eye contact. Cameras, either monocular or binocular, may be embedded in the screen at fixed positions, and images of parties in the conference can be lined up with these cameras to ensure good eye contact. In the case of binocular view, the stereo camera positioned in the screen roughly aligns with the position of each eye; in the monocular case the camera would be positioned between the eyes.

Figure 5B:
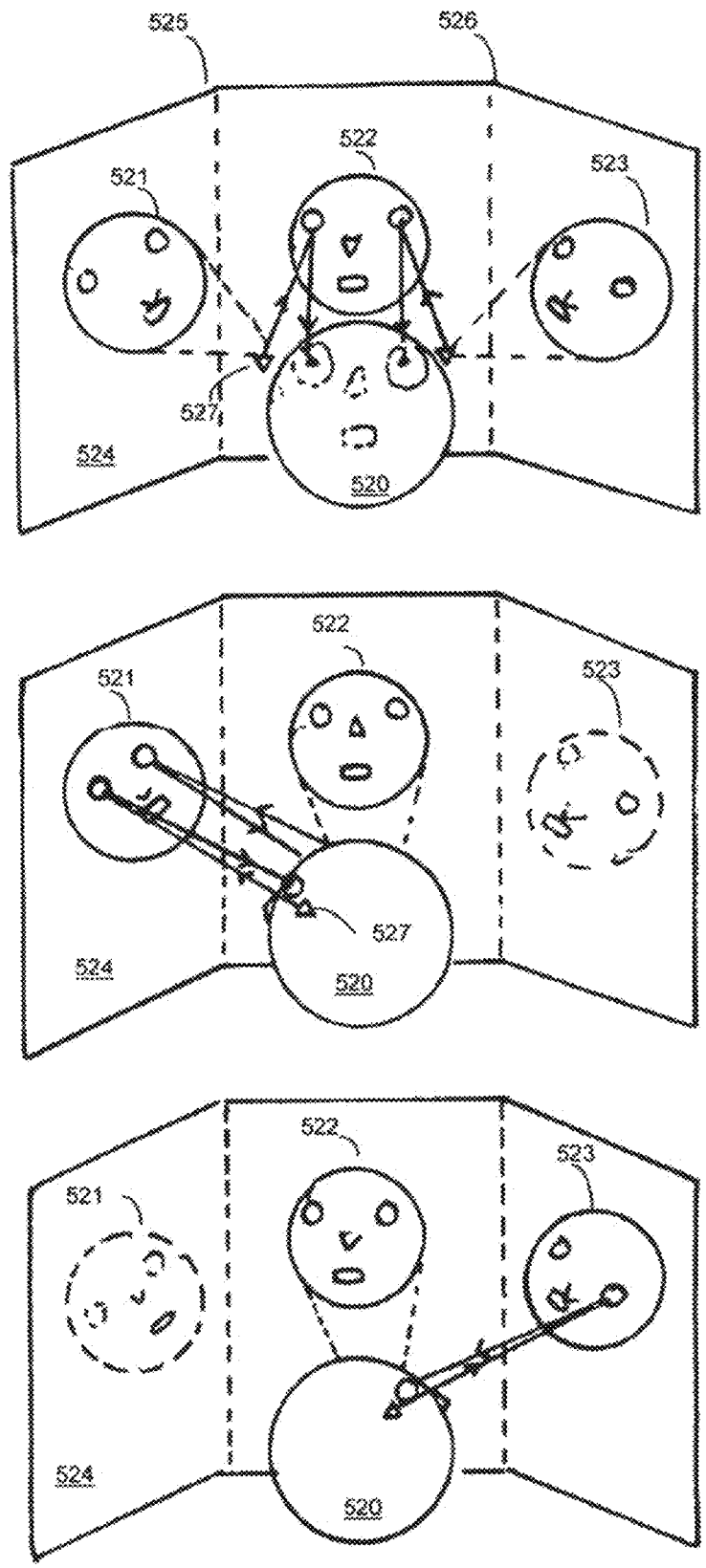

FIG. 5b shows a person 520 having a telepresence session with a folded screen. The screen 524 is folded in a triptych manner with two folds 525 and 526.

In the upper diagram, when person 520 looks straight ahead at person C in the center panel, the projectors render images of persons B, C and C on the three panels. Image B is rendered only by his left projector 527. Image C is rendered by both projectors in 3-D, and image D is rendered only by his right projector.

In the center diagram, when person A looks at the image of person B, person D is outside the field of view of person A and does not need to be rendered.

In the lower diagram, similarly, when person A turns to person D on his right, person B is not seen, and person C can only be seen in his left field of view in 2-D.

Figure 5C:
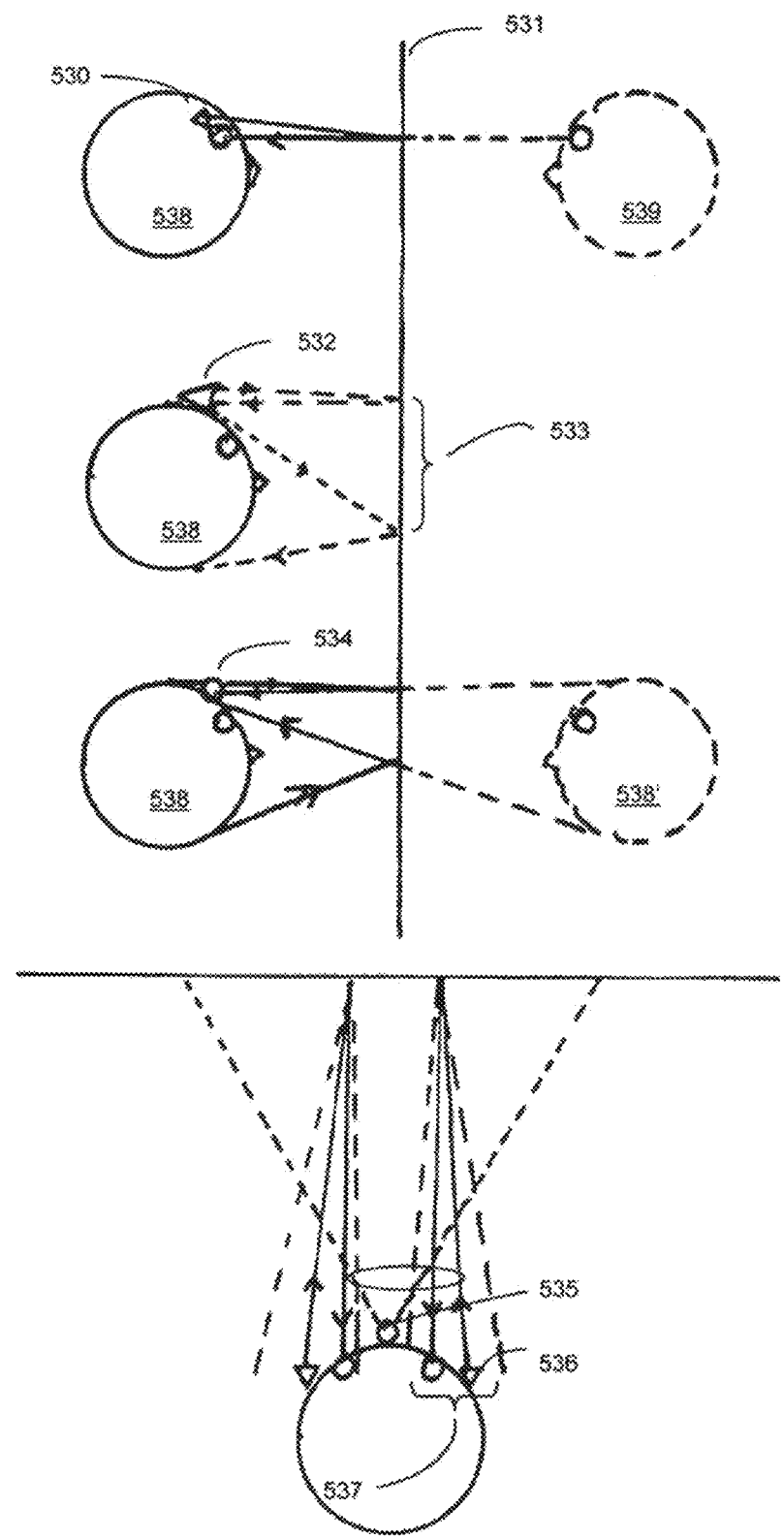

In FIG. 5c, stroboscopic projection and illumination multiplex the cameras and the display. In the top side view, projector 530 projects an image of party 538 on the screen 531. The viewer 538 looks directly at party 539 and has eye contact.

In the center side view, a strobed illumination source 532 illuminates the screen area 533 faced by party 538. The light diffusely reflects off the face of party 538.

In the lower side view, the camera 534 captures an image 538' of the face of party 538, specularly reflected in the screen (the screen acting as a mirror). The strobe light illuminates the face only during dark intervals of the projector. The additional light source might be built into the screen, e.g., in the perimeter to stroboscopically illuminate the face of the viewer, or alternatively the projector could generate a very short burst of white light (RGB) synchronously with the opening of the shutter in the camera.

The top view, at the bottom of FIG. 5c, shows an alternative approach, wherein the camera 533 (or dual cameras) can be placed just outside the retro-reflective cone 535 of projector 534, so the camera is not blinded by the projector's light.

Figure 5D:
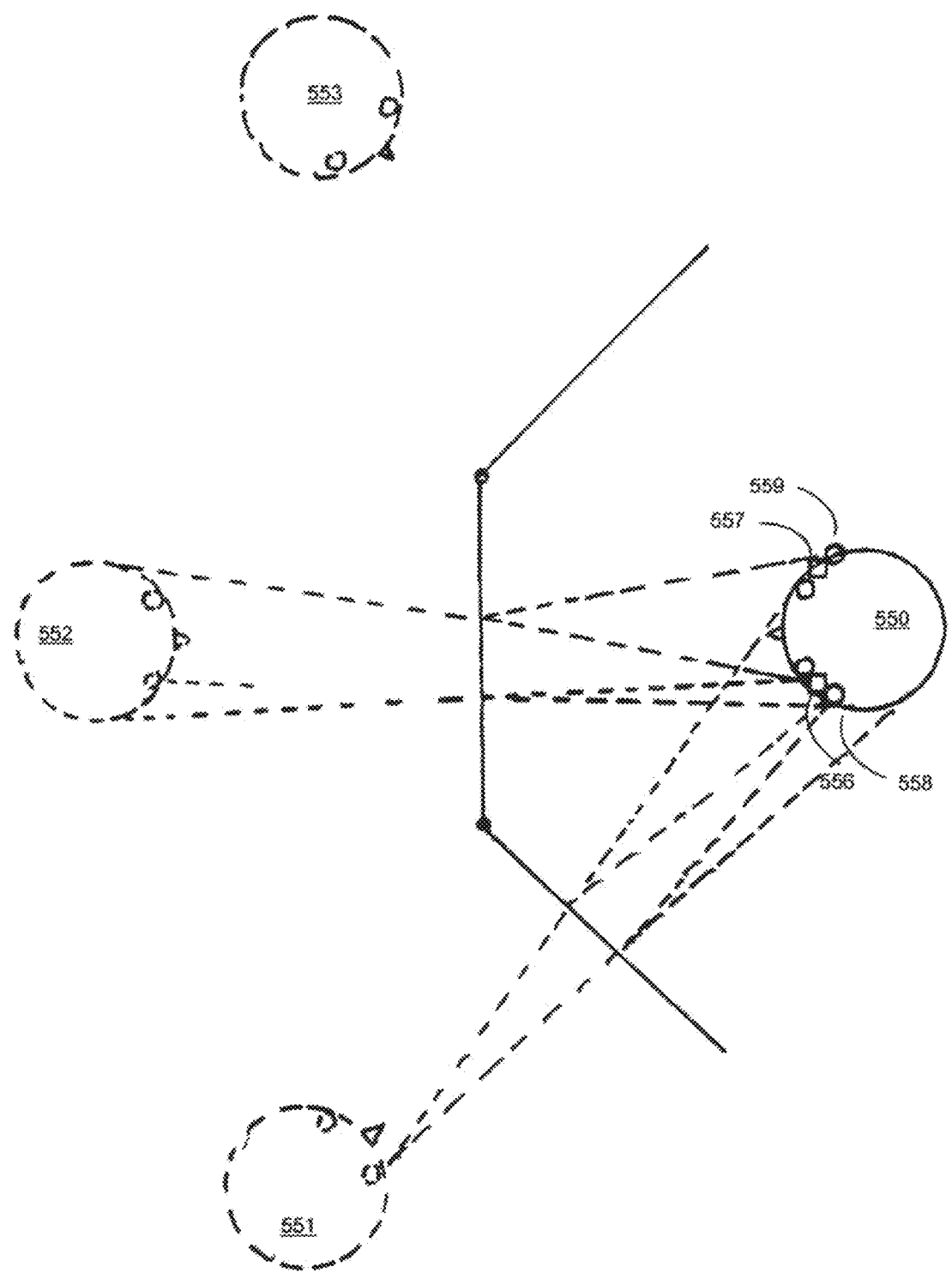

FIG. 5d shows a virtual panning camera arrangement for a four-party telepresence. A viewer 550 views three parties 551, 552, 553 on a three-segment screen (triptych screen) in a virtual panorama. Viewer 550 is facing party 552 directly, and they have eye contact. A forward-looking camera 556 (on the left side of the head of party 550) records facial view of party 550 as specularly reflected in the screen, with the screen acting as a mirror. This image is projected for party 552, to be seen for his right eye (after reversing back the image so it is not a mirror view of party 550). The screen in this example might be a combination, such as a two-layer lamination, of two different reflection surfaces. One layer would be a partial specular (mirror) surface for self recording and another would be a retro reflecting surface for image projection. For example, the cameras capture the images as specularly reflected in a partial mirror surface on a backside of the screen, such as the normal-spectrum light from the viewer's face. The projector light, on the other hand, is retro reflected by structures described elsewhere, and here placed behind the partial mirror (which is not or considerably less reflective to the projection lights wavelengths), in some cases, for example, by a retro reflecting surface that is specific to a narrow wavelength, and as such tuned to intercept (selectively reflected) and retro reflect only the narrow laser light from projector's primaries. In some cases a reverse order might be employed.

Another camera 558 mounted on the head of party 550 records the reflected image of the side of his head, to be seen by party 551. Similarly cameras 557 and 559 on the right side of the head of party 550 record the left eye view of party 552 of party 550's view and party 553's view of the right side of party 550's head. Each of the other three parties has the correct view of party 550. When party 550 turns his head to another party, these views change correctly as if they were sitting in these actual positions facing each other.

Figure 6A:
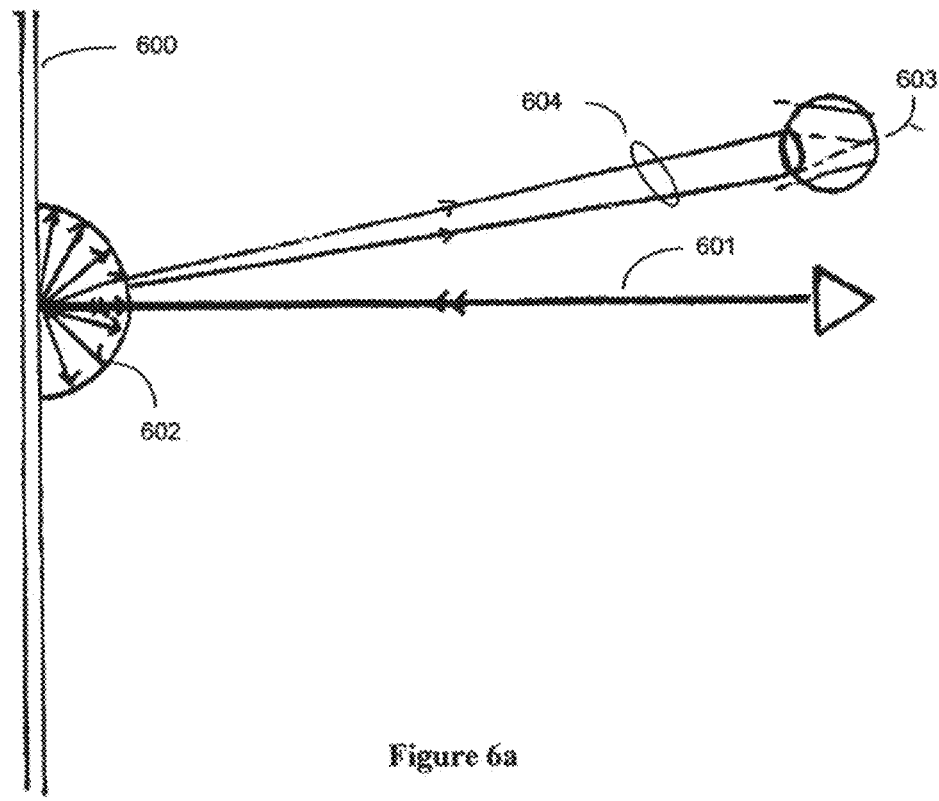
FIGS. 6A-B show an example of the power savings achievable with a fully retro reflective surface.
Figure 6B:
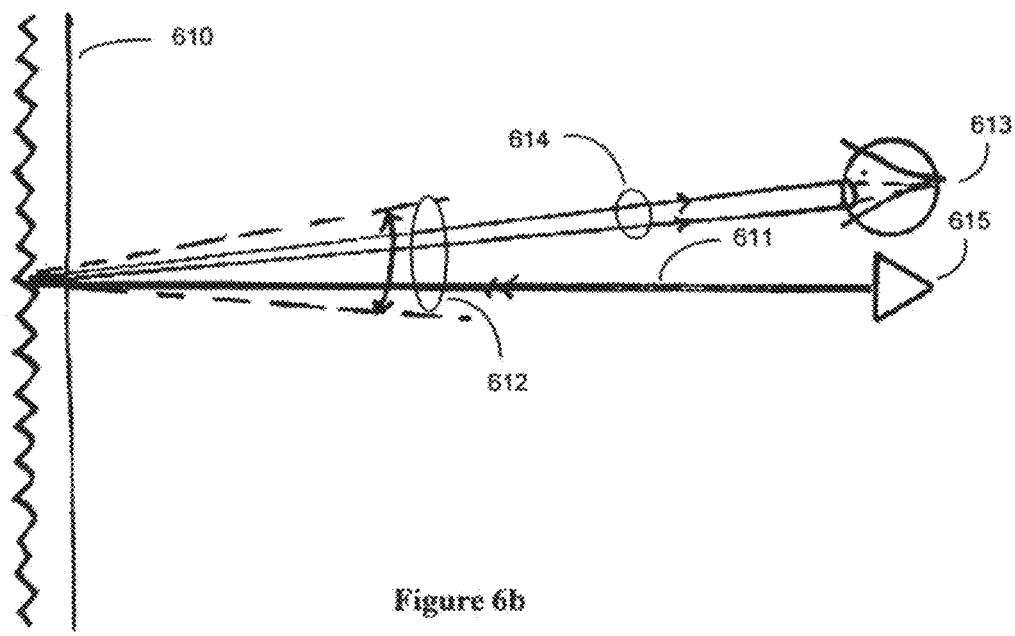

FIG. 6 shows an example of the power savings achievable with a fully retro reflective surface. FIGS. 6a and 6b show a comparison of a normal projection screen with a retro-reflective screen.

FIG. 6a shows a normal screen 600. On such a screen, an incoming light beam 601, such as produced by a laser projector, reflects diffusely in a hemispherical shape 602. Such a diffuse reflection is called a lambertian reflection. The wide cone, spread in 180 degrees, subtends a solid angle of $2\pi$ or 6.28 sr (steradian). Thus an observer 603 sees only a very small fraction 604 of the overall reflected photons.

As shown in FIG. 6b, when a retro-reflective screen 610 is used, a beam 611 is reflected in a very narrow cone 612. The cone 612 with a cone angle of a would subtend a solid angle of $2\pi(1-\cos\alpha)$. For example, for $\alpha=10°$ then the solid angle is 0.095 sr, which is only 1.5 percent of the solid angle of a hemisphere.

In this case a significantly greater proportion 614 of the photons are reflected back directly at the eye 613 of the observer in close vicinity of projector 615. Therefore a retro reflective screen can be said to have a very high gain, thus requiring less projection power to create the equivalent luminous response as compared to a normal projection screen.

As an example: if the reflected light cone subtends an angle of 10° then geometrically the image appears more than 50 times brighter than if it was projected on a so-called standard lambertian surface: a surface-diffusing the light in a 180° hemisphere. It follows that if such a narrow reflection angle can be achieved, a very considerable amount of power can be saved and consequently even 3-D projection is feasible using a very small diode laser source, as it has sufficient illumination power. (Alternatively standard LEDs coupled into fibers would provide sufficient power also, where greater coupling losses would be offset by the greater efficiency of LEDs.)

FIG. 7 shows an exemplary situation wherein the system and method disclosed herein may be implemented for a restricted number of viewers.

Figure 7A:
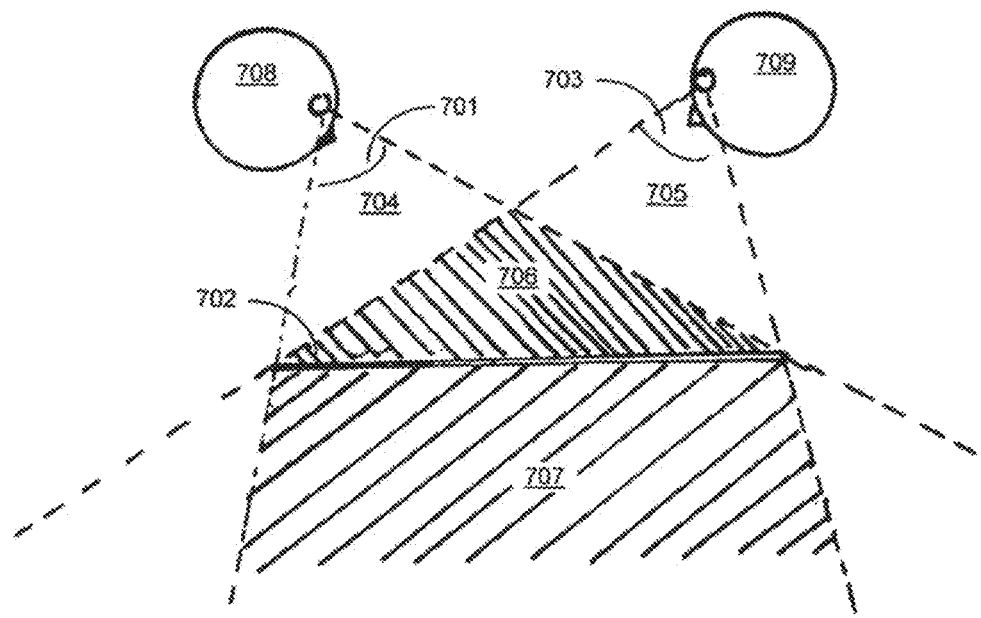
FIGS. 7A-D shows examples of viewing virtual images for a restricted number of viewers.

In FIG. 7a, while playing a board game on a flat surface 702, player 708 has a view 701 of the surface 702. Player 709 has a view 703 of the same surface. 3-D images placed in view space 704 are exclusively visible to player 708, similarly 3-D images in view space 705 are exclusively viewable to player 709. An example would be virtual objects manipulated by their hands in the spaces. Only objects placed in view space 706 can be shared, if so desired, but they also may be rendered exclusively viewable. In this drawing the projectors are not shown for objects to be shown to both viewers. The image data have to be shared by some means accessible to both projection systems, for instance an Internet accessible application.

Figure 7B:
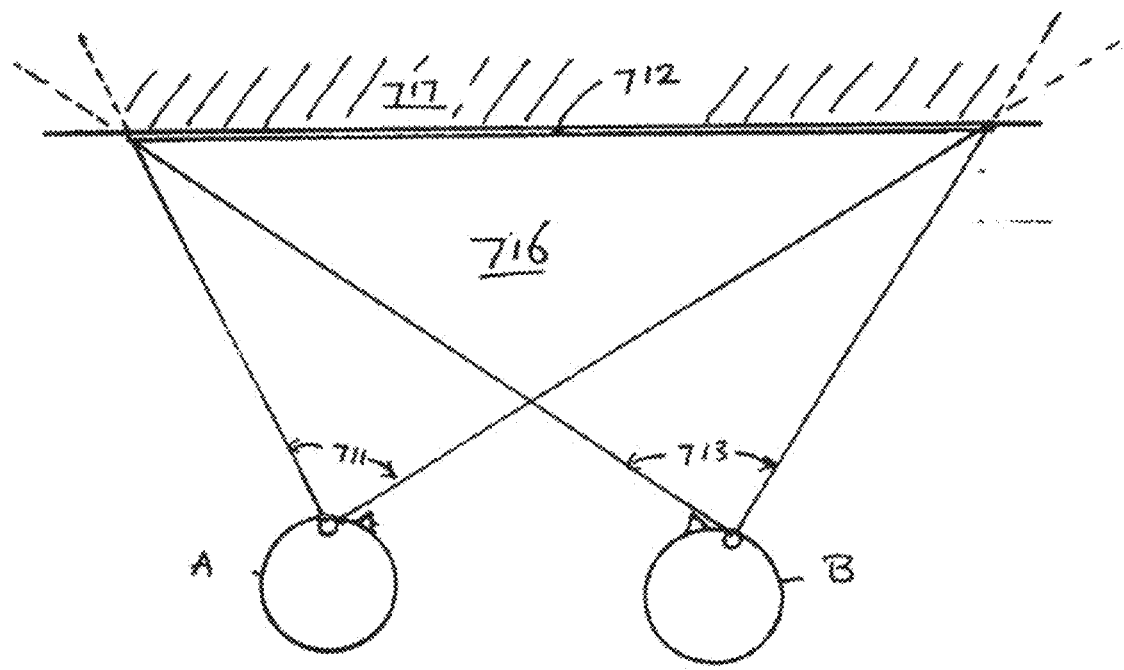

In FIG. 7b, the screen 712 is mounted "planetarium style" on a surface above both viewers. Viewer A sees images projected by his headset (not shown) in a cone shaped field of view 711. Viewer B sees a cone shaped field of view 713. The two cones intersect, forming the boundaries of shared field of view volume 716 in which A and B can share 3-D views. This shared view space expends to infinity behind the screen in volume 717. The screen 712 need not be flat. Its retro-reflecting surface may be of any shape, angular or smoothly curved, such as, for example, a concave dome shape as in a planetarium.

Figure 7C:
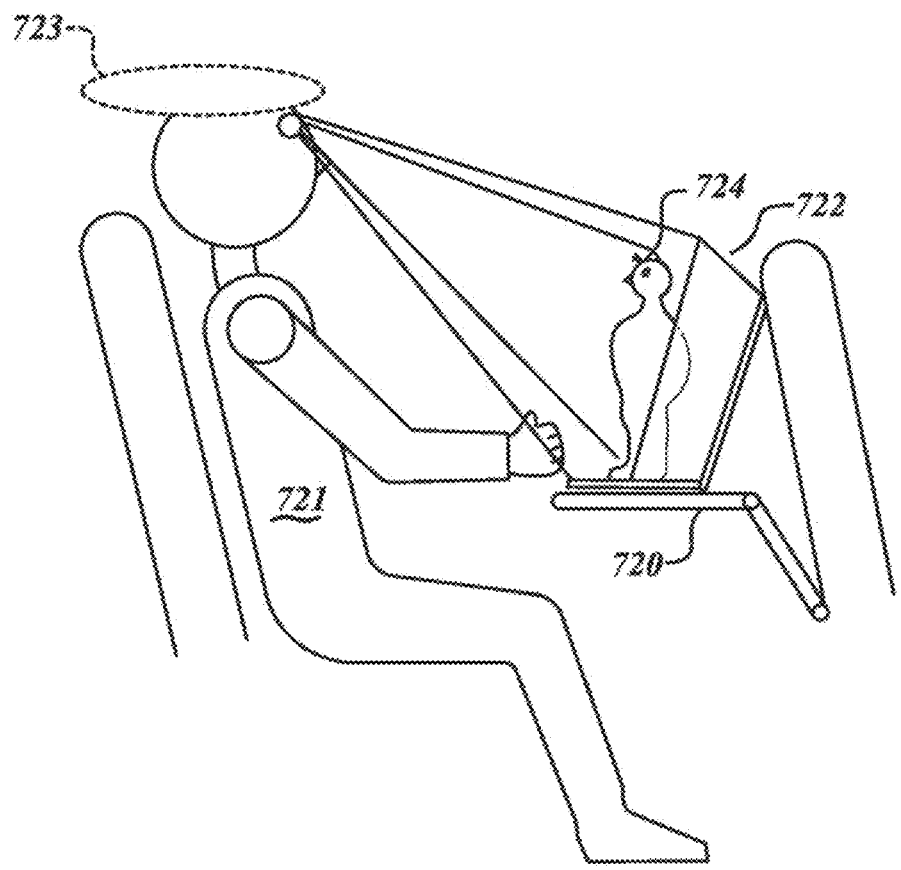
Figure 7D:
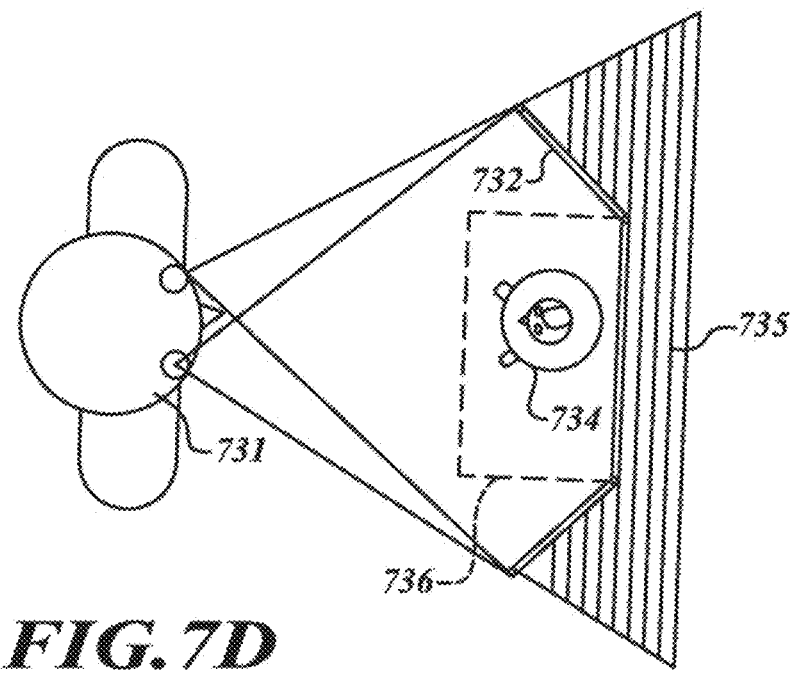

FIG. 7c shows an airplane passenger viewing entertainment on a personal portable foldable screen or tray table 720. Passenger 721 is viewing a 3-D movie on a triptych retro-reflective screen 722. Despite its compact size, the screen's concave shape extends widely across his field of view and allows for ample head motion while observing in the 3-D images, such as the animated 3-D character 724. Due to the narrow view angle of the returning light this movie and any images on the screen are exclusive to passenger 721 and cannot be seen by other passengers or a flight attendant coming by. If desired, a hat 723 provides additional privacy by creating a "dark halo" around his head.

In FIG. 7c the top view of the same arrangement shown in FIG. 7b clearly shows that the triptych retro-reflective screen guarantees a "for your eyes only" view to passenger 731. Optionally, the tray table surface 736 may also be part of the projection surface. Note again that any 3-D images can be rendered not only in front but also anywhere behind these surfaces, such as, for example, in the space 735. These 3-D view spaces visually extend to infinity.

FIG. 8 gives examples of the use of selective absorption filters or selective reflectors to suppress ambient light and increase image contrast in the field of view.

FIG. 8a shows a sphere 800 embedded in a reflector material 805. The sphere is covered with a coating 801 which slightly defuses the ray 806. This ray passes twice through this layer. Optionally the material 805 is coated with an absorber material 804.

FIG. 8b shows a sphere 810 coated with a Bragg reflection coating 811.

FIG. 8c shows that after the sphere is embedded in the absorbing material 815, the exposed surface covered with the Bragg reflector material 812 is etched to remove that material, exposing the sphere, which is transparent. Ambient light such as ray 813, after entering the sphere, is not reflected and is absorbed in the absorption layer 815; whereas a primary ray such as 814 is reflected by the Bragg reflector, which is tuned to reflect this wavelength only.

Figure 8D:
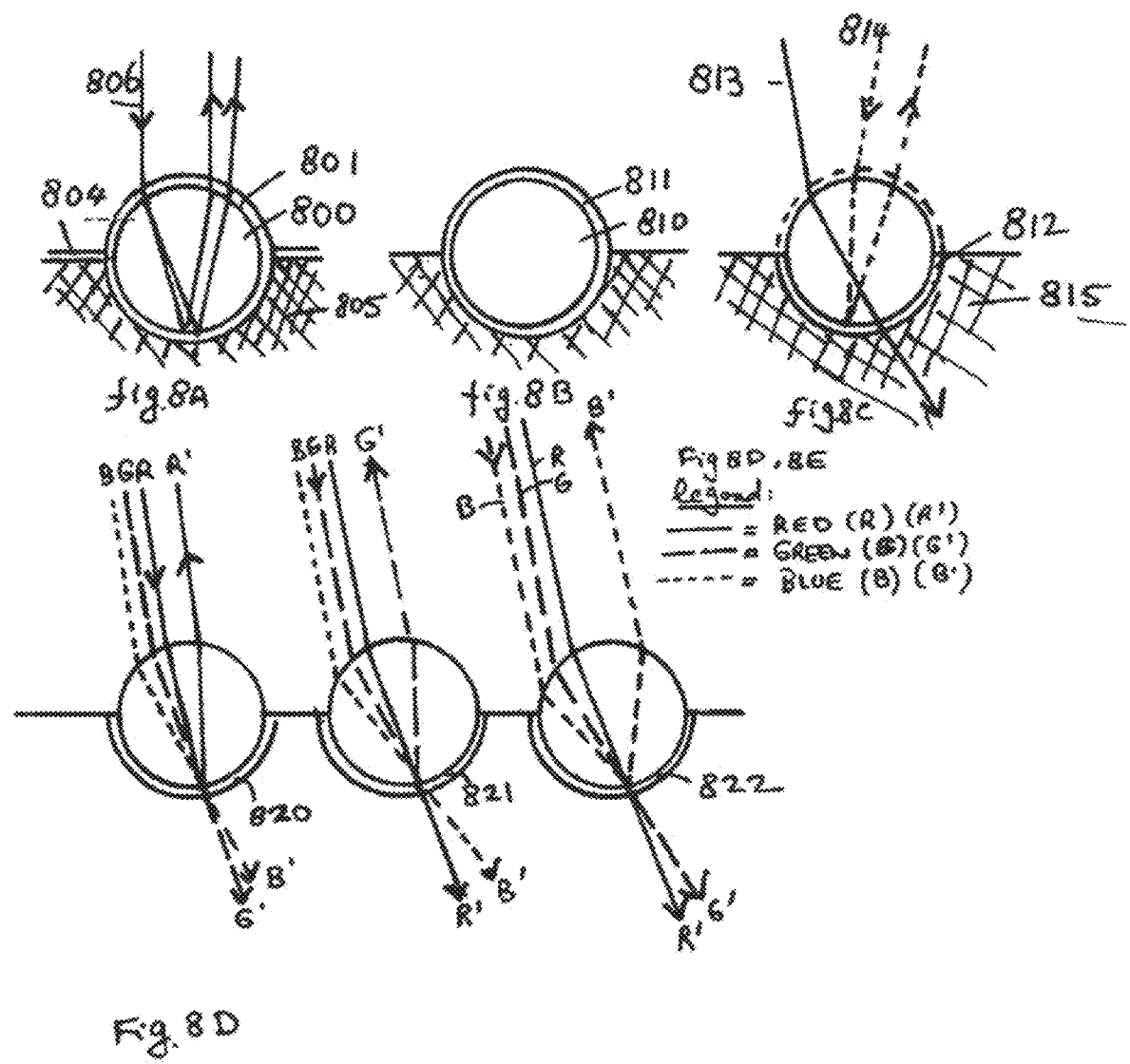

FIG. 8d shows the effects when multiple color selective retro-reflecting beads are mixed into one screen surface. Bundles of red (R and R'), green (G and G'), and blue (B and B') rays impinge on three spherical reflectors 820, 821, and 822, each of which have been coated to selectively reflect one of the primary wavelengths.

Figures 8E, 8F:
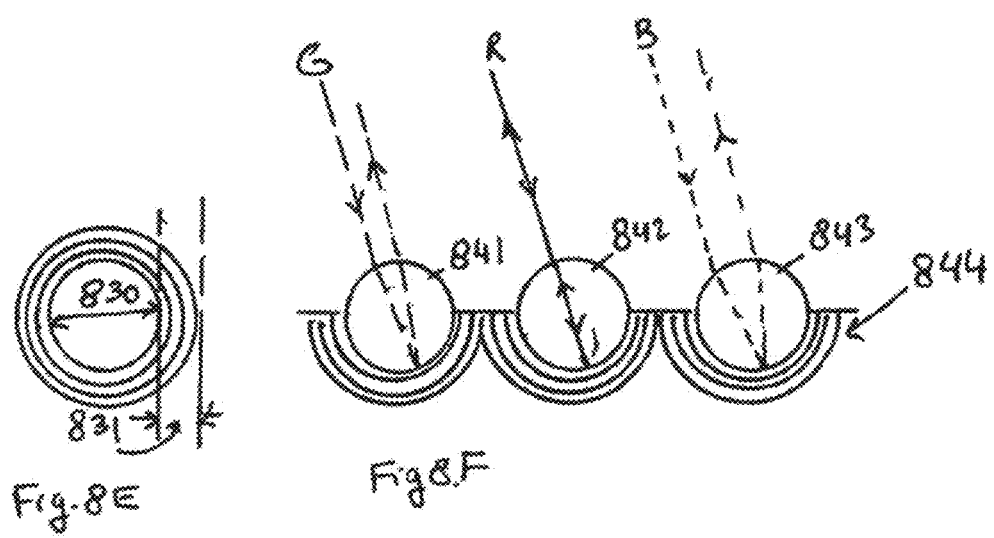

FIG. 8e shows that alternatively, spheres might be coated with Bragg type multiplayer reflectors that reflect a combination of the specific primary wavelengths. In reality these multilayer periodic Bragg reflector coatings are very thin, with a thickness 831 in the order of microns, whereas the spheres' diameter 830 might be between 100 microns to 800 microns.

In FIG. 8f, multiple retro-reflecting layers tuned to reflect each of the three or more primaries are coated on the spheres so that all of the primaries would be reflected by each sphere. Three such coated spheres 841, 842, and 843 are embedded in the surface 844, with the exposed top coating surface removed by, for example, etching. These spheres reflect all three primary wavelengths (R, G and B). Note that the coating on these spheres lets the other wavelengths pass through. That is, most of the ambient light spectrum is not reflected, but rather, it is absorbed in the layer below (absorption not depicted her, but shown previously in FIG. 8c).

FIG. 9 shows examples of the use of fiducial markers in the screen.

Figure 9A:
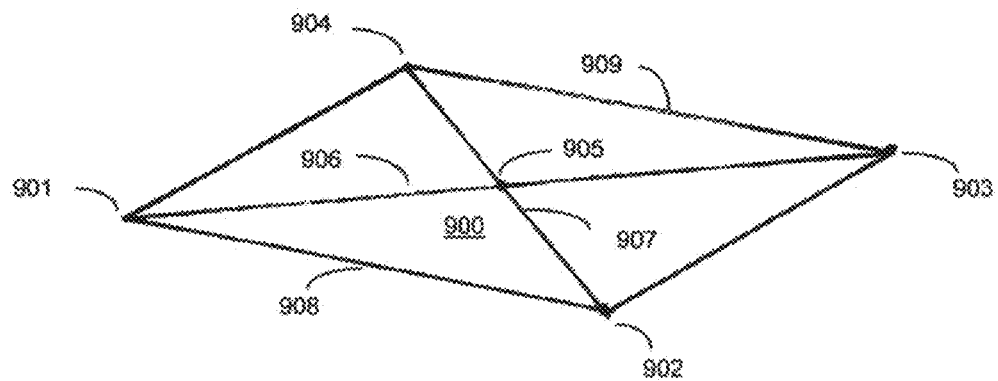
FIGS. 9A-C show examples of the use of fiducial markers in the screen to determine the projector and the observer's viewpoint with response to the screen.

In FIG. 9a, a rectangular screen 900 is depicted as viewed by a projector camera 920 (shown in FIG. 9b) positioned on an observer's head. Corners 901, 902, 903 and 904 have fiducial marks or are simply located at the polygonal 4 corners of the retro-reflective structure. The center 905 of the screen 900 is defined by the intersection of diagonals 906 and 907. Since the dimensions of the screen are known in advance, this is more than sufficient information to precisely determine in 3-D space the head position and orientation—in six degrees of freedom—vis-a-vis the surface of the screen and any location within the screen, or relative to the screen in view.

Figure 9B:
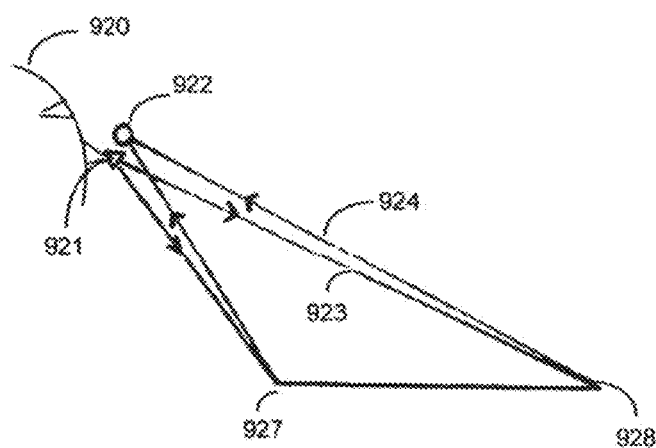

FIG. 9b shows a side view in which observer 920 is looking at the screen with corners 927 and 928. Projector 921 sends a beam 923 that reflects on corner fiducial 928, reflecting back beam 924 to cameras 922.

Figure 9C:
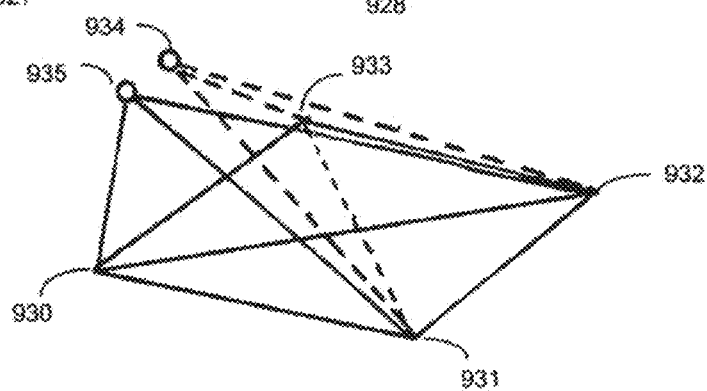

FIG. 9c shows a stereoscopic view of four fiducial markings 930, 931, 932 and 933. The right camera 934 and left camera 935 each locate at least three of the four fiducials. Each camera can determine its own spatial position. Any objects scanned and detected by both cameras, whose positions can be estimated by means of 3-D stereoscopic perspective calculations, can now be located in a global coordinate system referenced in relation to the same fiducials.

Figure 10:
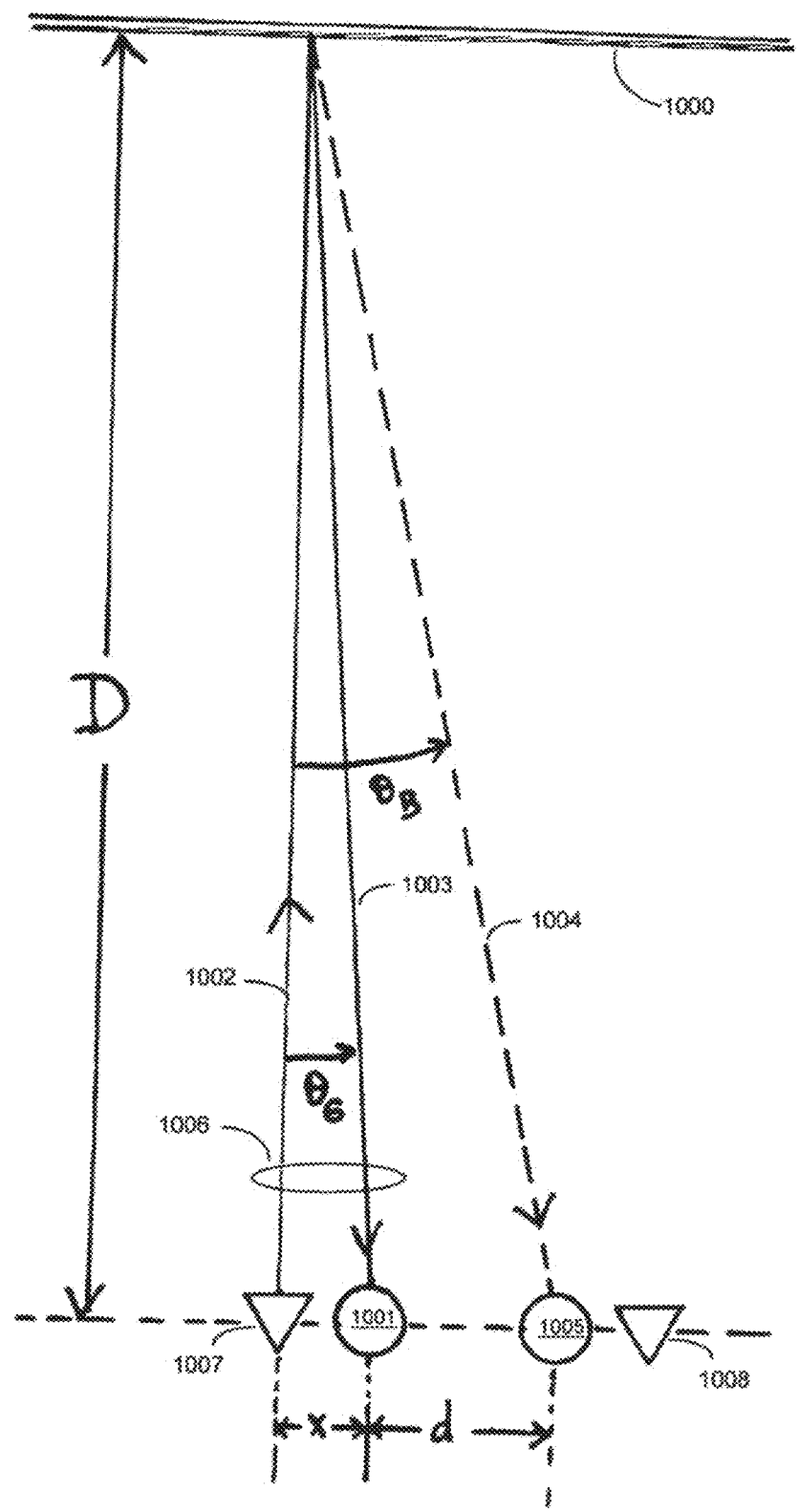
FIG. 10 shows retro reflective diffusion cone angle range requirements.

FIG. 10 shows retro reflective diffusion cone angle range requirements.

To obtain an estimation of right and left angular separation of view, assume that projectors 1007 and 1008 are mounted one inch away from the respective left and right eyes 1001 and 1005, and that the separation d between the eyes is approximately 3 inches. The light from the left projector 1007 is reflecting on a retro-reflective surface 1000 at a distance D of 24 inches. The angle θG between the "good" ray 1003—which would be the one that goes into the correct eye 1000—and beam 1002 from the projector is approximately 2°. The angle θB toward the other eye (as in "bad" ray, the one that would cause cross talk) is approximately 7°. So the retro-reflective surface must be designed to give a slightly diffuse but sufficient retro-reflection with a cone of 3° to 5°. This angle is specified as the observation angle. The screen should reflect this narrow cone for any entrance angle (ideally) between 0° and 45°. The entrance angle is the angle between the screen surface and the impinging rays.

FIG. 11 shows examples of multiplayer games and 3-D interaction surfaces. Multiple participants each approach the retro-reflective screen surface. Their headsets determine their relative position with respect to the surface and generate perspective-correct 3-D images of the scene to be viewed. Note that normally participants would be collaborating and they therefore would share the same view. However, it is possible for both parties to have a view that is partially shared and partially separate, e.g., if a card game was played or a board game, some of the view would be jointly viewable by all, and some of the view would be private for each viewer to allow them to see cards or keep track of certain things in their field of view that would not be shared with other players, as also shown in FIG. 7a.

Figure 11A:
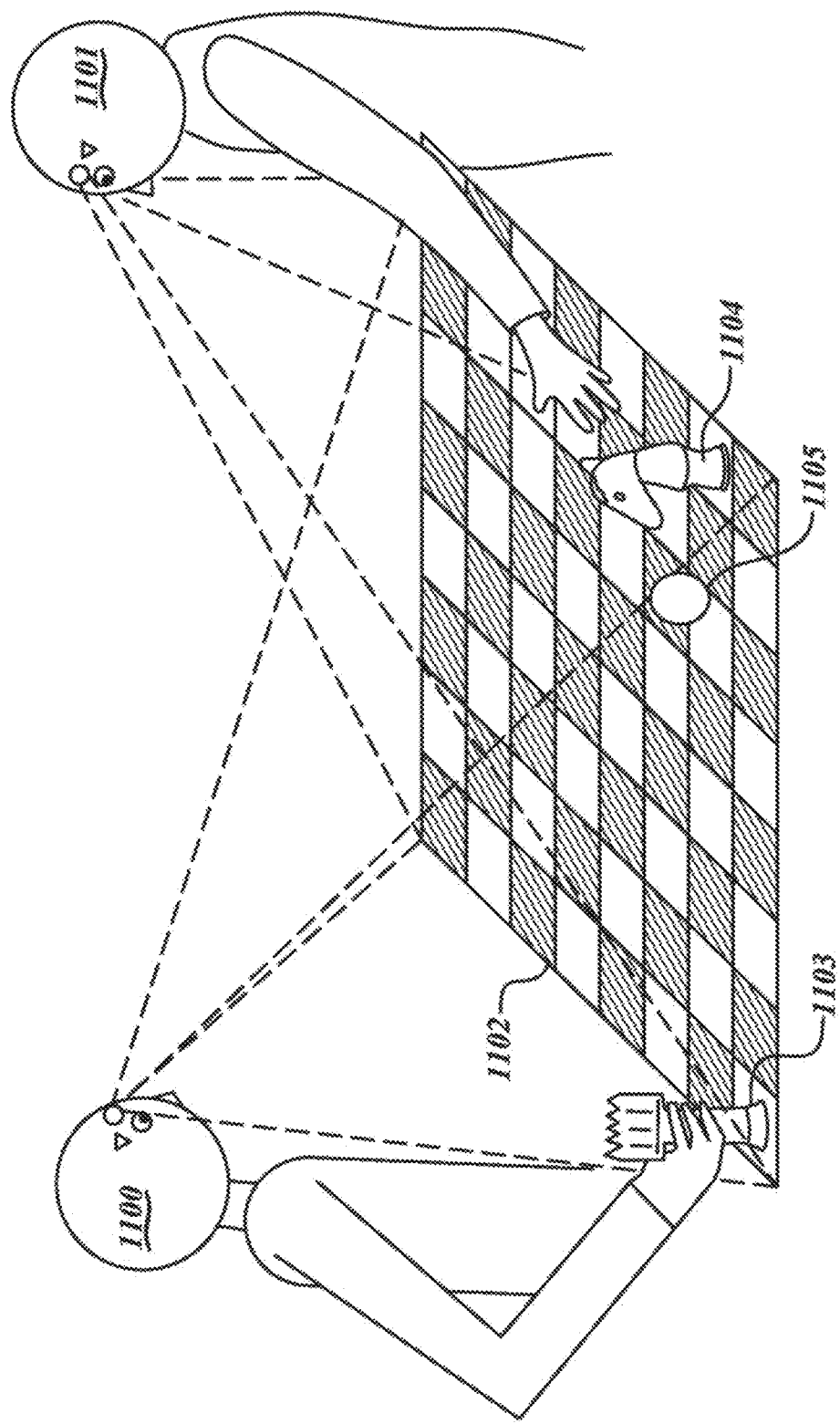

FIG. 11a: Chess Action™. A 3-D chess game where player 1100 and 1101 moves piece on a retro-reflective play surface 1102. Each player sees the chess pieces 1104a-n, of which pieces 1104a and 1104b are shown in this Figure, in 3-D, from his or her side. The virtual chess pieces are moved by hand. Pieces may come to life when "touched" and complete their own move. For instance, when touched, the knight 1104 may gallop to a new open position 1105 as intended. The projectors (not shown) of each player can render a full 3-D view of everything on, below or above the surface. Normally the 2-D chess board would be positioned on the surface. However it is possible to envision multiple boards and vertical chess moves as imagined a long time ago in Star Trek as "tri-dimensional" chess.

Figure 11B:
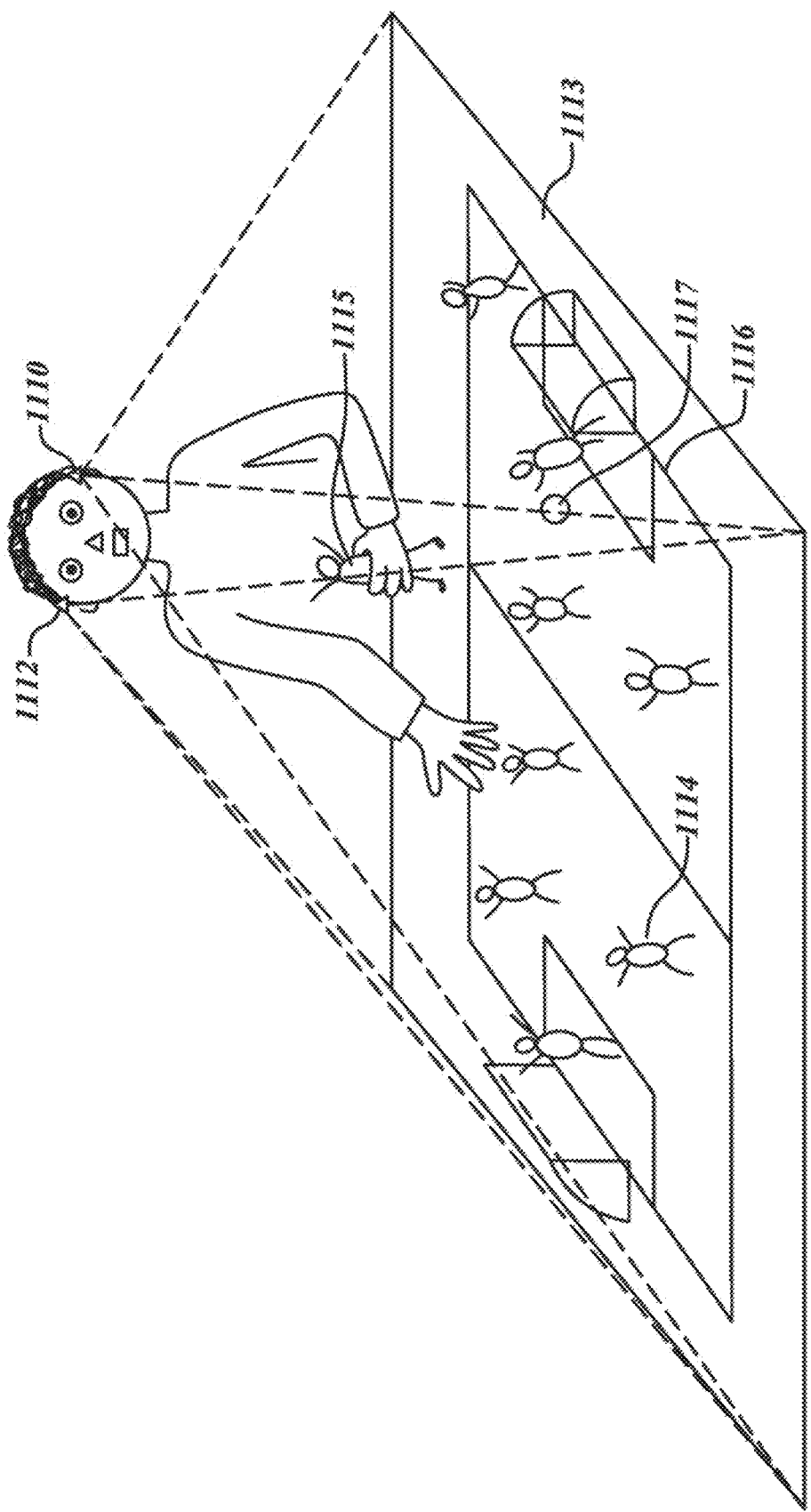

FIG. 11b: Gulliver's Soccer™ (or baseball, etc). A soccer field 1116 is projected onto a retro-reflective surface 1113. The players (such as 1114) move realistically in full 3-D. All 3-D imaging is rendered simultaneously and in real time by the viewer's dual headset projectors 1110 and 1112. The viewers can choose to watch from different sides of the game as if in the stadium around the field. Each viewer has a full 3-D view of the action on the turf. The projection surface 1113 needs to be slightly larger than the field. The retro-reflective mat laid down on a coffee table would do the job. With fiducials embedded in that screen viewers can walk around the field. If they come closer they get a close-up, and as they walk around the field they get different camera views in 3-D. This set-up can be applied both to real-life action games as well as simulated games rendered by 3-D graphics engines or a combination of the two. Optionally the observer may interact with the game in progress by adding players from the sidelines (such depicted as 1115) or by manipulating the ball 1117 with hands or special user interface devices described elsewhere in the application.

FIG. 11c: Crystal Ball™. A crystal ball 1120 appears above a flat table-like surface consisting of a retro-reflective screen 1128. People 1122a-n, of whom 1122a and 1122b are shown here, arranged around the surface see 3-D images appear in the crystal ball, as in a séance with a soothsayer. Note that four images 1123a-d of the crystal ball are rendered on the projection surface. (In this drawing only three projectors 1129, 1130, and 1131 are shown.)

Figure lid: Magic Chopsticks™. In the black-and-white film classic "Musashi" the hero, played by the famous actor Toshiro Mifune, catches a fly 1140 in mid-air with his chopsticks, thereby demonstrating his supremacy as a swordsman and avoiding the unnecessary slaughter of a drunken trouble maker at the inn where he is staying. This is a seminal scene in this very famous movie. Magic Chopsticks™ are embedded with retro-reflectors and special fiducial markers so they can be projected upon (become part of the screen) and also easily tracked in 3-D (further described in the discussion of FIG. 11e). These embedded retro-reflectors may optionally be made not retro-reflective but opaque for infrared, allowing them to be tracked invisibly. The chopsticks and other objects may also be located and tracked in 3-D simply by the dual shadows they leave in the retro reflective image. For example, a user working above retroreflective surface 1146, as depicted, a chopstick 1141 is simultaneously scanned by a left projection beam 1145 and a right projection beam 1144, leaving shadows 1142 and 1143, respectively, on the retro reflective surface. Here it is assumed that the location of the screen in the field of view has been previously accurately determined, for instance by fiducial markers embedded in the screen or simply by noting the corners and the rectangle's geometric distortion.

Figure 11E:
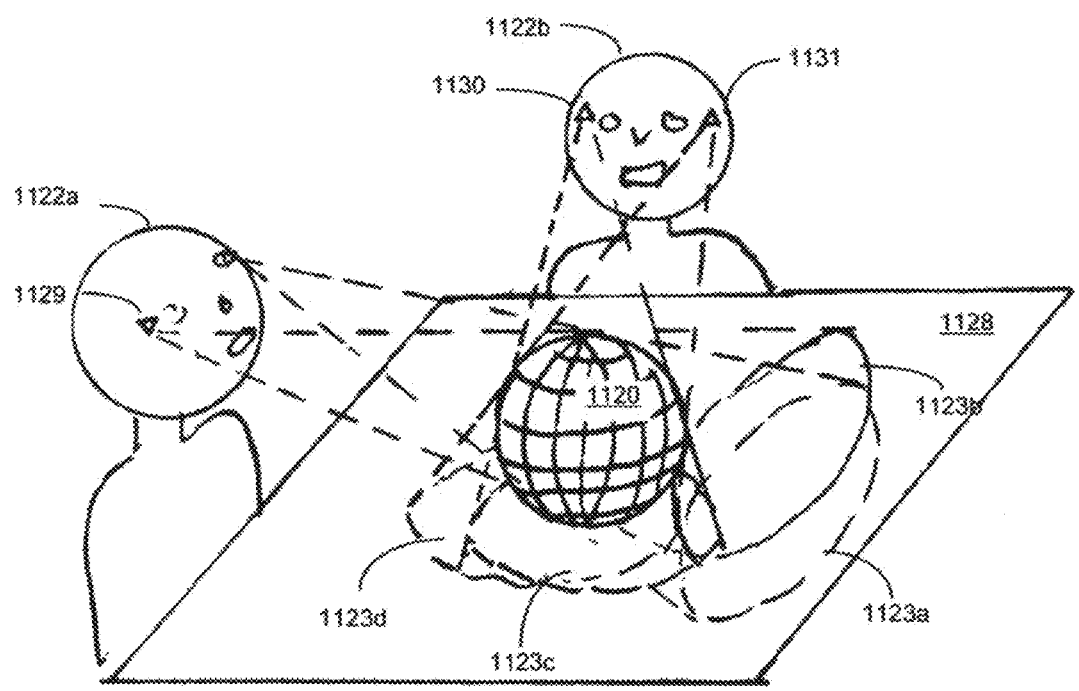
Figure 11D:
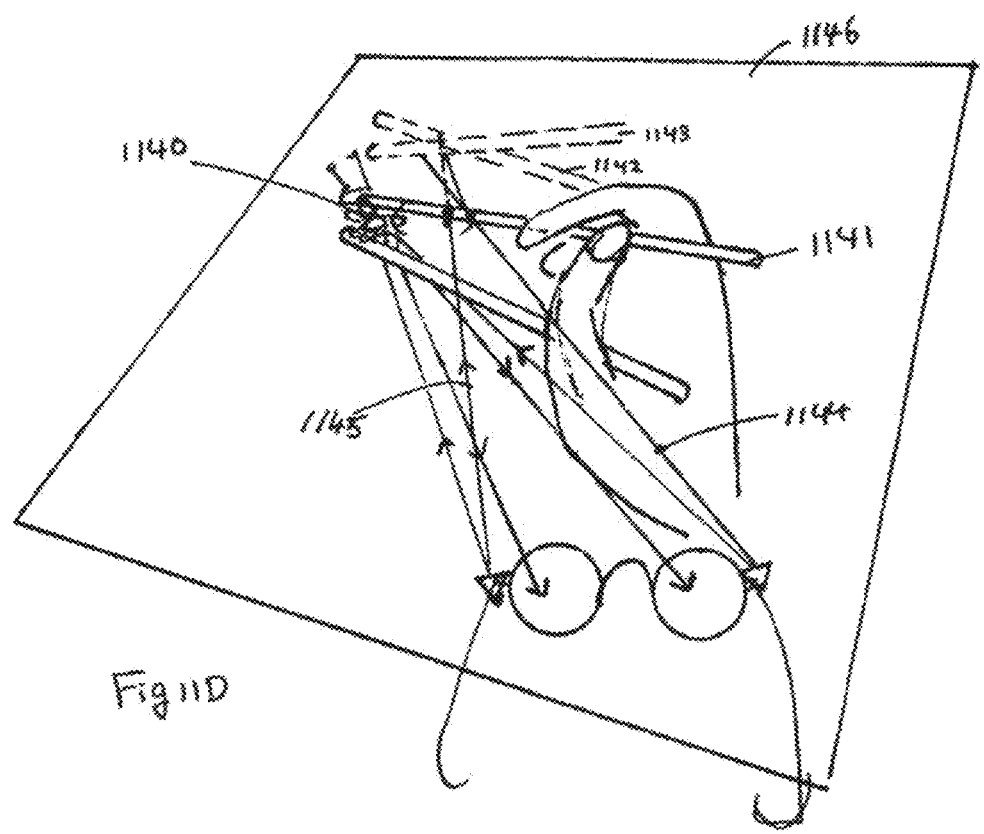

FIG. 11e shows how the Magic Chopsticks™ can be imaged holding a virtual object, such as, for example, a rice ball 1152 with a natural looking partial occlusion of the real object behind it, in this case chopstick 1151.

FIG. 11*f* shows the rice ball (and any other images) 1163 imaged partially on the table surface that serves as a retro-reflective background and in part directly on the retro-reflective surfaces of the chopsticks 1161 and 1162. Both chopsticks are located by fiducials (such as those shown in FIG. 11*g*) and "painted over" by the graphics software and projector illumination to make them (again) visible. Without this painting over they would become substantially invisible. For chopstick 1161 the surface area 1165 is now occluded by the part of the rice ball image being projected directly onto its retro-reflective surface, whereas in the case of chopstick 1162 in the foreground area, 1164 is part of the chopstick image (virtual object painted on top of real object) occluding the rice ball image 1163.

FIG. 11*g* (inset) shows a detail of chopstick 1162. The chopstick's surface 1166 is made retro-reflecting to visible light—the wavelengths of primaries of the imaging system—but an IR black (IR light-absorbing) die stripe fiducial marking 1167 allows the scanner-detector system in the headset to locate the chopstick 1162 precisely in its field of view. The MagicChopsticks™ game comes with sticks of exact known dimensions, facilitating localization.

Figure 11H:
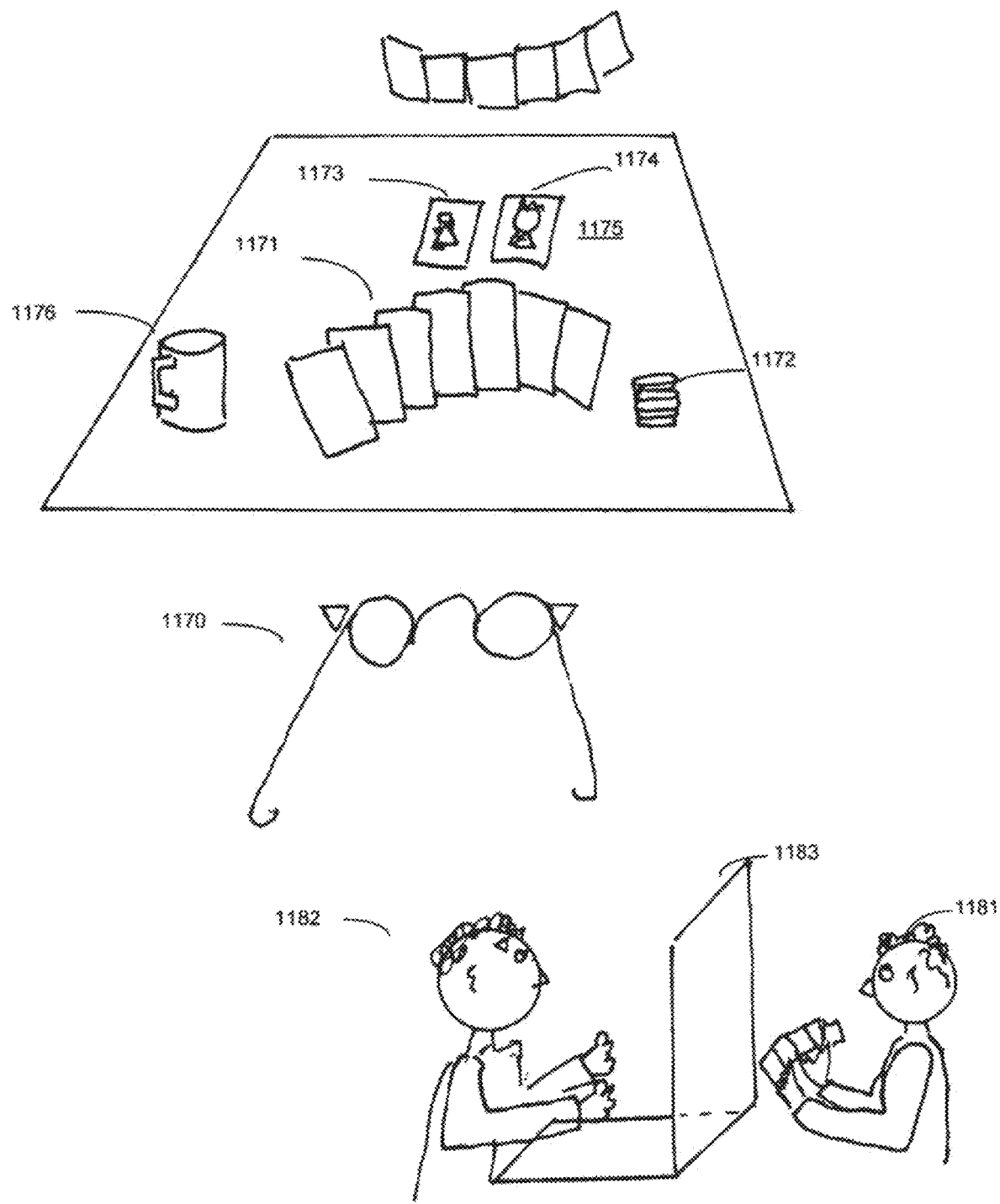

FIG. 11*h*: 3-D poker. Note the glasses 1170 shown in the drawing do not need to have any optics. They are simply there to indicate the viewer's perspective and the approximate position of his eyes and the cameras, projectors and any sensors in the headset. The virtual cards 1173 and 1174 that the player is "holding" are shown to the player in his private view space, as is the stack of his poker chips 1172. The cards 1173 and 1174 are being played and are visible on the table 1175 to both players (in the shared view space). Real objects, such as a coffee mug 1176, can also be on the table and do not interfere with the projection, as they do not conflict in view space with imaged objects such as cards and money. The headset detects the position of mug 1176, for example, as a strong shadow obscuring the retro-reflective surface; and the game's software positions virtual objects in the remaining available space, avoiding a collision of real and virtual images. If required, such objects can be made part of the game.

Note that it is not necessary for the other players to be actually physically present, and shown in the lower drawing. Each seat on the table can be taken by a real person or remotely with the virtual image of cards being dealt, just as if the person were present. The foldable screen 1183 can be placed with its optionally in partially horizontal and partially vertical position so that virtual player 1181 can be seen by real player 1182 in 3-D.

Figure 12:
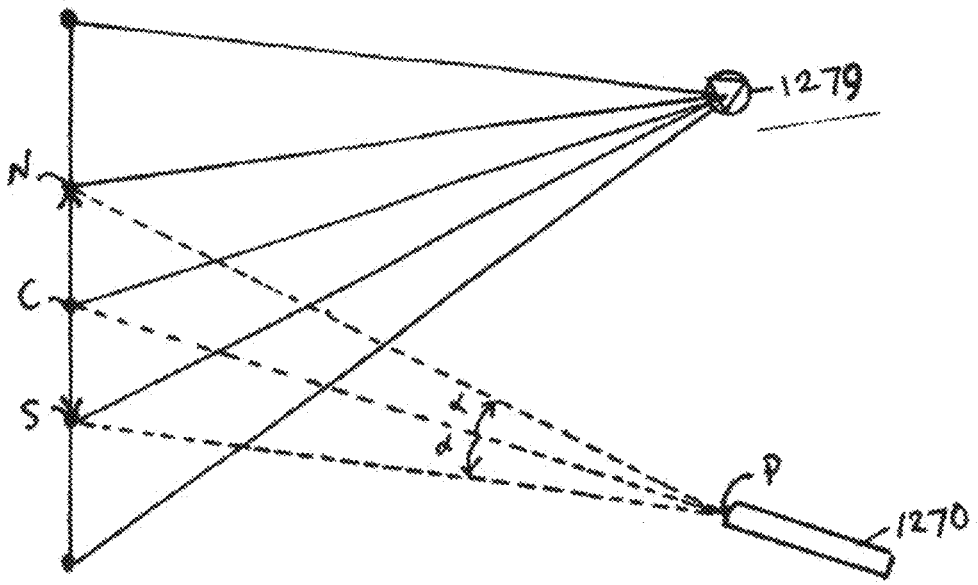
FIGS. 12A-L show examples of supporting laser pointing devices.
Figure 12:
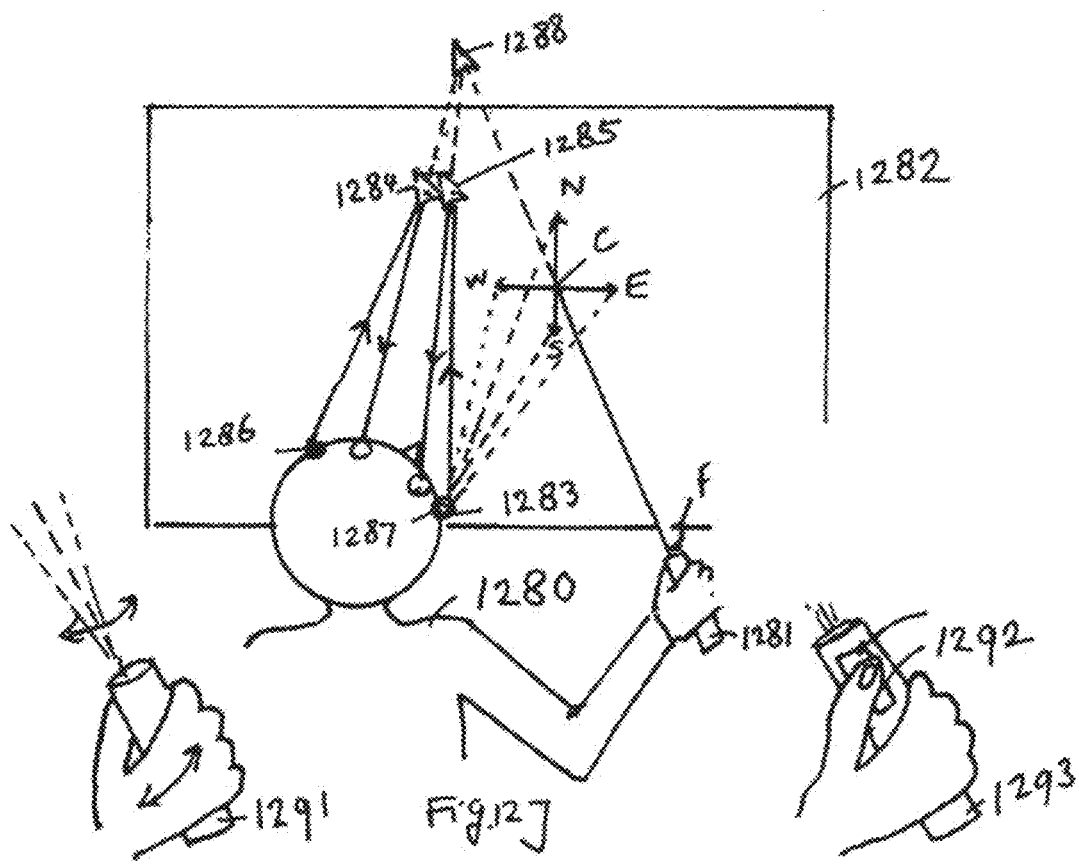

FIG. 12 shows examples of supporting laser pointing devices. Four types of screen light response are shown: FIG. 12*a*, diffused reflection; FIG. 12*b*, absorption; FIG. 12*c*, specular reflection, and FIGS. 12*d* and 12*e*, retro-reflection.

In FIG. 12*f*, a diffusing layer 1240 consisting of microscopic particles is combined with a retro-reflective back structure 1241. A beam of light 1242 from a pointing device is diffusely reflected. Another beam (of another wavelength or polarization) of light 1243 passes through the diffusion layer 1240, retro-reflects on the retro-reflective back surface 1241, and is reflected parallel the opposite direction as beam 1244.

In FIG. 12*g* alternatively, the retro-reflective top surface consisting of partially embedded microspheres 1250 only retro-reflects rays 1251 of the narrowband wavelength of the primaries. Light of other wavelengths 1253, such as from a pointing device, is diffusely reflected on a lower back surface 1254.

FIG. 12*h* shows this phenomenon in some close-up detail. Note that while the microspheres' wavelength-selective, reflecting coating 1262 does not retro-reflect pointing device ray 1263, the spheres do help to further diffuse the rays by optical refraction primarily on the exposed spherical airsurfaces.

In FIG. 12*i* (side view), a camera detector 1279 on the viewer's head detects a compass-like pointer image projected by a pointing device 1270. In this side view only the points N (north), S (south), and C (center) along the vertical axis are depicted. As depicted in FIG. 12*j*, below, the pointing device projects four cross points: N, S, E and W (north, south, east and west) at equal and known angular spread at angle α (alpha) from the center C of the cross. Mathematically the angle of incidence of the center beam PC can be derived from the observed ratio NC/SC as observed in actual size on the screen. Because as previously shown the instantaneous position of projector/camera 1279 with respect to the screen is also known (assuming an a priori known screen geometry and screen fiducials or corner tracking). The observation of the cross NC/SC ratio and prior knowledge of the pointer spread angle α allows the system to accurately determine the inclination of the center of pointer beams PC as well as the absolute position of pointer emitter P.

FIG. 12*j* shows a person 1280 manipulating a 3-D pointing device 1281 as described above in the discussion of FIG. 12*i*. His headset detects (for example, by a line scanning sensor or by camera 128) the positions of N, S, E and W on the screen 1282. As described in the previous section, the software of his headset (or a connected game system) determines position P of his pointer and the 3-D position of the center point axis PC with respect to the screen. The dual projectors 1286 (left side) and 1287 (right side) now can project a virtual pointer arrow 1288 in 3-D by positioning a left image 1284 and a right image 1285 in the positions and with the correct stereoscopic disparity for the viewer's perspective at that moment.

FIG. 12*k* shows that optionally, the position of the virtual (projected) arrow along axis PC can be manipulated by rotating the device or (as shown in FIG. 12I) by a control such as a slider control 1292 on the pointer device 1293. This control may be connected to the headset wirelessly by RF or by optical means, such as, for example, by modulating the laser pointer output in such a way that it is easy to detect by the headset camera or optical sensor (photocell).

FIG. 13 shows an exemplary collaboration session. A participant 1300 in a collaboration session has a worktable with a retro-reflective surface 1303.

Figure 13A:
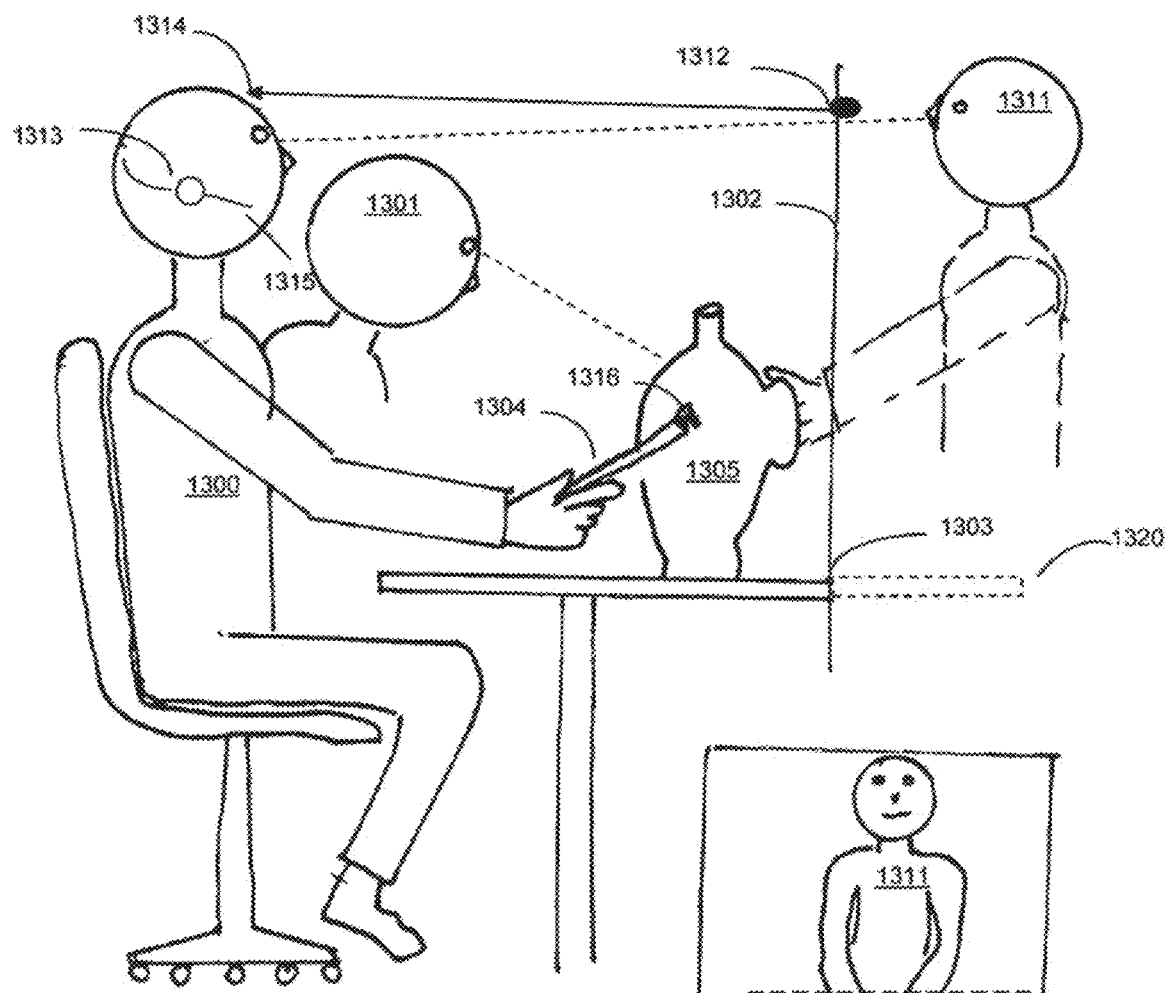
FIGS. 13A-B show an exemplary collaboration session.

FIG. 13*a* shows participant 1300 facing a second retro-reflective vertical surface 1302. Participant 1300 sees an image of another participant 1311 at a remote location at position 1312 at the screen. This image is projected by his head set projector 1314 which also has headphones 1313 and microphone(s) 1315. When the participant looks down toward the work surface 1303, in this position 1301 he sees the image of an amphora 1305, as projected by his headgear in 3-D on both the work surface 1303 and the screen 1302. Using a pointing device 1304, participant 1300 can modify the virtual amphora 1305 with a virtual brush or carving tool 1316. Looking at the screen ahead, participant 1300 sees the other participant 1311 and a virtual extension 1320 of the work surface 1303, so that the amphora 1305 appears positioned in the middle of the joint virtual collaboration work space.

Figure 13B:
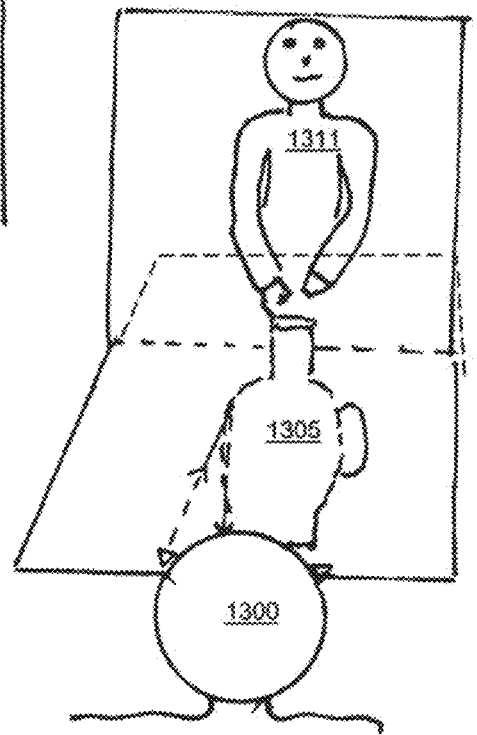

FIG. 13*b* shows this retro-reflective surface implemented as one foldable surface system that is folded to a vertical position when a virtual collaboration session is required with a participant at another location. The vertical screen section could be folded down like a tabletop to modify the collaboration work area for a work session with the local participant.

FIG. 14 shows three screens, each with a different pattern. The patterns are designed to allow a micro projector scanning sensor or camera to detect its relative position on the screen by detecting the fiducial pattern lines that cross its field of view.

Figure 14A:
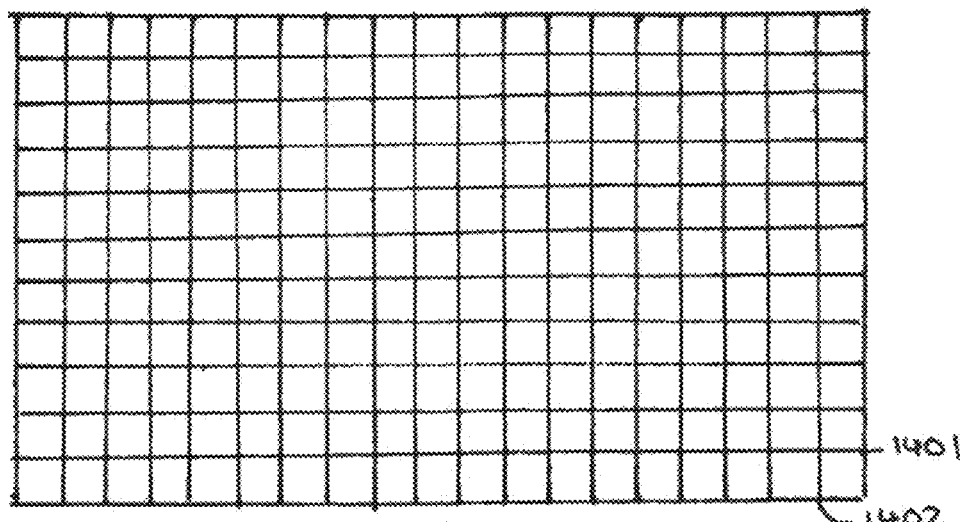
FIGS. 14A-C show three screens, each with a different pattern.

In FIG. 14*a* the square grid pattern consists of horizontal lines 1401 and vertical lines 1402 that are easily counted in a traditional horizontal and vertical scan pattern.

Figure 14B:
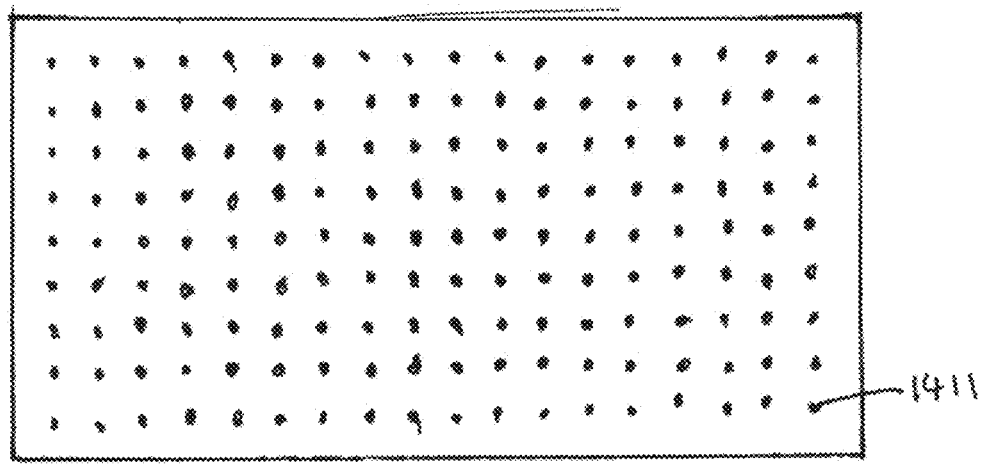

FIG. 14*b* alternatively shows a pattern of spaced dots 1411 in a rectangular manner.

Figure 14C:
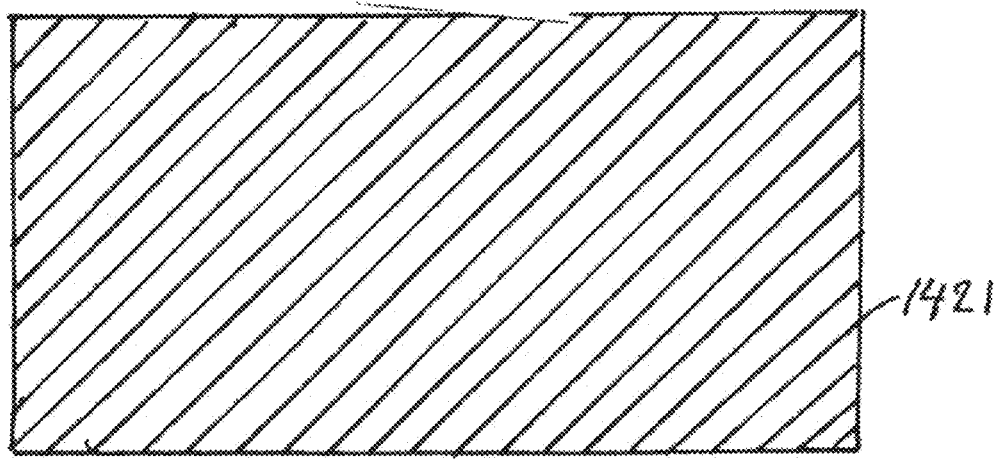

In FIG. 14*c* the diagonal pattern 1421 might be useful for a flying spot projector. The projector's highest scanning speed is horizontal. It would always see the diagonal lines. By timing the detection of these lines, crossing the horizontal scan would allow the system to determine the screen orientation (e.g., deviation from horizon) with respect to the scan direction in the field of view.

It is possible to embed these patterns imperceptibly, e.g., by specific IR retro-reflector or absorber (shadow) patterns printed on the screen surface. Alternatively, the projector itself could create a structure of light patterns that is "anchored" to the screen by fiducials or by detecting the screen corners. For example, the left projector can project such a pattern to be detected by the right camera or vice versa.

FIG. 15 shows examples of a stereoscopic micro projector for in situ 3-D imaging.

In FIG. 15*a* an organ 1500 is viewed by a surgeon wearing the dual projectors 1501 and 1502. The projectors render two separate images 1503 and 1504 on the surface of organ 1500. These are the left and right view respectively of a virtual object seen by the surgeon projected inside the organ at position 1505.

In FIG. 15*b* a retro-reflective stain 1511 has been applied to the surface of organ 1500.

FIG. 15*c* shows how this retro-reflective stain can be applied in two layers on the organ 1523: 1) The top layer 1521 contains retro-reflecting structures such as a surface coating of exposed microspheres as described elsewhere, thus making the surface of the organ into a retro-reflective projection screen (as noted elsewhere, the non-flatness of the surface is of no import because the scanning laser projection does not require a focal point), and 2) an undercoating layer 1522 might consist of a non toxic spray-on reflective adhesive layer to add reflectivity to the microstructure embedded in it.

In FIG. 15*d*, when the projector is turned off, the surgeon has a clear and unobstructed view of the organ.

Optionally, as shown in FIG. 15*e*, the 3-D image can be projected onto a mist or spray 1546 containing small droplets that are retro-reflecting. Thus small intermittent puffs of such a mist from a nozzle 1545 creates a 3-D view inside the organ of the tumor 1540 by stereoscopic images 1543 and 5044 retro-reflecting from the mist. The real view and the virtual image follow each other intermittently and very quickly so the surgeon can align his tools and, for instance, direct a biopsy needle toward a tumor inside the organ, which tumor has been previously mapped by scanning.

Alternatively, as shown in FIG. 15*f*, a transparent retro-reflective screen 1560 can be positioned just above the organ 1562 in the surgeon's line of sight, allowing images 1561 and 1563 to be superimposed in 3-D on the actual organ 1562 as viewed through the transparent screen.

In FIG. 15*g*, the surgeon 1570 aligns his biopsy needle 1571 toward a predetermined tumor location 1572 inside the organ 1573 provided in 3-D images 1574 projected on the screen 1575, rendering a realistic line-of-sight view 1576 inside the organ.

Eye Stalks

On one aspect, proposed is a novel approach for a personal viewer, which can deliver both simple and 3-D viewing, fulfilling all the market requirements at a very low cost and weight. FIG. 18 shows two exemplary aspects of such a personal viewer, according to the system and method disclosed herein. First, it shows how each eye has its own image. In particular, with reference to the retro-reflected beams 1830*a* (left eye) and 1830*b* (right eye), it is shown that the nose actually acts as a separator, so the left eye cannot see the retro-reflection for the right eye, and vice versa. Therefore, it is generally desirable keep the retro reflection cones from crossing over the nose. The four instances of angle 1831 alpha shown in the drawing indicate the "opened up" (or spread of the) cone retro reflected by the retro reflective (RR) surface. Thus each eye can only see the image created by its respective projector (located adjacent to that eye) due to a) the retro reflection angle, which keeps the reflection shooting back toward the projector, adding in both directions the opening angle, which angle can be controlled by tweaking the retro cube angles, or the sphere material and/or buildup, as discussed later in the descriptions of FIGS. 25 and 26 as well as other sections; and b) by the position and the lateral distance of the viewer's eye from its projector on the one hand and the distance from the screen on the other hand.

Eye Stalks are pods with an extra lateral offset of emitter-sensors strategically placed close to a user's eyes, which augment the user's UI with the world. In some cases, they may be particularly useful when the view is a long distance from the screen. They include a set of microphones, a set of cameras and/or light sensors, and a set of projectors. The Eye Stalks can be designed to wrap around the back of the head, over the ear (like some audio head sets), or over the head like classical headphones (over the ear headphones), or yet in other cases they can be worn like eyeglasses. In some cases, they can also comprise two sets of clip-ons fastening to (or over) the ears or clipping to head gear (visor sweat band, cap, hat or other head wear) or any type of eyewear.

The scanning type projectors each find a common visual reference (using cameras and/or light return feedback from photocells) in the user's field of view, to align their projections and cross-reference their image.

Audio detection could be augmented by using microphone arrays that can steer the audio foci, possibly aided by visual (3-D stereoscopic) inputs from the cameras or sensors (detecting mouth and lips of a person in the field of view). Microphones could focus on the mouth (below) and a second (or third) person's mouth (multiple foci are possible).

The Eye Stalks can be a flexible, goose neck style (as are little audio mike booms currently extended from headsets), forming a conduit for electrical (high speed serial) and/or optical signaling (fiber) and power for the devices in the tip of the stalk.

All the afore-mentioned sensors and the projector can be packed into a tip having less than 3 mm cross section. Alignment and fit can be loose, because the feedback loops adjust the system's settings automatically. Head motion (relative to an object or surface in view) can be perfectly compensated for—steadying the view in 3-D—and detected at the same time. In some cases, this ability to compensate for head motion might be used as part of the UI system (head gestures, for example "yes" is indicated by up and down motion and "no" is indicated by left to right to left, "next page" command is generated by right to left motion, etc).

Most of the electronics, combiner/mirror for optics, power, etc., can be elsewhere, for example, in a plug or clip on the viewer's body, in some cases using its own Internet connection, for example via WiFi, or in other cases, assuming that there is a wired or wireless connection (of any suitable standard, including but not limited to, for example, Bluetooth, WiFi, ZigBee, serial port, proprietary port, USB, USB to go, etc.) to a smart phone that can offer local data and/or Internet connectivity.

Total electronic load (typically less than 250 mW) would be less than the requirements to back light screens in today's phones, so if the use of the device enables the backlight to be turned off (substituting for the main visual interfaces) then the battery life of the smart phone is not adversely impacted when the Eye Stalk device is plugged into the smart phone host, and powered "parasitically." If the Eye Stalks device has its own battery, the battery could be very small, light, and inexpensive, as it could be, for example, a standard phone-type lithium battery in a unit worn on the body and connected by cable, or in other cases more akin to those used in various Bluetooth headsets, etc. Even when the projection, on a retro reflective (RR) surface presumably but not necessarily, is not ON, the scanning beams, or at the very least the IR structural light projection can continue to project, in collaboration with stereo cameras, and this continued operation can strongly augment a natural UI (for example, hand motion, gesture detection).

Simple things like scanning the environment for known references (walls, buildings, objects, and people) enable invoking context appropriately (also known as enhanced or augmented reality), then using the projection to display that content on a suitable object, as it can be detected by the cameras.

For example, the system could wake a user who has dozed off, in places such as the subway when the user arrives at his destination, or when meeting someone at an airport (face recognition). This system could be helpful for people with disabilities such as diminished memory or eyesight.

Mobile Augmented Vision

In another aspect of vision enhancement for the vision-impaired, a screen—either RR or translucent RR visor—could be held, or flashed briefly, in line with the natural field of view. The Eye Stalks could then project an image overlay with a view, such as an enlarged or otherwise visually augmented (image contrast enhanced) view of the natural scene ahead. Such an augmented scene could be a combination of the high-resolution stereo 3-D view recorded by cameras in the Eye Stalks, or elsewhere included in the headgear, combined with references from other sources. For example, maps or Google street view; real or synthetic, may be super-imposed in a spatially correct manner on the natural and video stereo 3-D images. This 3-D enhancement might also consist of hyper-spectrally acquired imagery or LIDAR point cloud data made visible by overlaid projection, either with a transflective RR screen or by direct laser projection, for example, on close-range objects.

Virtual Microscope

FIG. 41 shows in yet another aspect an exemplary Zoom—Macro function, enabling a viewer to use the system as a virtual microscope.

Figure 41A:
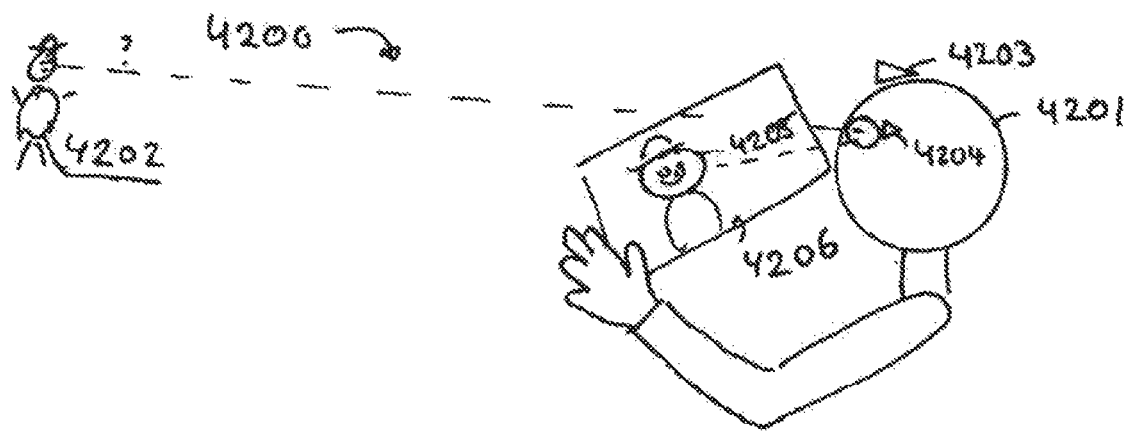
FIGS. 41A-B show another aspect of Zoom-Macro augmented mobile vision function, enabling a viewer to use the system as a virtual microscope, enhancing or annotation real objects viewed through a transflective screen.

FIG. 41*a* shows long range vision system 4200. Viewer 4201 sees another person 4202 approaching at some distance. His headset camera 4203 zooms in, and then the magnified image 4205 is projected on the RR screen 4206, whereupon he recognizes the person 4202.

Figure 41B:
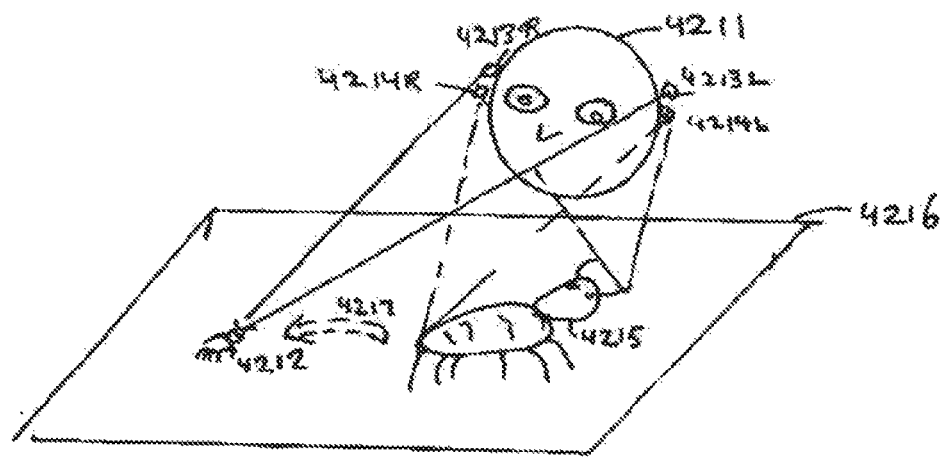

FIG. 41*b* shows the microscope function of system 4200. An observer 4211 sees a tiny insect on a retro-reflective examination surface 4216. His headset cameras 4213R and 4213L zoom in on the insect, taking a stereoscopic video that is projected by dual projectors 4214R and 4214L as an enlarged 3-D image 4215. Label arrow 4217 points at the location of the actual insect 4212.

Camera Obscura Projection: Simple and Low-Cost

The enormous screen gain of a retro-reflective surface and concomitant increased optical power efficiency enables the use of light sources of minimal power and dimensions. A femto projection system of the system and method disclosed herein requires less than 1 lumen in total illumination power, as compared to 10-30 lumens required by pico projectors such those as marketed by Microvision. For example, a 525 nm direct green laser diode, such as recently announced by Sumitomo, when used as the green primary in the system and method disclosed herein would need to produce less than 1 mW of energy @500 lm/Watt. It would generate 0.5 green lumens, which would be more than enough to satisfy the green primary requirement of a projector nominally rated as capable of 1 RGB lumens. Such a 1 mW light source is very small. For example, a laser diode can emit such power from a facet with only 1 micron in diameter. The dimensional reduction enables a lensless projection, using a pin hole instead of a lens, named "Camera Obscura" by the German astronomer Johannes Kepler in 1604. As long as enough light comes through the pin hole, a clear and sharp image is projected on a dark surface facing the pin hole. This approach implies a femto projection source such as a laser diode or a very small LED. In principle, such a projector requires no other optics, just a pinhole source illuminating an imaging device close by. The imaging device can be transmissive (such as LCD or LCOS) or a mirror light valve (such as a DLP) or any other imaging device.

Camera Obscura Projector with Spatially Multiplex Sources

Figure 18A:
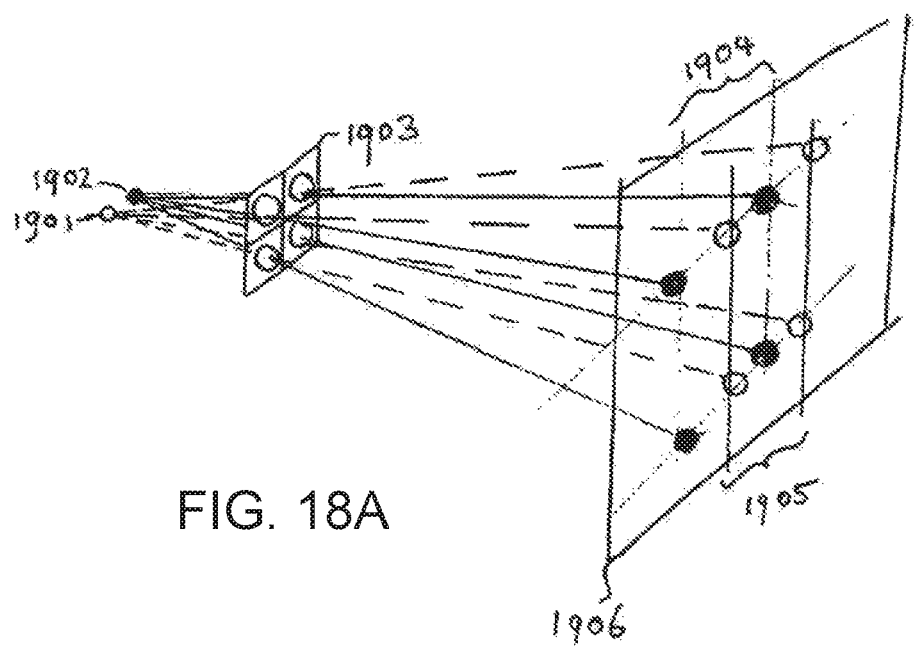
FIGS. 18A-C show aspects of projecting distinct pixel patterns during interleaving duty cycles, enabling capture and/or creation of different images.

In yet a further enhancement, one can illuminate the same imaging device with several pinhole light sources and project distinct pixel patterns during interleaving duty cycles, enabling capture and/or creation of different images. Each light source (s0, s1 and so forth) creates a separate copy of the imager's pixel pattern (an image of the individual light valves in the array) on the screen. For example, as shown in FIG. 18*a*, using two sources (s0) 1901 and (s1) 1902 approximately one pixel width apart can effectively double the projected resolution on the screen. The patterns 1904 (denoted as black pixels) and 1905 (denoted as white pixels) created by each source 1901 and 1902 and the same imaging device 1903 in alternating cycles can partially overlap or interlace. Two-point illumination sources 1901 and 1902 illuminate four pixel apertures in imaging array 1903 Time sequentially illumination sources 1901 and 1902 are projected as eight separate pixels on the projection surface 1906. Furthermore, the sources can be of different colors and different polarizations.

Figure 18B:
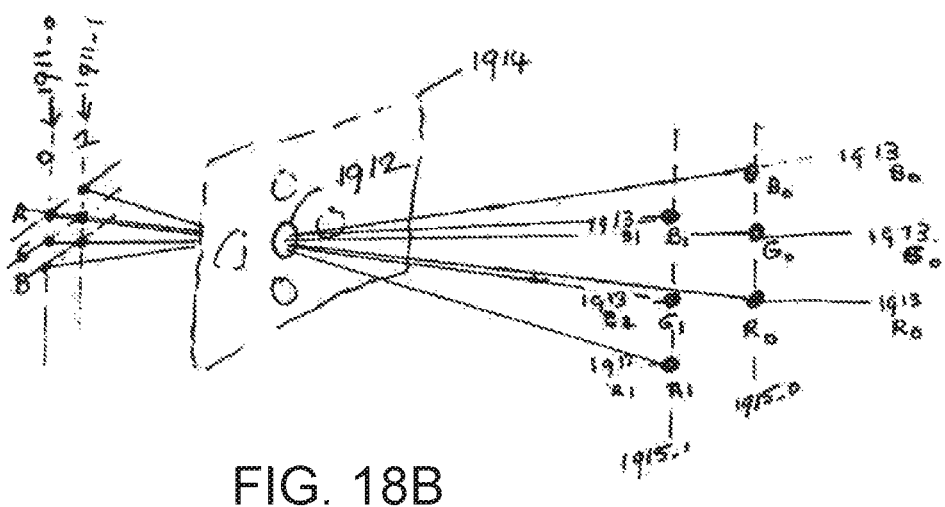

As shown in FIG. 18*b*, two sets of three primary R, G, B sources, comprise a total of six point illumination sources arranged in two columns 1911_0 and 1911_1, with each one red, green and blue, illuminating a single pixel aperture 1912 of an imaging array 1914. Said illumination sources arranged in columns 1911_0 and 191_1_1 then project six distinct color pixels (1913R0, 1913G0, 1913B0, 1913 R1, 1913G1 & 1913B1) in two columns 1915_0 and 1915_1. The only requirement is that the imager must be fast enough to be able to temporally multiplex illumination by each light source sequentially, N illuminations per frame. Furthermore, the individual light sources can be modulated in time and intensity to conserve energy for darker frames or frames that require less than full color. This spatial multiplexing results in the best of both worlds: An inexpensive, relatively low-resolution imaging device can be used to render acceptable-resolution 3-D images, or high-resolution 2-D images.

Figure 18C:
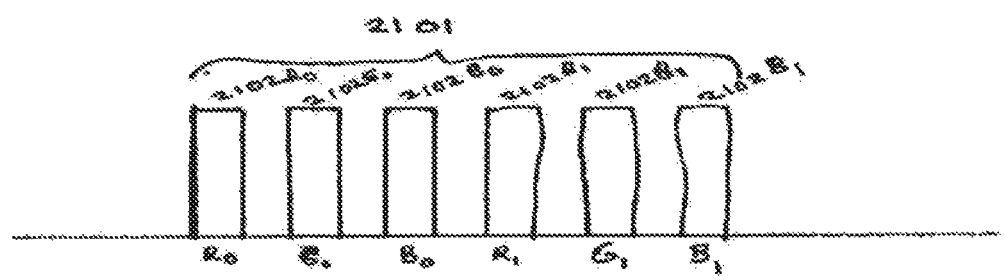

Each of the multiple laser diodes sequentially turn on for very short intervals, thus minimizing motion blur (low duty cycle and low hold times). FIG. 18c shows one full image frame timing diagram cycle 2101 with six short sub frame pulses 2102R0, 2102G0, 2102B0, 2102R1, 2102G1 and 2102B1. With a simple feedback mechanism from the screen, an adjusted pixel map is computed for each primary, resulting in maximum spatial and color image fidelity, preventing motion and color break-up and other artifacts. For example, a six-primary system can be constructed with dual sets of RGB primaries with each set of opposite polarization. The three primaries of each set may be combined, resulting in two complementary full color pixel patterns, as shown in FIG. 20.

Figure 20E:
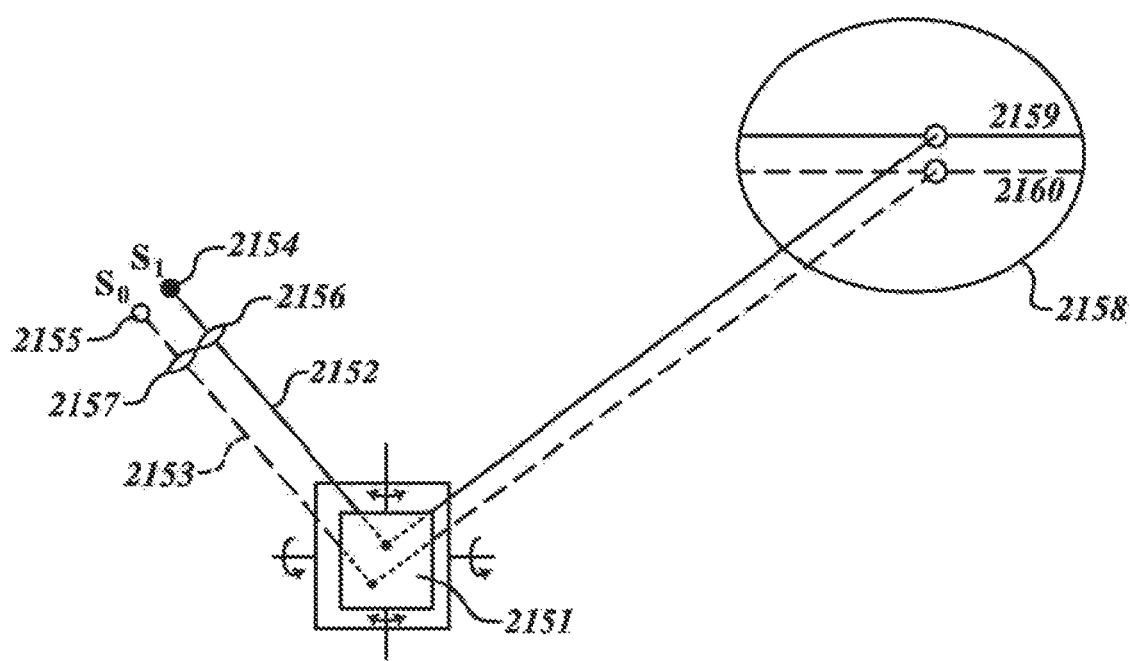
Figure 21:
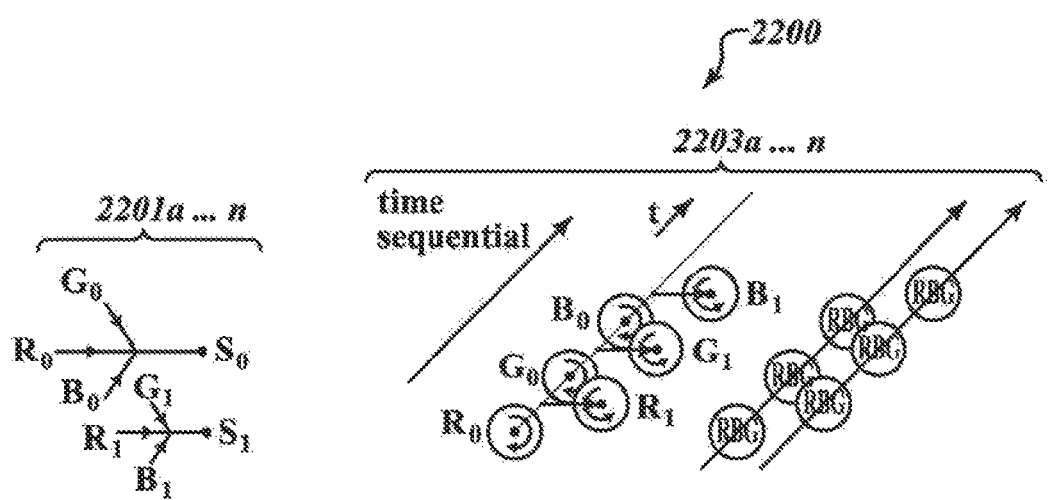
FIG. 21 shows each of the six primary sources projecting its own pixel pattern, which may partially or completely overlap on the screen.

FIG. 20a shows two interleaved pixel patterns 2110aa-nn, consisting of alternating columns, one set of columns resulting from a projection of first source 0 and the other set of columns resulting from the projection of a second source 1. FIG. 20b shows a similar pattern interleaving, but with sources s0 and s1 being polarized in opposite dimensions. FIG. 20c shows a checkerboard interleaving pattern, resulting, in this example, in offset odd and even pixel aperture rows in the imager, so that the successive illumination patterns interleave both vertically and horizontally. FIG. 20d shows three illumination sources offset in both x and y dimensions by one-half pixel distance, resulting in a partial overlap in both dimensions. The partial overlap might be desirable to reduce spatial temporal aliasing artifacts. In some cases, the described doubling of the resolution and/or the multiplexing of right and left images for stereoscopic 3-D imaging can also be applied to a scanning spot projector, by adding a second illumination position, such as, for example, offset vertically by one-half a pixel position, creating a line interleave pattern. FIG. 20e shows an example of a dual-axis scanning mirror 2151. On said mirror, two incident-collimated beams 2152 and 2153, emanating from two light sources 2154 and 2155, reflect on said mirror 2151. The beams are collimated by a pair of lenses 2156 and 2157. The resulting scan pattern 2158 is formed by a series of interleaved lines 2159 and 2160.

Figure 19:
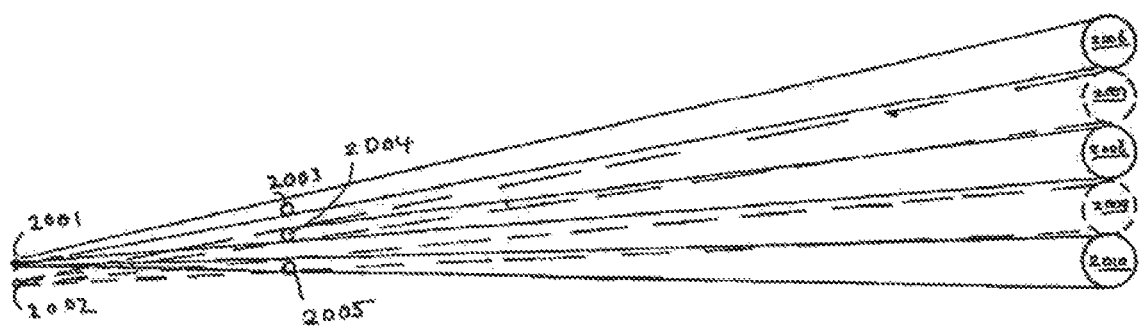
FIG. 19 shows two light sources and illuminating imaging array pixel apertures

FIG. 19 shows two light sources 2001 and 2002 illuminating imaging array pixel apertures 2003, 2004, and 2005. The projected pixels 2006, 2008, and 2010 are illuminated by source 2001, and the projected pixels 2007 and 2009 are illuminated by source 2002. The later two pixels are interleaved between the former three. By interleaving from numerous pixels a detailed image is rendered with effectively twice the resolution of the imaging device.

Figure 22:
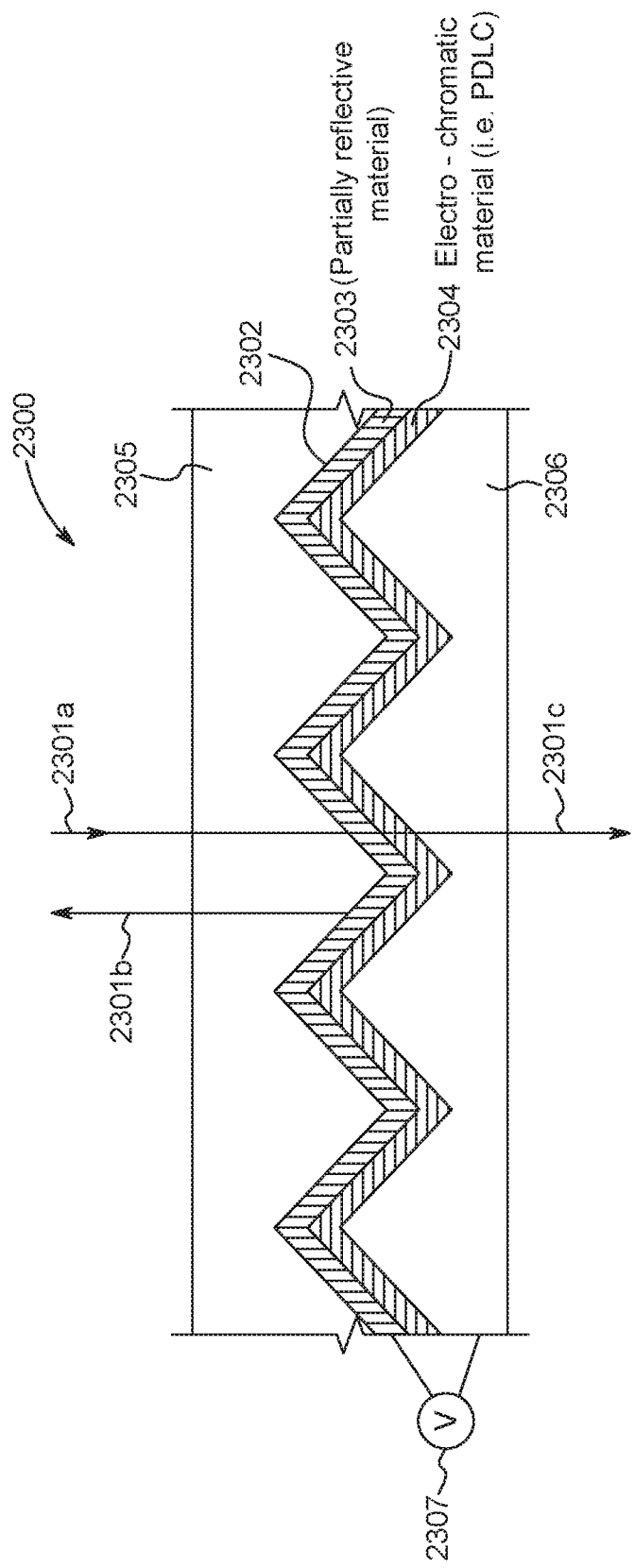
FIG. 22 shows an exemplary retro-reflective surface.

Combining each RBG set into one position would enable longer duty cycle white light projection (W=R+B+G). This arrangement would be, for example, advantageous for reading documents in high resolution in bright daylight. Alternatively, each of the six primary sources may project its own pixel pattern, which may partially or completely overlap on the screen, as shown in FIG. 22. Positions of the primaries can be organized to overlap, to minimize color break-up or, alternatively, separate red, green, and blue positions can be used to support full color HD or a bright black-and-white reader mode. In summary: A single low-resolution imaging device, up to six low-power laser diodes, and a simple retro-reflective screen enable a low-cost, efficient, high-brightness, versatile personal mobile projection system.

A Telepresence Communication Wall—"Whisper Wall"

A Whisper Wall is a means to connect work teams at separate, geographically remote locations, fostering spontaneous interactions and collaboration. The whisper wall concept is the ultimate telepresence solution, a continuous "teleportation wormhole" between two physically remote locations. This concept would be a great tool to bridge the collaboration gap between two open office environments. Anyone, at any time, could just walk up to the wall and look for a collaborator at the other side of the wall. They can dialog spontaneously and without disturbing others on either side. There is no need to go to a separate room (savings in real estate and office space are significant—all it takes is dedicating a wall in the office). If desired, the "portal" collaboration interface can be extended to include tables, doors and cabinets. They just need to be covered by RR "wall paper" such as, for example, the surfacing material made by Reflexite™.

Figure 27A:
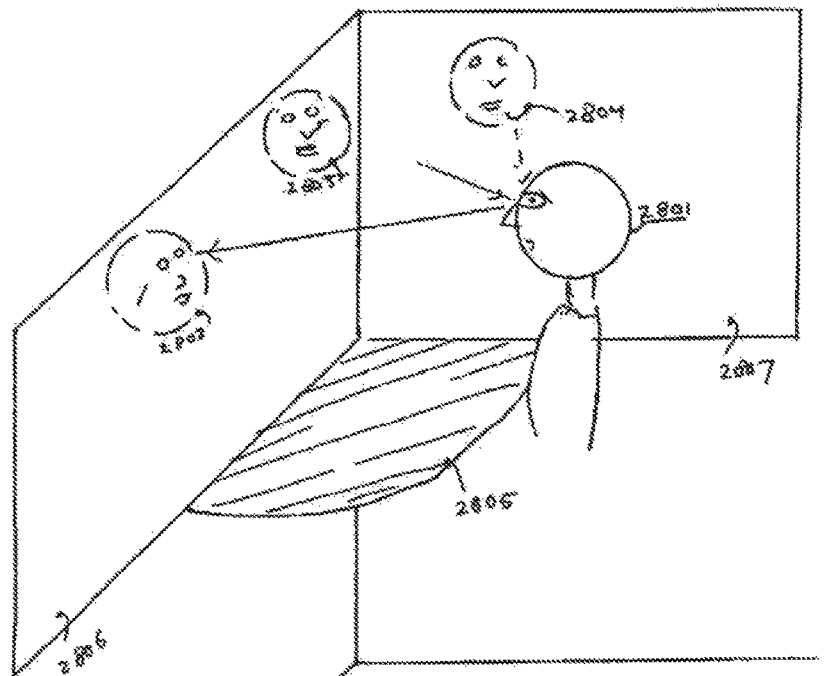
FIGS. 27A-D show various aspects of a conference in a telepresence system.

FIG. 27a shows an exemplary four-party conference in a Collaboration Corner™ telepresence system 2800, according to one aspect of the system and method disclosed herein. In this example three retro-reflective surfaces form a corner in which the viewer 2801 can see other remote parties 2802, 2803, and 2804 sitting roughly at three opposite corners of a conference table. RR surface 2801 is a table or desk-like work surface in the horizontal plane. RR surfaces 2806 and 2807 are in the vertical plane roughly orthogonal to each other. RR surfaces 2805-7 thus form a cubic cone that can easily be accommodated anywhere in a modern office environment, for example, by adding RR surface treatment to existing walls partitions and tables. Work materials and virtual objects can be displayed anywhere in the view of viewer 2801, which is at least 180 degrees wide in azimuth and 90 degrees in elevation.

Figure 27B:
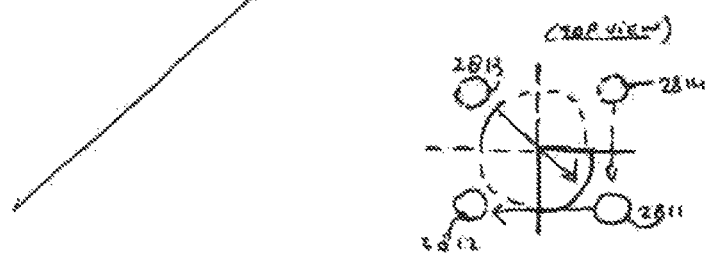

FIG. 27b shows the top view of four parties in an exemplary four-party conference, as denoted by the arrows. The parties 2813 and 2814 are looking at party 2811, who is looking at party 2812. (For example, Jill and Jack watch John, who is presenting his work to his boss, Mary). Note that each party may have the same unconstrained three-way view in a shared four-way collaboration space shared with three other sites. Each location can have multiple participants, and each participant has his or her own individual, unique 3-D perspective of the shared workspace, with a choice of both shared or private view space. Sharing might also be with any subset of the participants, regardless of location. Thus, the viewer can share with a remote participant but NOT with a local participant, so collaboration can go one-to-one ad hoc, as is natural when taking someone aside briefly during a meeting, without unduly disrupting the workflow.

Figure 27C:
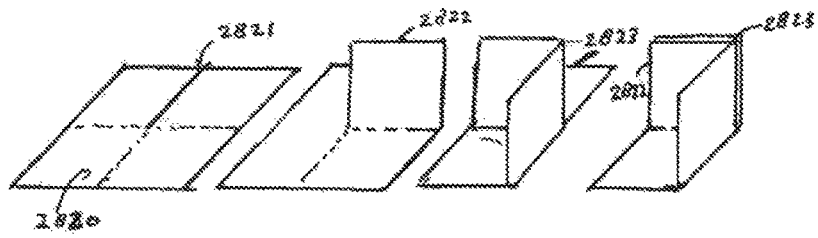

FIG. 27c shows a foldable, square retro-reflective projection surface 2820 with a partial slit 2821. Surface 2820 has four sections and may be folded into an open cube ("corner cube") by a three-step method. First, one half of section 2822 is folded up, and then second, all of section 2822 is folded to the left. The third step is folding section 2823 behind section 2822.

Figure 27D:
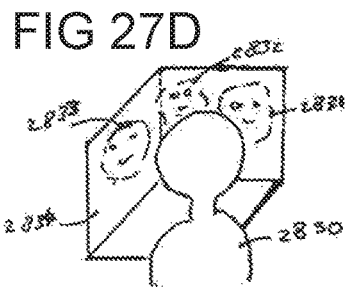

FIG. 27d shows how such a folded cubic corner screen may serve as a light-weight, portable conferencing tool for an ultra-connected mobile "road warrior" 2830 conferencing with three other parties 2831, 2832 and 2833 projected on cubic corner RR surface 2834.

One other aspect of the invention could be a whisper wall system that uses adjustable transflectivity retro cubes (electrochromatic or LCD type) and adjustable transflectivity specular reflection, such as described exemplarily in the discussion of FIG. 22 for conferencing, with time division multiplexing, in an arrangement of oriented RR corner cubes, in some cases with modified corners (90+/−alpha) for directional spreading. RR surfaces can create a multi-user, multi-3-D view surround augmented reality (AR) environment used, for example, for entertainment and training.

FIG. 22 shows an exemplary retro-reflective surface according to one aspect of the system and method disclosed herein, with adjustable reflectivity, using corner cubes. Cross-section 2300 shows corner cubes protruding down as 2302. Partially reflective material 2300 is metalized, with layer 2303 covering the corner cube material 2305. Electrochromatic material 2304, such as, for example, polymer dispersed liquid crystals (PDLC), is added as an immediate layer, enabling material to have particular properties such that by applying voltage it can be turned opaque, and by removing voltage it is then semi- or fully transparent. Some materials have the opposite properties, whereby they become transparent when voltage is applied and opaque when voltage is removed. Changing the opacity of the background of the mirror in the fully transparent mode gives the viewer a partial view through the system, indicated by entering light beam 2301a, which is split at the semi-mirror into beam 2301b retro reflected and beam 2301c going through the system. The beam is split accordingly. Turning on the opacity of layer 2304 lets "almost no light" (none for all practical matters) exit as beam 2301c, and the majority of the light is reflected as beam 2301b. Most of these opacity systems turn whitish, indicating higher reflectivity, which helps turn the semi-mirror into a full mirror. A semi-mirror need not split the light exactly 50:50 (transmissive:reflective); the split ratio may be as uneven as 5:95, or any usable range. The voltage could be applied between, for example, the optical filling block 2306, which is used to counter-fill the retro reflective corner cavities and the semi-mirror by applying voltage 2307. Depending on the type of PDLC or other material, either ac or dc current is required, and either low or, in some cases, very high voltage for the electric field. Some materials allow a gradual control, enabling, for example, a window in an office to become opaque in lieu of curtains, so it can be used as an RR screen. This transparency variability can be achieved by either time multiplexing or variable voltage. These layers may be applied, for example, by vacuum deposition of the partially reflective material in the appropriate thickness, and then spraying or other methods for applying PDLC on top of material before filling in with inert resin 2306 as a protection and to create a flat optical surface on the other side. Additional uses of this variable transparency RR material could be, for example, including but not limited to cubicle walls, car windows, etc.

Visual information can include a full eyeball-to-eyeball mode with correctly aligned cameras, accomplished by reserving certain locations and just embedding extra cameras in the wall for this purpose. More sophisticated methods of interaction might include moving cameras that follow the person approaching the walls or a semi-transparent mirrored display (similar to a Teleprompter) that enables the cameras to be hidden and fully aligned. A third method to achieve correct gaze alignment between two parties is to use the field-sequential nature of the projection to record camera images through a semitransparent display using strobe lighting that lights the person in front of the camera only when the display is blacked out. Assuming the camera only uses visible light, this technique may be used when IR data is being broadcast, for example, for audio, and/or concurrent with other IR beaconing operations being performed by the system. Exemplary purposes of such a technique may be to locate the viewer's instantaneous head and gaze positions.

Figure 36:
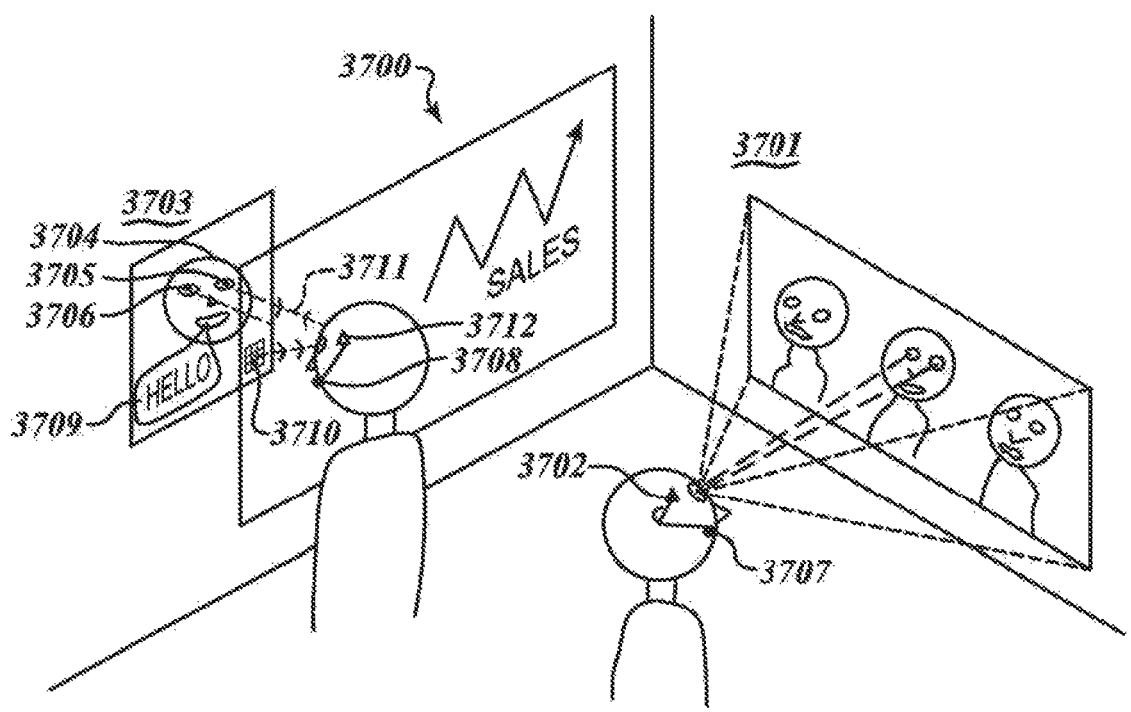
FIG. 36 shows an exemplary Whisper Wall system.

FIG. 36 shows an exemplary Whisper Wall system 3700 according one aspect of the system and method disclosed here. Each site has a group work area: cubes, bean bags, Fuss ball—a typical open office type environment that stimulates spontaneous brainstorms and ad-hoc collaboration. One wall in each site is entirely a large continuous screen. It provides a view of the other site as if it extends from the video wall 3701 onward. Team members wear some kind of wireless projection headset 3702 that is also equipped with the cameras previously described. When they want to communicate with colleagues at the other site all they have to do is approach the wall 3703. When they do, their image 3704 (real time video) increases on the screen in the other site as they approach the wall. The wall has built in cameras, for example, hidden peep whole cameras 3705 and 3706, or the screen is semi transparent and some kind of optical multiplexing (such as the variable transparency discussed herein). The camera views are seamlessly stitched together in a large relatively undistorted view of the whole area work area. Each headset has a microphone 3708 and 3707, and as the cameras 3705 and 3706 pick up a person approaching, that person is identified and the microphone is switched on, the audio stream is captured and transmitted as part of the image transmission to the other site. The image of the person may have a text balloon 3709 (for example, when muted) or other visual indicator that says audio is available. As a person in the other location approaches their end of the wall the same process happens on the other side. As they approach each other, the audio data is picked up by each of the headsets from the IR data pattern 3710 being broadcast, invisibly interleaved in the image field and detected and decoded by the camera/projector headset 3712. The person's image (on the wall) would be the preferred location for that data audio field. In this way each can have an undisturbed impromptu one-on-one meeting. Others can join by simply approaching. The audio is only played on the headsets so others in the work area are not disturbed by speakers. Ambient sound is never mixed in since all voices are recorded very close to the mouth. Natural or even whisper level talk is sufficient. Communications are directed and clear without any ambiguity about who said what still prevalent in teleconferencing today. Conversations can merge and side conversations can develop spontaneously. People can walk away, splitting off from the main conversation, and return right after by just moving a few feet. Direction of gaze 3711 and relative position determines who can hear whom and how much. Some kind of enhanced privacy mode is possible if required (one-on-one locked, muting others) or can be enforced in a private talk zone (for example, in the corner).

Reflective (Polarizing or Standard Half Mirror) Movable Visor with Projectors

A convenient alternative to "glasses," exploiting a perfect (narrow cone) retro reflective screen and also a precisely aligned optical path to both create and observe the view from the exact eye position. A visor (e.g. baseball cap) gives shade (when folded out of view) and looks "normal" in that position.

Figures 42A, 42B, 42C:
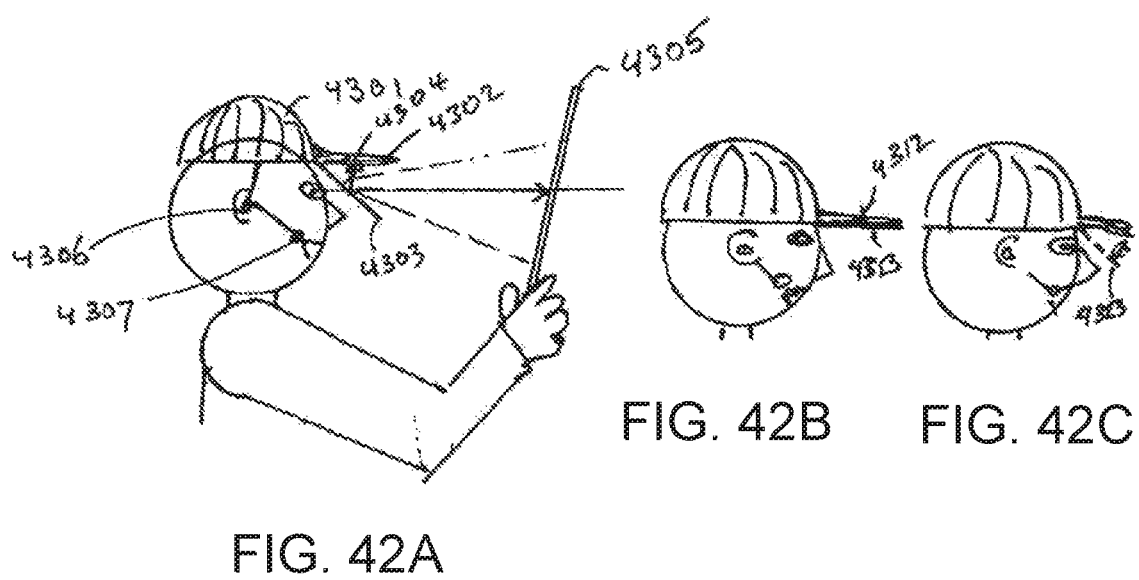
FIGS. 42A-C show examples of a reflective movable visor with projectors.

FIG. 42a shows a baseball cap 4301 with a shade visor 4302 from which a (polarizing or half) mirror is lowered when a projection is needed. Micro projector 4304 is embedded in the visor upper half and projects a scanning beam downward. After reflecting on the mirror, the scanning beam creates an image on the retro reflective screen 4305. Additional parts of the visor system are earphone 4306 and microphone 4307.

FIG. 42b shows that when not in use a second visor 4313 may be folded out of view under shade visor 4312.

As shown in FIG. 42c, mirror 4323, when in use, can be adjusted (optionally automatically) up or down to align the projection in the most comfortable viewing position. Note that this arrangement also may be advantageously implemented for non-stereoscopic viewing (with a single projection for both eyes), using a regular (non scanning) projector. Optionally, the whole mobile system, including smart phone functions, may be integrated into this type of headgear, which can also function to keep the head cool and shaded. Such a fully integrated system might be styled substantially similar to existing headgear such as a sports helmet or baseball cap, facilitating user comfort and enabling early adoption of the new technology.

Use of Auto Focus Mechanism for Converging Scanning Beam (Automatic Adjustment During Sweep)

When using an LED it may be desirable to have a scanning beam that is "over collimated," into a converging beam. This approach enables a large amount of light from the LED to be used in forming the image. Increased projection efficiency can mitigate the effect of the etendue (as used in the field of optics) limitation of LEDs. Thus there is a focal point or focal radiance distance where minimum spot size=resolution maximum is achieved. In such a case, detecting the actual RR screen distance during the sweep (scan) and adjusting the focal point is potentially of value. The beam convergence point can be adjusted by moving the lens or mirror surface, by changing the lens or mirror focus, or by moving the light source by a means, for example, of a fast piezo, or by some combination of all three methods. If multiple lenses or mirrors are used, such a method might be part of an auto focus system. Note that when a flat surface is scanned with a moving flat mirror, some part of the screen is going to be out of focus (assuming an LED pixel sequential scan).

Use of a Retina and/or Iris Scan to Secure Data

A (second) half mirror can be used to look back at the eye (or iris), in addition to projecting forward, so the low-power scan mirror would scan across the retina and the reflected light would be detected, for example, by a camera or photocell.

3-D Overlay: Recognizing 3-D Structure in View (Real and/or Projected)

In 3-D augmented reality (AR) space there is a significant challenge in how to place an advertisement, and how to mix, combine, and merge real and unreal 3-D objects correctly in the field of view. There is great commercial value, such as the value of Google advertising, in anticipating and solving the problems that may occur: For example, the added image inserted should not obstruct the view of key objects in the view (this would be annoying and potentially dangerous). These key objects in the view can be both projected and REAL. The personal viewing system described in this disclosure "mines" currently available FREE PROJECTABLE space in the viewer's gaze. The system scans for screen space and margin to permit some head motion AND not violate 3-D human factor rules (right disparity, avoid frame violations). In the case that the views are all projected (no AR, no cups or objects in front of the screen and no hands) then the disparity can be adjusted (Z depth adjusted) and room can be created for a banner ad or a cute object to attract attention (hence a dwarf or Smurf hailing the viewer). In the case that both real objects and projected virtual objects are in the current view, the system detects the real objects, such as hands in front of the screen or a cup standing on the screen, and adjusts (moves their position in available the 3-D view space) only those virtual items that are not directly related to the real items. For example, in FIG. 23, described below, the animated character 2403 must remain in same 3-D position standing on the rim of the real coffee cup 2402.

Figure 23:
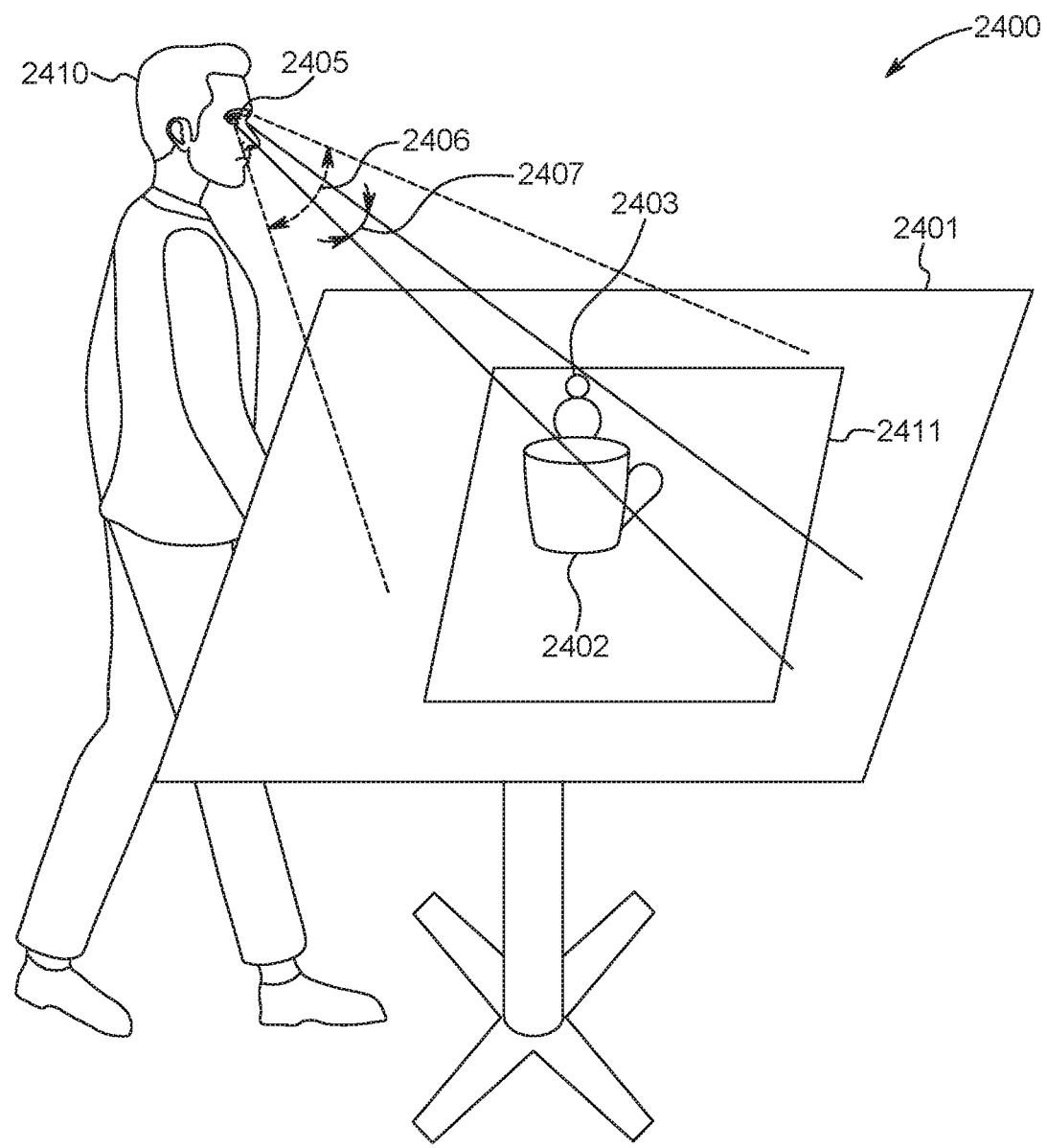
FIG. 23 shows examples of placement and viewing of real and unreal 3-D objects correctly in the field of view.

FIG. 23 shows a system 2400 according to one aspect of the system and method disclosed herein. A user 2410 sits at a table with a retro reflective surface 2401, which enables him to read a virtual newspaper, browse the web, or engage in any other, similar activity. On surface 2401 is a cup 2402, which the system senses because the cup blocks out retro reflectivity in this section of surface 2401. As the viewing aspect is known through the position on the screen and the part that the user can view, a virtual image during a sub-section of the scan 2407 is created to appear on top of his coffee cup 2302. This image 2403 could be, for example, a dancing mascot of a competing coffee company making competitive offers, generated from data showing where the user is located, determined by means such as GPS location technology from his smart phone. Camera system 2405 is head-mounted; and full scan range 2406 covers a larger area of the table than just the cup, enabling the user to read his virtual newspaper 2411. The viewer would interact with the newspaper in a very natural way, by pulling pages across. The camera in unit 2405 can see the interception of his hand in the beam, analyze the motion, and react to it as a touch screen would. Because the stereoscopic location of his hand may be determined by combining the two images of the left and right projector and camera system, the system also knows whether his hand motion applies to the surface of virtual newspaper 2411, or whether his is simply reaching for his coffee cup.

Figure 24A:
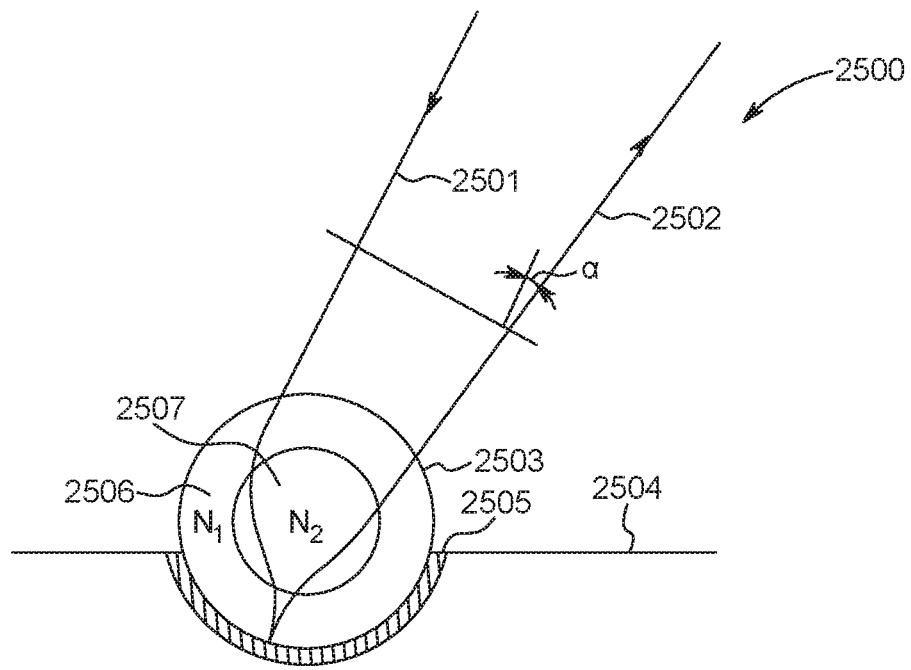
FIGS. 24A-F show examples of various spherical retro-reflectors with "tunable' retro reflecting properties.

FIG. 24a shows a retro reflective system 2500 made of multi-density spheres, according to one aspect of the system and method disclosed herein. Beam 2501 enters the sphere, is deflected through a different sphere, and comes out with a deviation alpha as beam 2502. By changing the sizes and ratio of the respective refractive indices of materials n1 2506 and n2 2507 (n refers to the refracting index of the optical material), as well as the size and extent of the reflective section 2505, the sphere 2503 may be used to create different cones. It is embedded in an RR surface 2504.

Figure 24B:
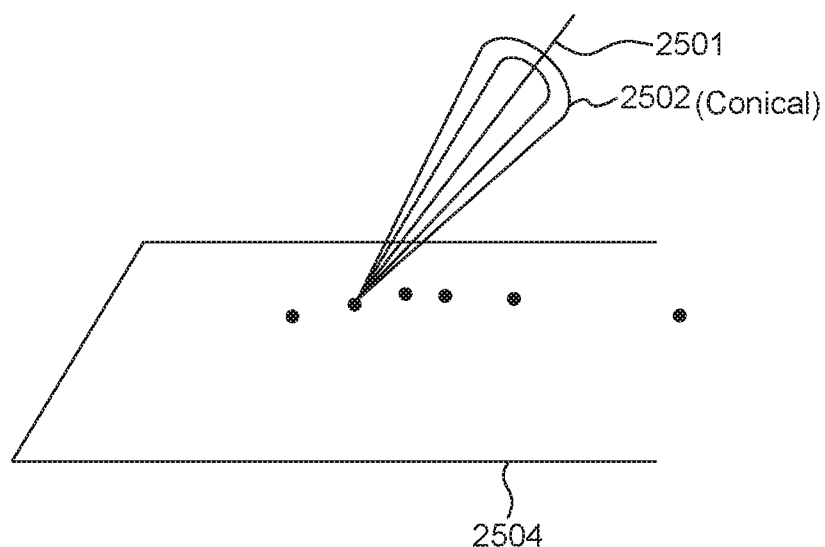

FIG. 24b shows an RR surface 2504, an incident beam 2501, and resulting hollow cone 2502. Cone 2502 is a conical, hollow cone creating a "doughnut" of light at the retro reflective surface. By adjusting the angle of the RR opening, more light is reflected toward the diffusion angle matching the location of the nearest eye, but not so far as reach the other, more distant, eye, so potential stereo vision cross-talk is minimized. For example a surface embedded with the following concentrically layered spheres creates the desired "hollow cone" or "doughnut" reflections as follows: The spheres are "concentric shell" retro-reflecting microspheres of typically less than 1 mm diameter (less than the pixel size). The inner radius is 9/10 of the total radius. The outer material has a refraction index of 2.95, which is relatively high but available (in, for example, specialty optical glasses) and the inner sphere is of a lower index of refraction index of 2.2. The advantage of this arrangement is that rays impinging on the sphere at relatively oblique angles are redirected toward the bull's eye (the direct center of the sphere as seen from the direction of the incoming ray) and thus the reflected beam is corrected in a direction more parallel than it would otherwise be without the lower index core.

Figure 24C:
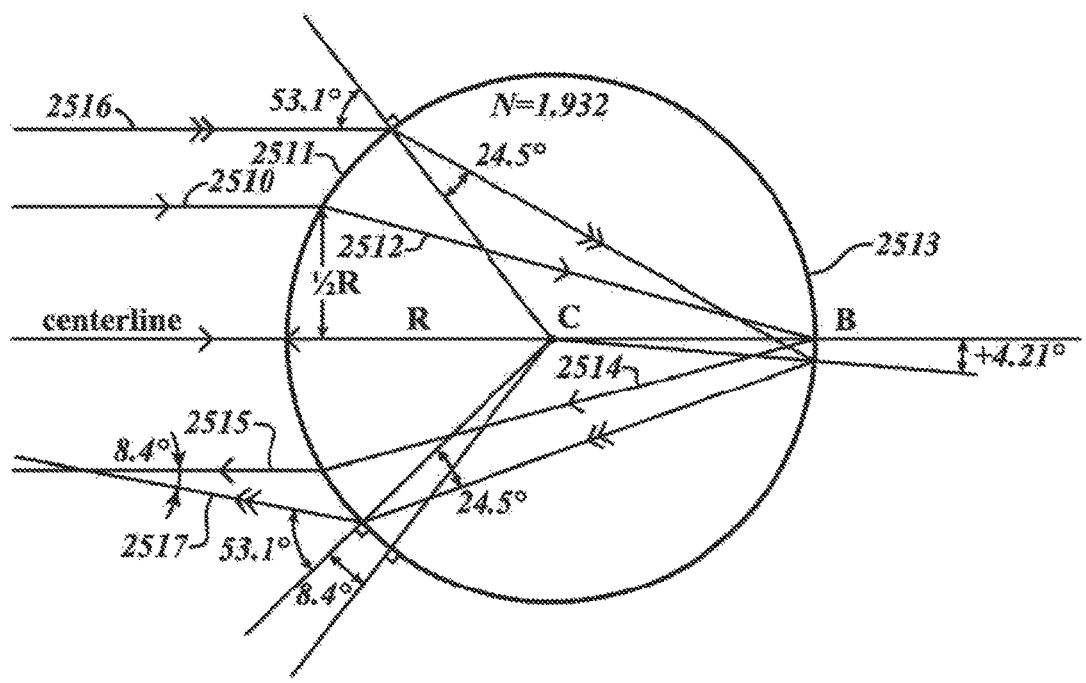

FIG. 24c shows a sphere entirely made from a transparent material, such glass or plastic. Two rays are shown. The first ray 2510 impinges on the sphere's surface 2511 at ½R (the radius) the distance from its center line (the center line is the line parallel to the direction of the incoming ray through the center C of the sphere). The incident ray 2510 impinges on the surface 2511 at 30 degrees from the normal. If the index of refraction of the material is 1.932, rays impinging at 30 degrees are precisely refracted as ray 2512 toward point B (bull's eye) on the centerline, and then reflected back by a reflective coating 2513 as ray 2514 to the front. After another refraction, the retro-reflected ray 2515 exits exactly in the opposite direction and parallel to the incoming ray 2510. A second ray 2516 is shown impinging at 53.1 degrees, which is the angle of a ray that impinges at a distance of 80 percent of the full radius. For a refraction index of 1.932, the reflected ray 2717 is 8.4 degrees diffused away from the incoming direction, creating a relatively wide cone that, for greater viewing distances, can causes undesirable levels of cross talk, hindering stereopsis. This cross talk is caused by the outer edge of the reflected cone becoming visible to the other "wrong" eye (for which the image was not intended). In a near-eye/no-glasses-required projector arrangement as envisioned, it is desirable to both maximize the light toward the outer cone of approximately the angle and at the same time cut off or redirect any light that would create such crosstalk.

Figure 24D:
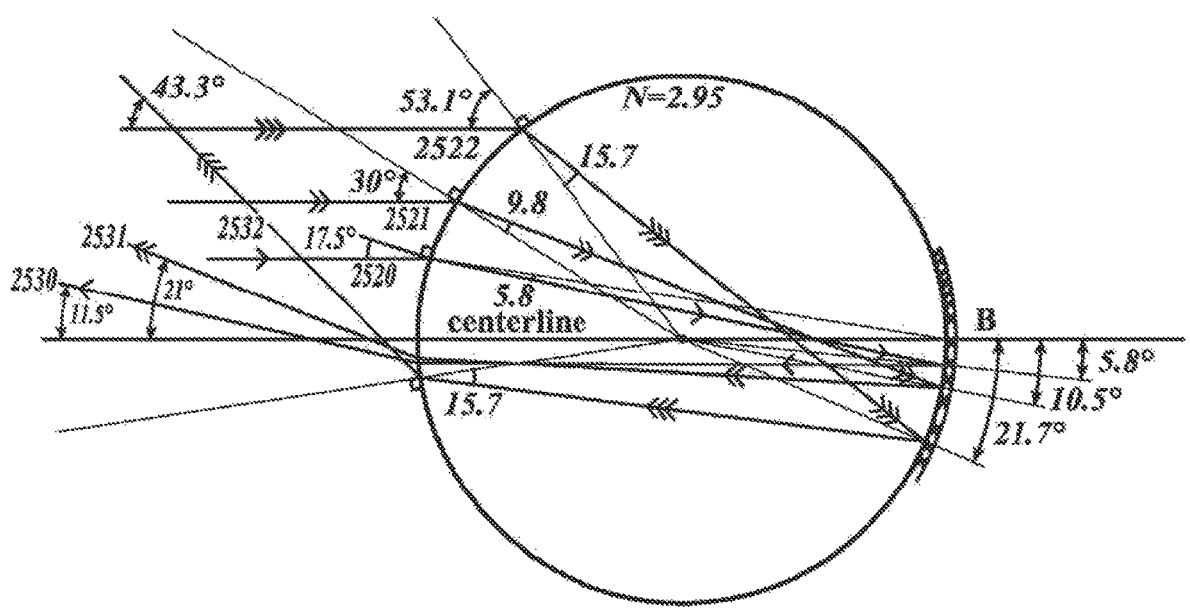

FIG. 24d shows the same configuration with a higher index material (N−=2.95). Rays 2520, 2521 and 2522 impinge at 17.5, 30 and 53.1 degrees respectively, hit at 5.8, 10.5 and 21.7 degrees below the centerline B (bull's eye), and are reflected back as rays 2530, 2531 and 2532, with diffusion angles (variance from what would be a perfect retro-reflection) of 11.5, 21 and 43.3 degrees, respectively. Clearly the sphere in C is more acting like a diffuser and not much as a retro reflector.

Figure 24E:
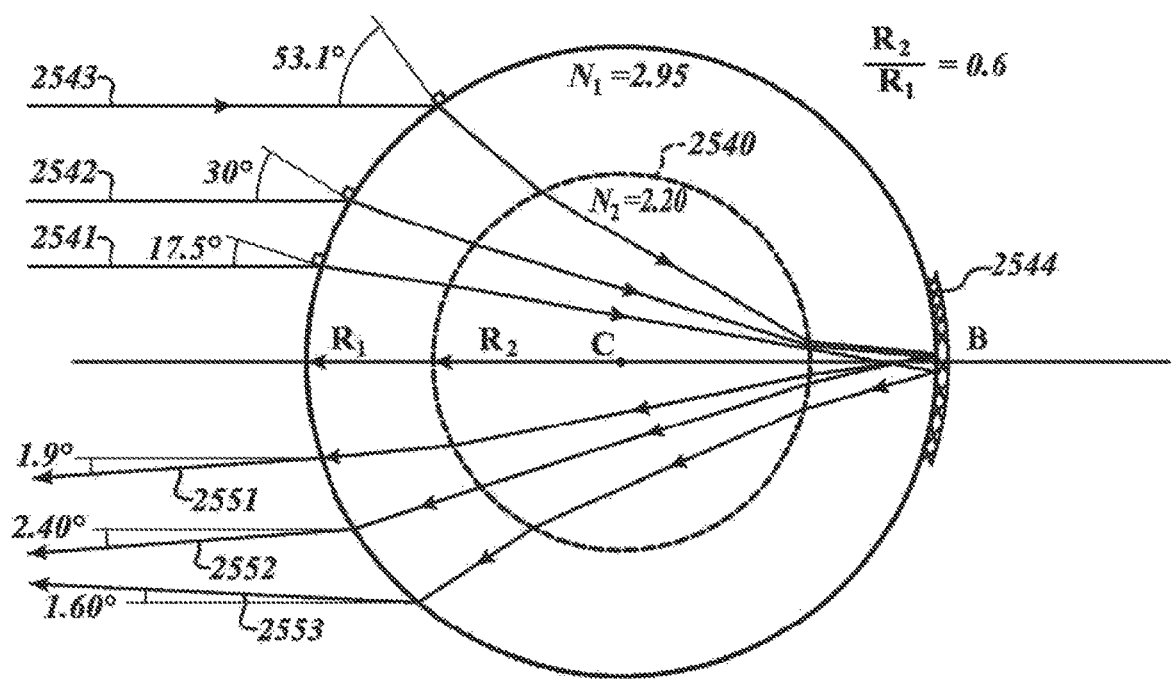

In FIG. 24e a second inner sphere 2540 (dashed line) is added with a lower index of refraction (N2=2.2). This inner sphere 2540, by redirecting the outer rays, limits the diffusion angle and thus prevents them from causing crosstalk. In this example the ray 2543 impinging at 80 percent radius (53.1 degrees) would only be diffused 1.6 percent, exiting the concentric spherical reflector as ray 2553. Thus such a concentric-shell, RR-spheres arrangement (R1/R2=0.6, N 1=2.95, N 2=2.2) limits the diffusion angles to within 2.4 degrees and therefore can work well for distances up to 72 inches, assuming an inter-pupillary distance of at least 2.5 inches (typical for adults).

Note that microspheres with a suitably high N of around 1.80-1.85 can function as an acceptable element to a retro-reflective screen to be used at short distances (less than 1000 mm).

Figure 24F:
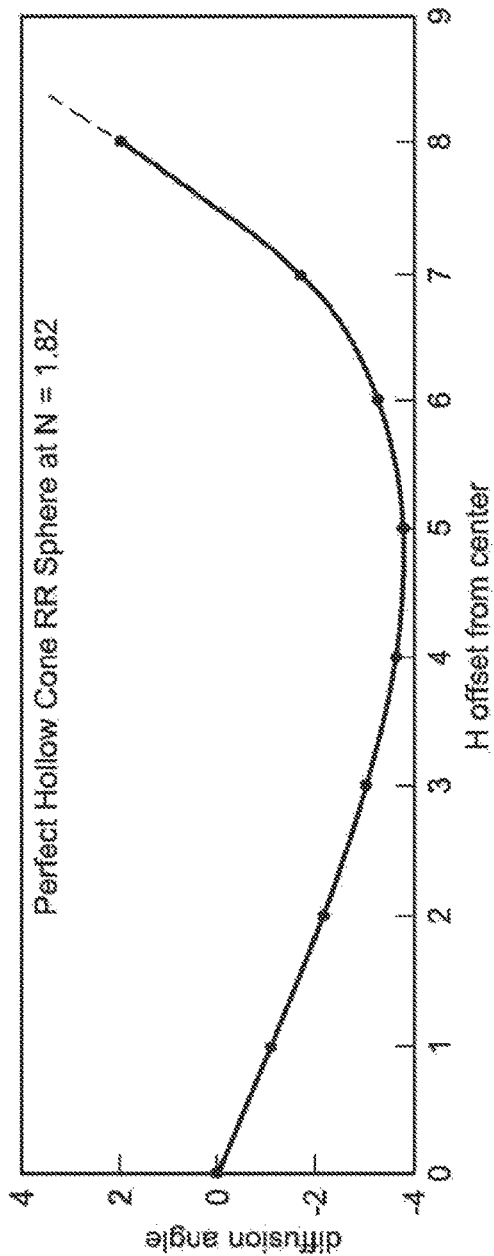

FIG. 24f shows a good "donut" shape cone diffusion for a simple sphere reflector. The graph and calculations of FIG. 24f show that for a diffraction index of N=1.82, more than ⅔ of the reflected light falls within a 4-degree angle.

Figure 25A:
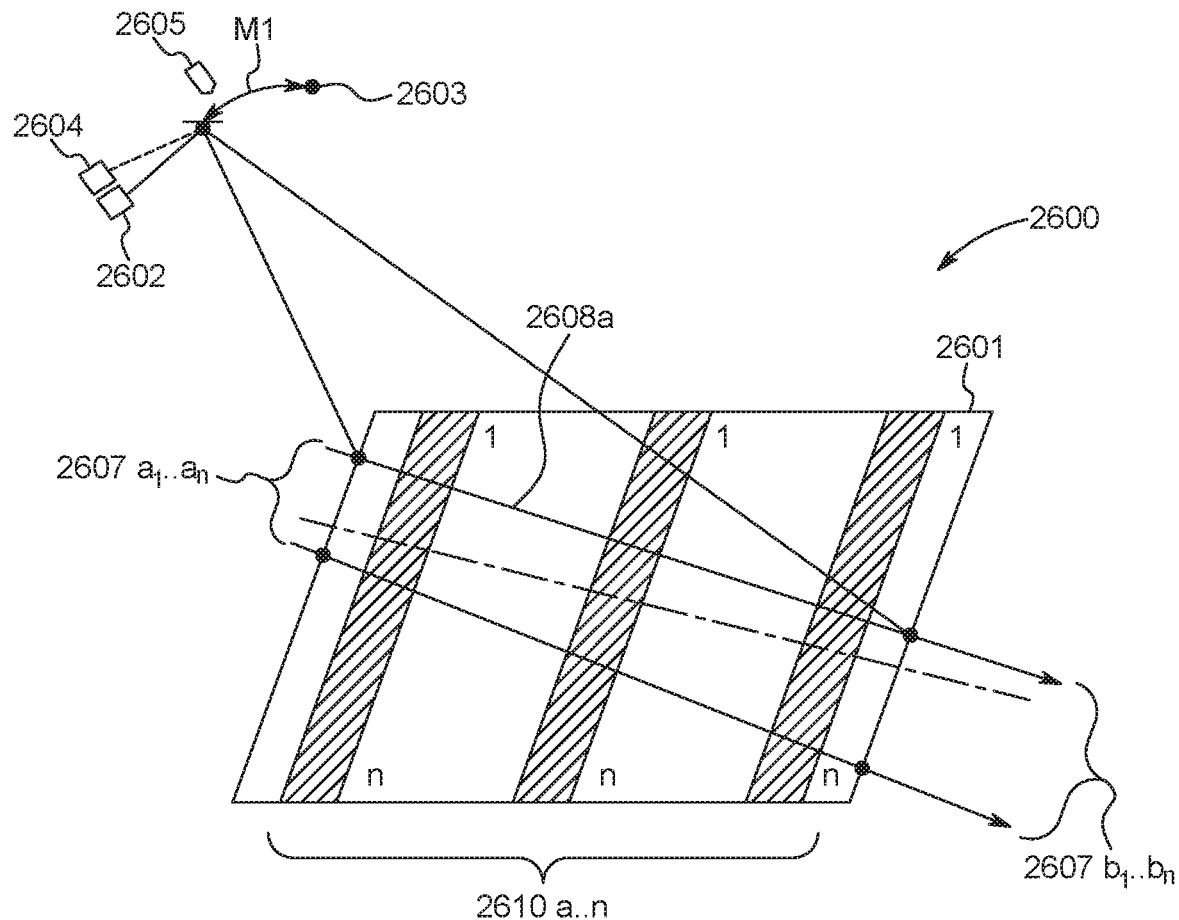
FIGS. 25A-B show examples of embedded fiducial screen patterns that enable instantaneous determination of the scanning beam's position on the screen.
Figure 25B:
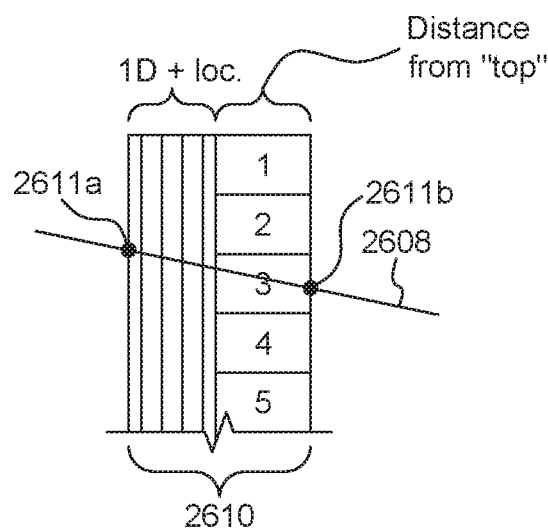

FIG. 25a shows an exemplary system 2600 according to one aspect of the system and method disclosed herein. System 2600 may be used for scanning an RR surface and using the reflection, for example with an additional infrared beam that is deflected, together with visible light. By checking for presence or absence of reflection, the extent of the reflective surface area may be scanned. Additionally, in some cases markings may be added to further augment the ability to locate the beam at any given time. Infrared light source 2602 is sending out a beam via mirror 2603 that scans a surface line 2607b. The scanning trace 2608a of the 1R beam is shown here. Also shown are intercept points 2607a 1-an at the edge of the material, which are the points where the retro-reflection starts, and points 2607b 1-bn, where it ends. Thus the extent of the surface may be determined. Even though the scanning in this example is shown going from left to right, it is clear that the scanning may proceed in either direction and in any suitable pattern, such as, for example, a zigzag pattern or a Lissajous Figure pattern. It is also clear that the geometry of the beam may be corrected with help of transformative calculations (2-D and/or 3-D) to deduce the size of the available RR surface in the system. In some cases, more than one surface may be available. As the retro-reflected beam travels back on itself, an infrared receiver may be posted either next to light source 2604 or just adjacent to mirror 2605. An infrared narrow-band filter reduces the incidence of daylight. Additionally, the infrared source may be pulse-modulated to indicate pulses and increase the energy without increasing the overall consumption of energy. The markings 2610a-n may be printed, for example, in infrared-visible only ink, which is ink that is almost completely transparent for normal light, but turns black in infrared light. Those may be used to print additional markings or stripes. In this example, stripes are printed that contain two sections: ID and location information that can say, for example, "I'm panel number n, and I'm positioned 1 inch from the left edge," and then a second section that states the distance from the top edge of the RR surface. For example, in FIG. 25b, the beam 2608 crosses the section printed with a 3 (it would be in bar code, not in numerals) indicating that section is 3 cm from the top. An ID section on the left, for example, would contain the ID, so each surface has a unique ID. This section could also contain copyrights, etc., so generic surfaces could not be used by turning off the visible light if a marking is not according to the code, etc. Certificates and other individual markings could also be embedded. By having the same beam travel across multiple stripes, even when held crookedly the system can orient itself and can, on each single beam trace, calculate the full extent and position of the surface and adjust, for example, the image, so that when a user waves with a panel, it would act like a newspaper, rather than like a projector, where the screen would move, but the projected image would remain attached to the screen (as real ink is fixed to the surface of a real paper). In some cases, the tracking screen position, orientation, and objects can be done with a single photo sensor and a low-cost projector, detecting RR edge contrast during a sweep. In some case, rather than just a single sensor, a small black-and-white (IR) sensor array (2-D or 1-D array) can be used as well for faster or more accurate detection.

Figure 26A:
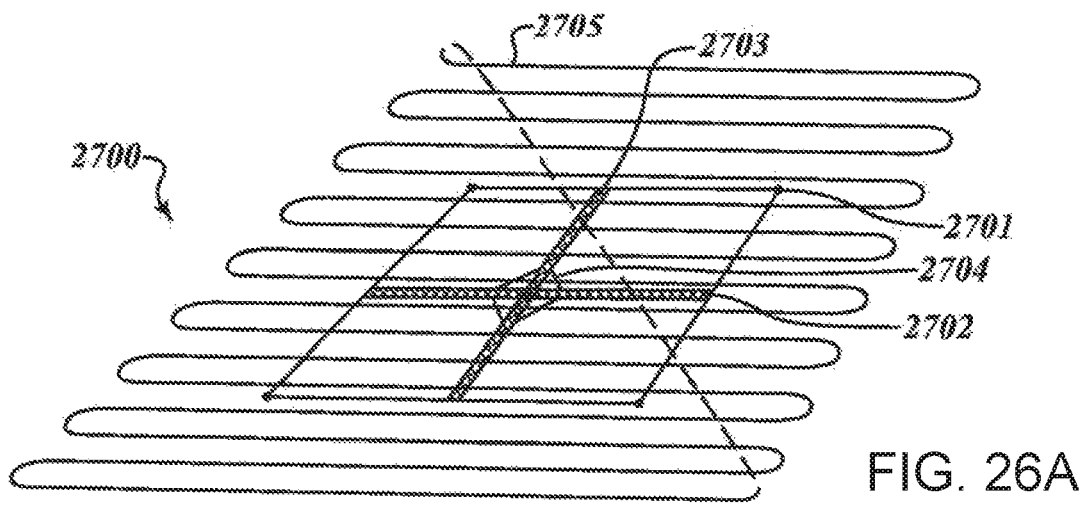
FIGS. 26A-D show examples of embedded "cross hairs" fiducial screen patterns that enable an efficient and instantaneous determination of the screen position.

FIG. 26a shows an exemplary system 2700 according to one aspect of the system and method disclosed herein. System 2700 has an RR surface 2701 marked with an IR light-absorbing cross-hair, a horizontal band 2702 and a vertical band 2703. Initially system 2700 scans in wide, broadly spaced scan lines, a pattern optimized to quickly and efficiently discover the rough position of a projection screen within the projector's operating range. Rather than continuous lines, the discovery pattern 2705 might comprise evenly spaced "pin pricks" consisting of ultra short duration laser diode pulses of e.g. Near Infra Red (NIR) laser with a wavelength of 850 nm. Such pulses might be spatially sparse, but of just sufficient intensity and frequency to guarantee detectable RR return pulses in the presence of the high-gain RR surface 2701 anywhere in the projectors' scan range. Once the screen surface 2701 has been detected, its rough center position, dimensions, and orientation are estimated from markings such as, for example, the cross bands 2303-5 or other fiducial markings.

Figure 26B:
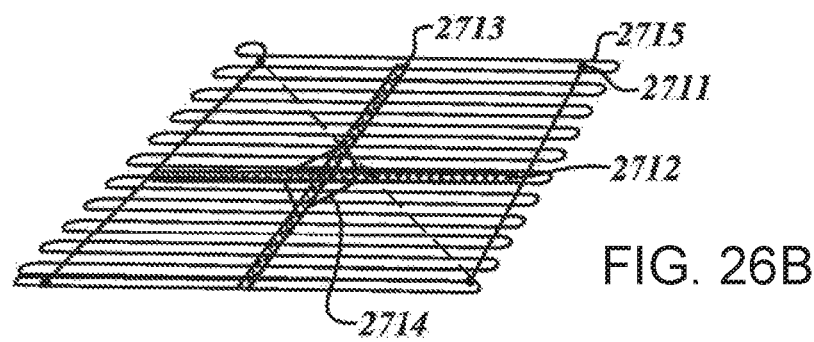

FIG. 26*b* shows a successive operational phase of system 2700, but now the scan pattern 2715 has been narrowed down to an area just greater than the contours of surface 2711. The vertical scan angle (range angular scan) of the deflection mirror (not shown) has been reduced so that the number of lines scanning on the surface can be increased while maintaining or even increasing the frame rate. Similarly, the horizontal scan angle range is reduced to shorten the "overshoot" on either side of screen 2715, or, alternatively, the screen discovery beam is turned on only during a subset of the full scan width, thus reducing the line on the time duty cycle. The second option might be preferred when a resonance type beam deflector is used.

Figure 26C:
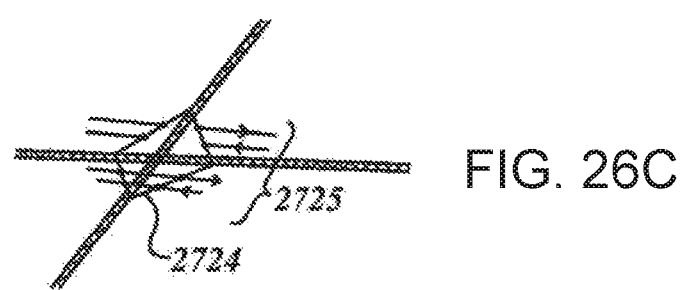

FIG. 26*c* shows how once the relative position orientation of the screen with respect to the head-mounted projectors has been fine-tuned, in an optional third phase, the IR scan pattern might only be on very briefly in the center of the cross bands to re-verify their position. As shown, just a few short (truncated) scan pulses 2725 at the expected location confirm the presence of diamond shaped center fiducial 2724.

Figure 26D:
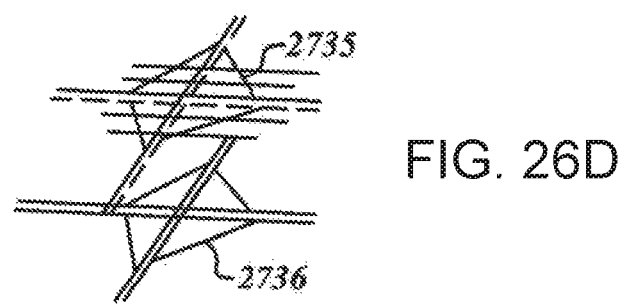

FIG. 26*d* shows an alternative approach, wherein, the screen position relative to the projectors has changed, as indicated by the change of the center fiducial from the expected (previous) position 2735 to a new position 2736.

Thus by such an escalating multi-phase scan procedure, system 2700 can discover and track changes, and carefully maintain a real-time trace on the exact location of the screen, while expending minimal energy in the process.

In many cases, a full motion 3-D user interface providing a natural interaction with virtual objects may have many 3-D objects (flashing 3-D icons, buttons, animated vectors, or action figures) projected intermittently against a dark background. In such an environment, having an accurate and up-to-date map of 3-D space as outlined above is an important part of enabling a highly versatile, efficient, always-on mobile UI. Such a system also guarantees that all objects are always correctly projected in the available 3-D space and with correct relative positions and occlusions for the viewer's particular instantaneous, unconstrained vantage point (see a discussion of adjusting for individual human factors in: "One size does not fit all").

Folded TIR and Polarizing Splitter for Projection Glasses with Thinner Glasses

If eyewear is acceptable, the dual-projection system can be integrated and a high degree of alignment can be achieved between the projection path and the eye, allowing for a stronger screen gain delivered by reflecting on an RR screen with a retro-reflection cone diffusion angle, using, for example, retro-reflective materials, such as Reflexite with narrower angles. This approach enables a greater screen distance without cross talk, lower power consumption, greater privacy, and a more controlled view angle, thus limiting unwanted shadows and occlusions when objects are in the path of the dual projectors. In addition, the projectors might be combined with existing passive or active 3-D viewing eyewear, thus optionally using the shuttering, narrow band filters (or narrow band blockers) as additional means to multiplex views, enabling, for example, greater distance to enhance R-L contrast.

FIG. 43*a* shows the placement of projectors 4401 and 4402 above the pupil center base line 4403 with a vertical displacement of approximately 15 mm. The inter-projector distance approximately equals the distance 4404 between the pupils.

FIG. 43*b* shows an alternative approach, with the right-left projectors 4411 and 4412 on each side of the eyes laterally displaced by approximately 25 mm, thus adding a total of about 50 mm to the inter-projector distance.

FIG. 43*c* shows a top view of the light geometry 4430 when the projector is placed on the side of the glasses. Projector 4431 projects beam 4432 toward a splitting optics embedded in the lens. The optics reflects the light from the projector outward toward the RR projection screen. The returning light is not reflected by the splitter, in this case because the light is polarized in one dimension, for example, vertically, and the splitter is designed to reflect all the light with this state of polarization. One such polarizing splitter is made by a grid of nano wires, which can reflect light polarized in the direction of the wires (the direction induced current can flow). To such light the splitter looks like a full metal reflecting surface. After reflection of the polarized splitter 4433, beam 4434 is then turned 45 degrees by a polarizing element (such as a one-quarter wave plate) inserted in the projection path. Upon retro-reflecting on the screen the returning wave is turned another 45 degrees so that the state of polarization of the returning beam 4436 is now 90 degrees rotated or orthogonal to the outgoing beam 4434, and the splitter is transparent. Note that the one-quarter wave plate can be laminated, or applied as coating, either on the outer lens surface or on the retro-reflecting screen surface.

FIG. 43*d* shows the projection beam path geometry 4440, which is similar to the path shown in FIG. 43*c*, except that the projector 4441 is mounted above the lens, as also depicted in FIG. 43*b*. Note that because the vertical displacement is shorter, the path traveled vertically by the light coming from the projector is shorter, and because typically the projector's throw vertically is a smaller angle, the lens can be thinner and lighter.

Figure 43E:
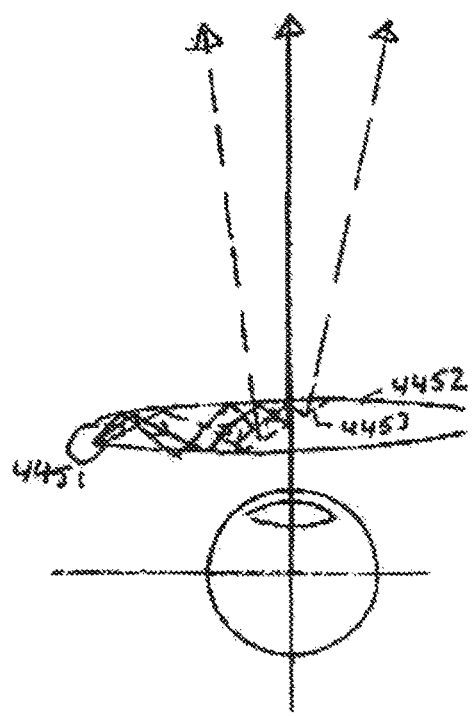

FIG. 43*e* shows the projector mounted on the side, as in FIG. 43*c*, but now the projector's light path is reflected at oblique angles by total internal reflection (TIR) inside the lens 4452 and reflecting off a polarized splitter 4453 toward the screen. The resulting, more oblique, angle of reflection allows the splitter to be angled more parallel to the lens and allows the lens to be thinner.

Figure 43F:
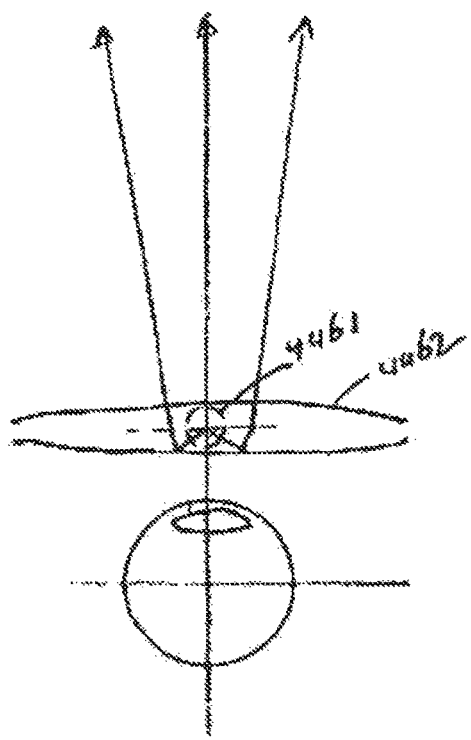
Figure 44A:
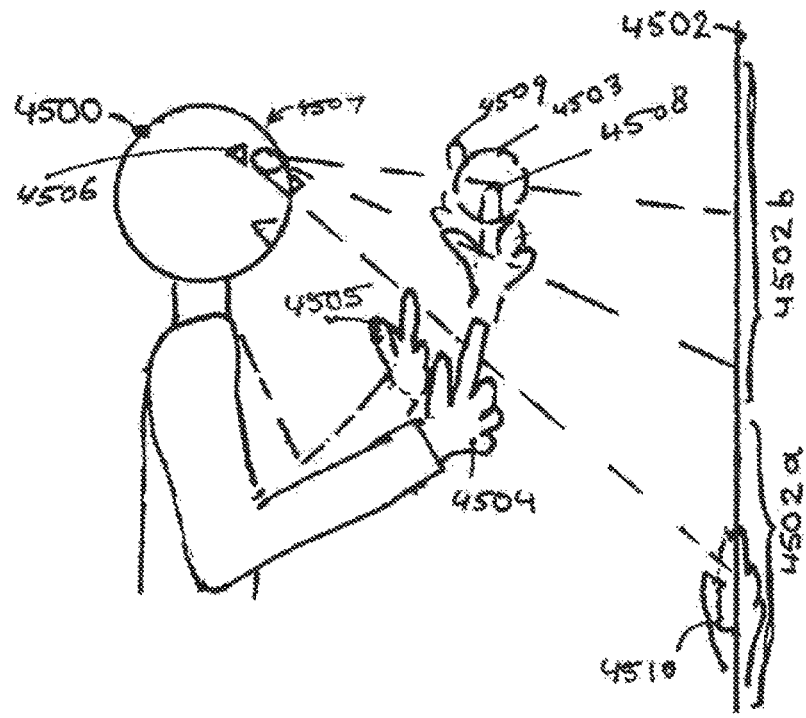
FIGS. 44A-D show projection of "virtual hands" in stereo 3-D.
Figure 44B:
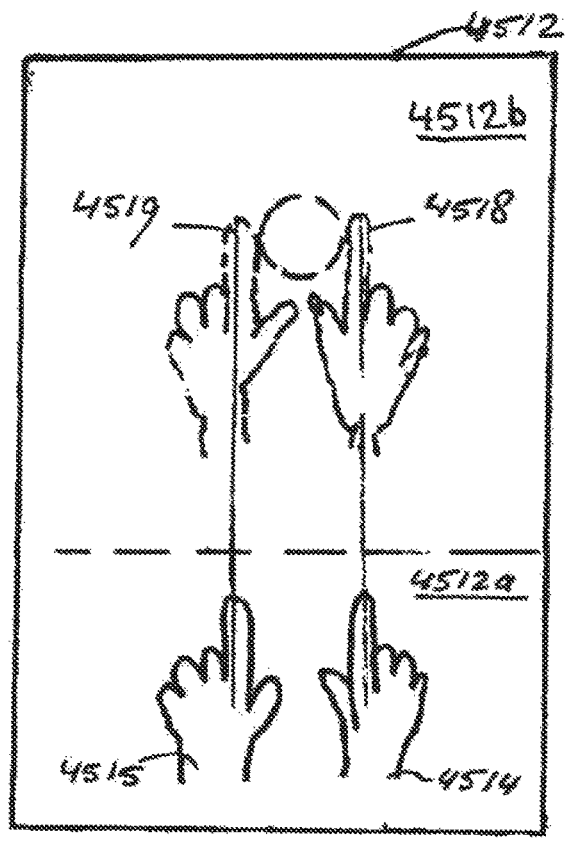
Figure 44C:
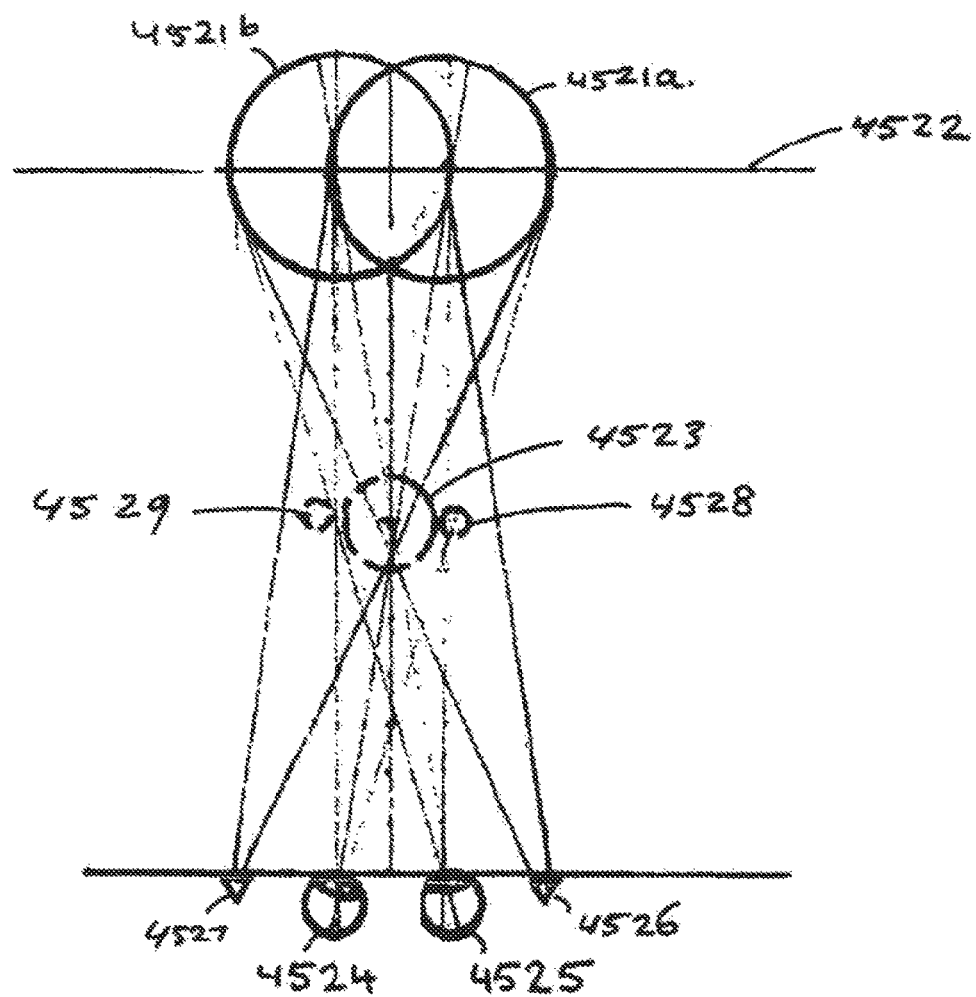

FIG. 43*f* shows the same TIR reflection shown in FIG. 44*c*, but with the projector 4461 on top of the lens 4462, yielding the thinnest and lightest lens in this series of options.

Figure 43G:
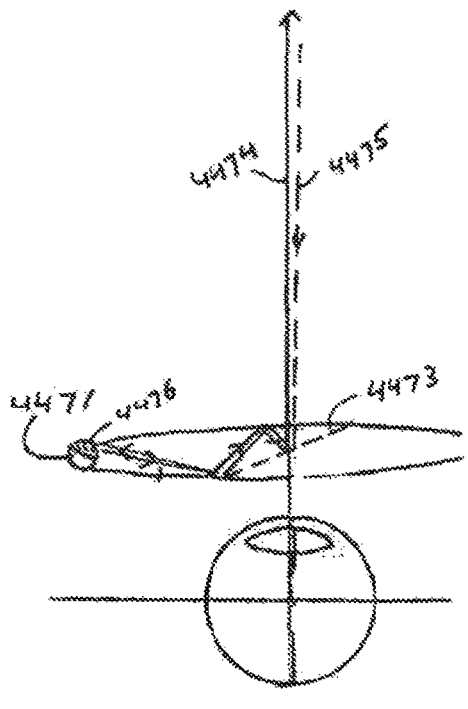
Figure 43H:
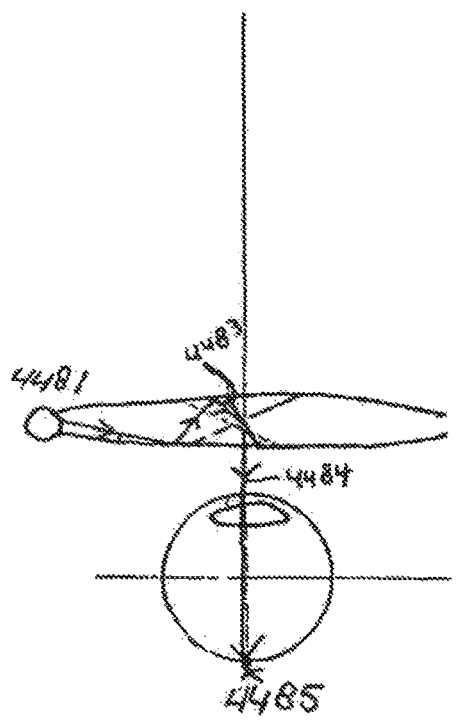

A Hybrid Retinal Projection System Scanning the Field of View Enabling an Advanced User Interface In existing HMD eyewear, similar reflective and splitter optics are used to project into the eye directly, creating a so-called retinal projection. It is, in principle, possible to combine both functions in one set of eyewear, as depicted in FIG. 43*g* and FIG. 43*h*. Note that the two figures describe two functions of the same system at the left lens, seen from the top. A scanning laser "femto" projection engine (further described in the discussion of FIGS. 34,35,37 and 38) creates a visible light pattern directly on the retina 4485, with visible light beams 4484 (shown in FIG. 43*h*), and said projection engine simultaneously projects a matching pattern 4474 outward toward an RR screen, where it is reflected back as RR beam 4475, as shown in FIG. 43*g*. Returning back at the lens, beam 4475 is reflected back toward the scanner 4471 and detected by a sensor 4476. Crossed beam splitting devices 4473 and 4483, in the middle of the lens, redirect some of the primaries 4484 directly into the eye and others in the opposite direction. This arrangement enables projection of a highly visible image without requiring an RR screen, providing see-through HMD functions and using minimal power. At the same time, outwardly directed beams scan the space ahead. The scanning beams may be, for example, of invisible NIR wavelengths that are reflected by a dichroic mirror, or Bragg-style narrow band reflection on surface 4473. The outwardly scanning beam 4474 can stereoscopically probe for near objects, such as hands, as part of an interactive gesture-based user interface system, or be pulsed to provide 3-D ranging function. The key advantage of the arrangement is a light, wearable headset that provides an exactly eyesight-aligned sensing projection combination. Such a function enables perfect 3-D image-object alignment for augmented reality UI functions, for example, to help align the projected images with viewed realities (as depicted in FIG. 23) with simple intuitive calibration options, as described elsewhere (as depicted in FIG. 29).

One Size does not Fit all: Human Factor Adjustment Requirements in Stereoscopic 3-D Imaging Human stereovision (stereopsis) is a finely tuned brain function that develops an integral part of our spatial awareness, that is, our perception of the reality around us. Violation of this reality perception can cause significant discomfort, such as headaches, blurred vision, and nausea. Overlong periods of exposure to any such violations of reality perception may seriously affect our natural vision abilities. The system and method disclosed herein includes the ability to detect and customize 3-D projection for individual vision requirements, thus permitting a satisfactory and joint viewing experience on the same screen for multiple viewers who may have significantly different human factor requirements.

Because no two eyes are precisely identical, the developing brain develops maps that enable it to fuse the right and left view into a single spatial 3-D perspective. This visual mapping process is continuous from early childhood. As we age or our eyes change, our optics are augmented or altered by glasses. The brain tries to readjust for the distortions that are introduced. It is, therefore, not surprising that no two eyes see the world exactly alike. Age has a very significant impact on vision, not only in accommodation range and depth, but in color perception and many other aspects. When creating an artificial reality, such as a stereo 3-D image, the more a system can detect and adjust for individual eye optics and vision characteristics, the fewer artifacts there are, and the more natural, the more "real," and the more comfortable the experience is.

With existing means of creating the illusion of 3-D by presenting a "standard view," left/right view disparities at incorrect focal distances pose significant challenges to our vision system. Moreover, particularly in mobile systems, individual human factor adjustments are required within the 3-D view space to compensate for dynamically changing viewer-screen geometry.

Detecting and Adjusting for Interoccular Distance

Since the distance between eyes of individuals varies, detecting this distance and making the right adjustments for it is quite important to guarantee viewer stereo 3-D vision comfort and safety.

Figure 29A:
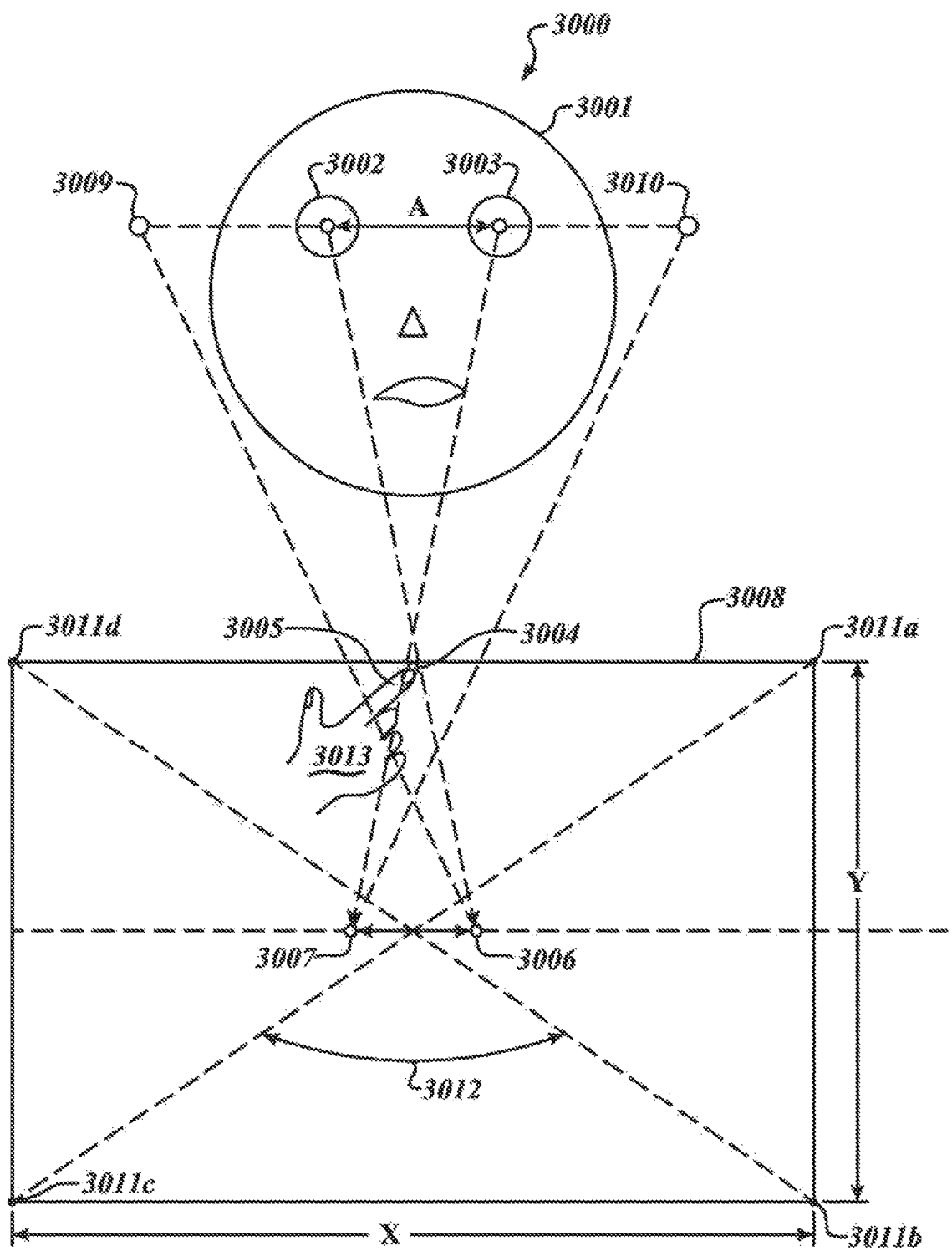
FIGS. 29A-E show examples of detecting and adjusting for intraocular distance and establishing consistent 3-D perspectives for multiple views.

FIG. 29*a* shows a system 3000 according to one aspect of the system and method disclosed herein. By simple, natural hand-eye coordination, system 3000 can detect and adjust for individual intraocular distance. Dual head-mounted projectors (Eye Stalks) 3009 and 3010 locate RR screen 3008 by, for example, detecting corner fiducials 301*la-d*. By means described elsewhere (see the description of FIG. 26) the system determines the exact center of the RR surface (where diagonals cross). Because absolute screen dimensions (X and Y) are known, screen distance is easily determined by measuring the angular extent of the rectangle formed by 301*la-d* in the projectors' field of view. The system then projects a 3-D point image (for example, a small ball) that is intended to be perceived as floating approximately at one-half the Z distance from the screen.

Viewer 3001 is prompted to point the index finger 3005 of her right hand 3013 exactly at the point where she sees the ball 3004 float. The dual RR shadows of the tip of the pointing finger is detected by projectors 3009 and 3010, and because the projectors are at known spatial locations, the exact positions on the screen of two fingertip shadows (not shown), referenced geometrically against the screen fiducials, allows the system to determine the exact spatial position of the fingertip 3004. Triangulation of actual finger position, matched with perception, suffices for the system 3000 to estimate the distance.

Figure 29B:
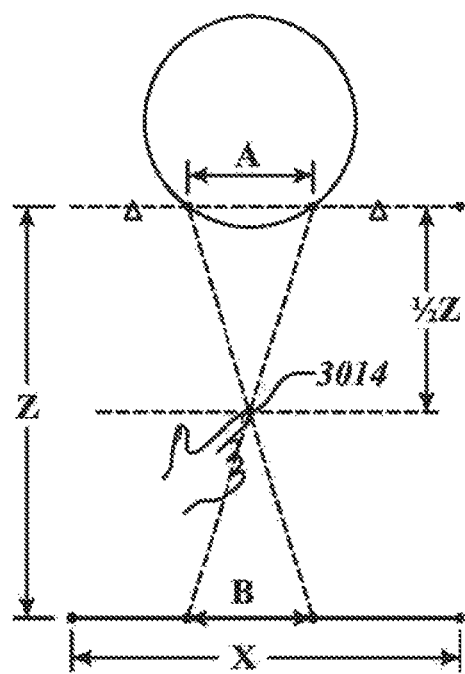

FIG. 29*b* (inset) shows an exemplary top view of this calibration procedure. When finger tip 3014 is held at one-half the distance Z to the screen, and the ball floats in the same perceived one-half Z depth, then the disparity distance B between the ball's projected left and right images equals her inter-ocular distance A exactly. Other ball positions left and right from the center and above and below the primary center of gaze—pointed at with a finger or pointing device—can further map the disparities required to faithfully represent 3-D, both in terms of horizontal and vertical disparity and the gradients of these disparities across an individual's view space.

Calibration to a Joint 3-D Reference to Ensure a Unified 3-D View (Shared Real-World Coordinates)

Figure 29C:
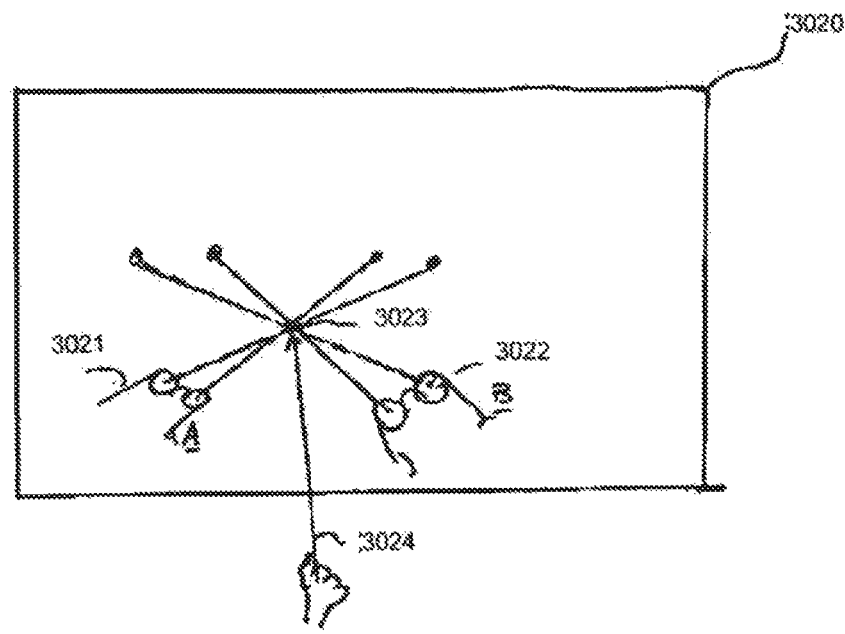

FIG. 29*c* shows two viewers A and B with projecting devices 3021 and 3022 viewing RR screen 3020 in a procedure analogous to the one previously described in the discussion of FIG. 29*b*. Now one of the viewers holds up a pointing device 3024 indicating where the small projected reference object is seen in 3-D. The projection devices 3021 and 3022 then fine tune their exact disparities by adjusting the four images (one stereo pair for each viewer), and the procedure can be repeated for various calibration positions. This procedure is enabled by both systems and both players sharing the same screen fiducials and by at least one common view of a pointing device or real object in front of the screen as an additional spatial fiducial.

Figure 29D:
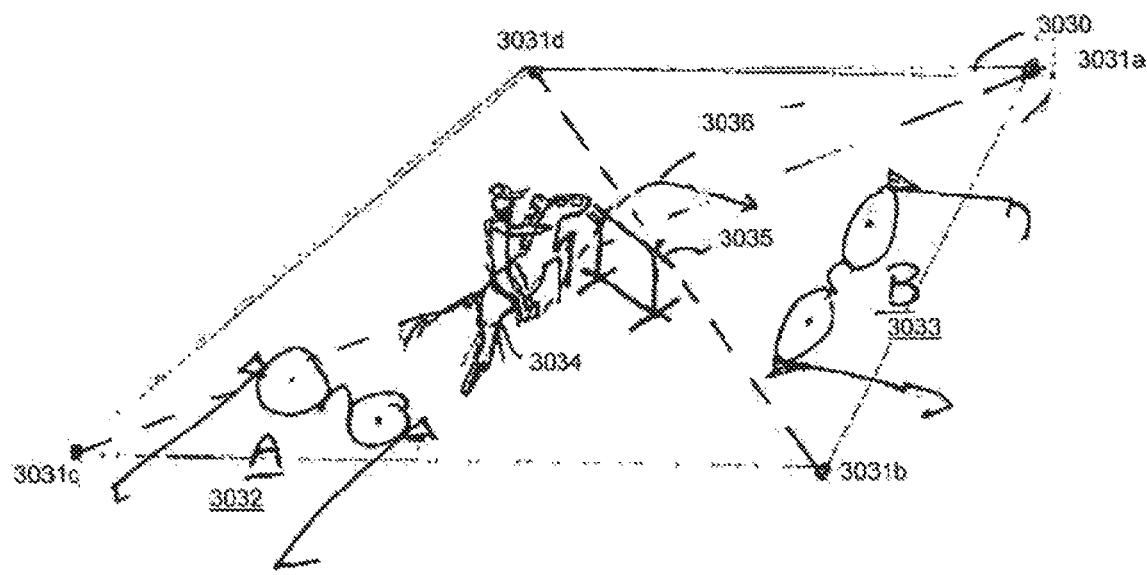

FIG. 29*d* shows how, instead of a pointing device, a small object, for example, a part of a 3-D board game, may serve as an additional spatial fiducial reference to align two or more 3-D projections. In this particular example the board game has a horizontal retro-reflecting play projection surface on which a miniature "steeple chase" jumping barrier is positioned somewhere. The surface has fiducial references such as, for example, the corners 3031*a*, 3031*b*, 3031*c* and 3031*d*, which allow both projection devices to identify the exact center position and orientation of the play surface. Device 3032 of viewer A and device 3033 of viewer B can clearly identify the real 3-D position and dimensions of the jumping barrier 3035, by referencing it against the RR screen below it, in part by seeing the high RR contrast shadows (not shown) detected where the object's features block each of the four projection beams (not shown) and (optionally) in part by motion parallax as the viewers' heads move around the playing surface, using successive observations of the stationary object to determine its exact location. As with the play surface, the game system may also have prior knowledge about the exact dimensions of the object. Having determined the accurate position of the barrier 3303, in stable world coordinates, both players see the exact same horse 3034 and rider just barely clear the barrier 3035 during the jump 3036 across the barrier. Having the two 3-D views unified into a shared and realistic 3-D experience makes the game interesting.

Figure 29E:
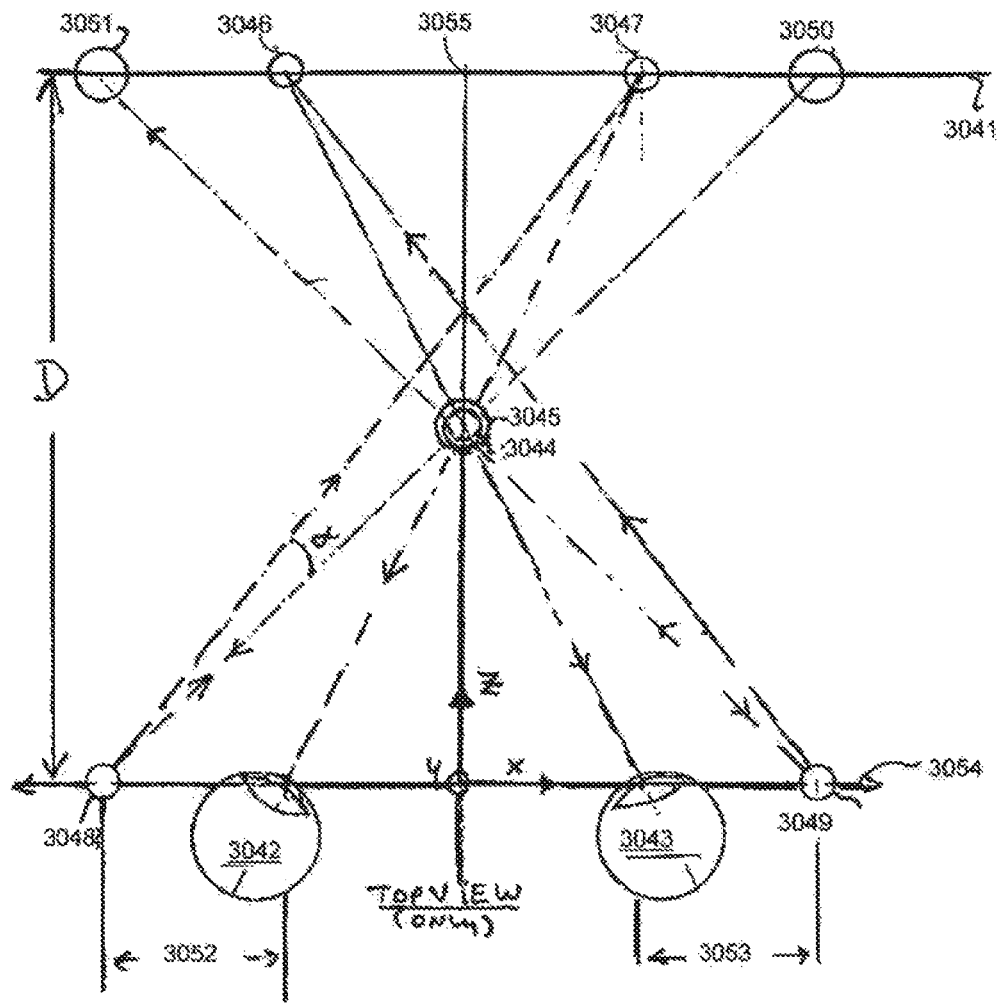

FIG. 29e shows the top view (as shown in FIG. 29b) with finger 3045 (outer circle) pointing at the perceived location of ball 3044 (inner circle). Note that there are two ball images 3046 and 3047 on the screen 3041 seen by eyes 3043 and 3042, projected by Eye Stalk projectors 3049 and 3048, respectively. After calibration as illustrated earlier in the description of FIG. 29a, the eyes see the real finger at the same 3-D position as the virtual ball. However, each projector, using feedback from the photocell or camera in the Eye Stalk, detects shadow 3050, for the left Eye Stalk, and shadow 3051, for the right Eye Stalk. These finger shadows have a greater degree of disparity than the ball images; that is, there is a greater horizontal displacement between them. By estimating the angular displacement alpha between the ball images 3047 and the finger shadow 3050, and by knowing the distance to the screen D and the position of the finger 3045, this procedure enables an accurate calibration of the lateral offset distances 3052 and 3053 of the left and right Eye Stalks 3048 and 3049 to each corresponding eye 3042 and 3043.

If there are also Eye Stalk offsets in the two other directions (denoted as Z, toward the screen, parallel to the primary center of gaze 3055, and Y, for the vertical orthogonal to both Z and the baseline 3043 direction X) they can be determined by analogous methods as described in the previous discussion of FIG. 29b.

In conclusion, by the methods of calibration described in the preceding sections, the exact positions of eyes, the Eye Stalks, and screen position and orientation are determined. These geometries are then used as the foundation for rendering a most realistic and comfortable stereoscopic 3-D perception, with a precisely rendered motion parallax, and with the right horizontal and vertical disparities for each object in the 3-D space, as explained further in the next section.

Other Human Factors Adjustments: Viewer Head Turn (Adjustment Toward the Gaze)

Figure 33A:
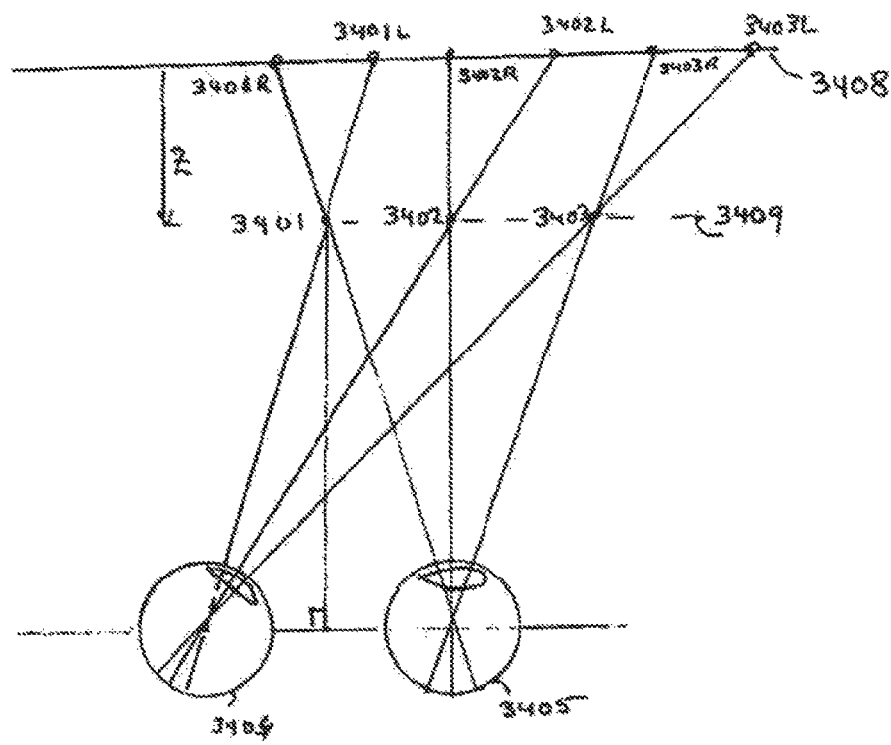
FIGS. 33A-C show detection of and compensation for head rotation to avoid distortions occurring as a result of head movements in a stereoscopic 3-D projection.

FIGS. 33a and b show the optical divergence in the Z-axis of an object observed outside the central view of a human. In these examples, the vertical (Z-axis) offset is roughly equal to the distance between the viewer and the screen, to exaggerate the effects. Though the human brain corrects for the optical disparity, a lack of such disparity may contribute to the nausea some people get when watching CGI 3-D content, for example. This phenomenon (optical disparity) creates in some cases the head-turn artifacts under discussion below.

Figure 32A:
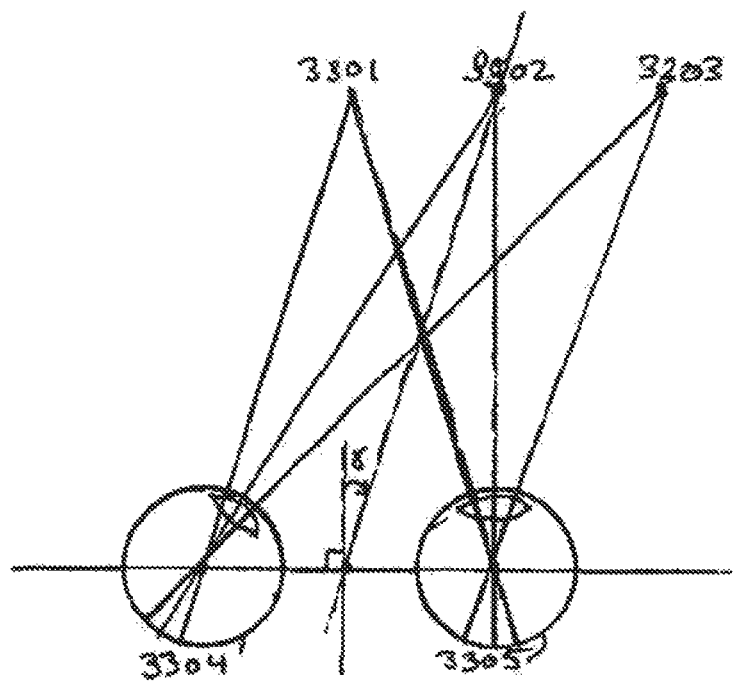
FIGS. 32A-B show the optical divergence in the Z-axis of an object observed outside the central view of a human and the effect of head rotation.

FIG. 32a shows a viewer watching three object points 3301, 3302, and 3303 in the fronto-parallel plane (for example, as seen in a projected 2-D image). When the left and right eyes 3304 and 3305 fixate on the middle object 3302, its image is centered in the fovea of each eye. Because it is closer, the retinal image of the left object 3301 has greater angular disparity than that of the right object 3303 (as shown in FIG. 32a, 14° versus 12°). The total angular separation between points 3301 and 3303 is greater for the right eye because the eye actually is closer to the objects. (As shown in FIG. 32a, the angular separation is actually 10° more, 36° versus 26°.)

Figure 32B:
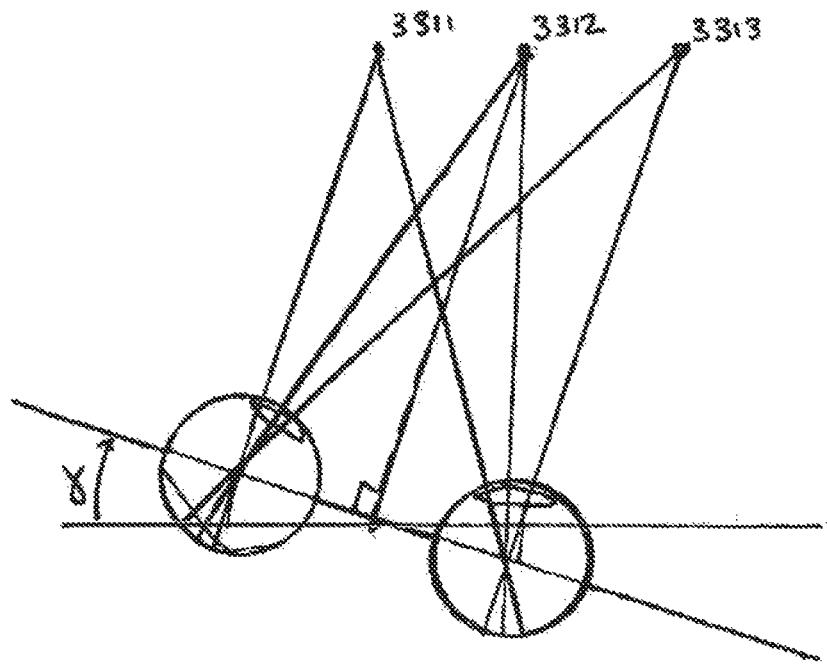

FIG. 32b shows a head rotated (approx 19°) toward the center of gaze, fixing on point 3312. In this example, the retinal angular disparities are significantly reduced. As shown in FIG. 32b, the angular disparity is reduced to 5°, half of what it was before the head rotation. The total angular spread of the three-point image seen by the left eye increases to 28°, while for the right eye it decreases to 33°.

Figure 33B:
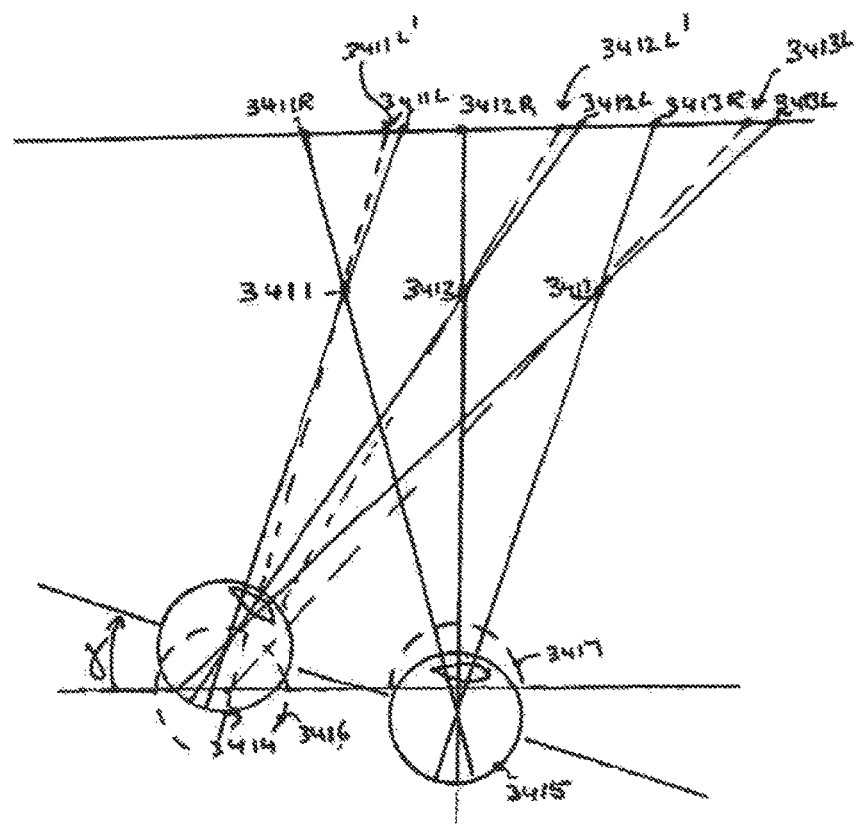

For virtual images, such as those created by stereoscopic 3-D projection, where the actual images are not at the perceived location, head rotation must be detected and compensated for to avoid distortions occurring as a result of such head movements. FIG. 33a and FIG. 33b show the same geometric view, but now three points 3401, 3402, and 3403 are projected in an imaginary plane 3409 at some distance Z in front of the actual screen surface 3408.

In FIG. 33a, again the initial head position is with the ocular baseline parallel to the screen. The right eye sees 3401R, 3402R, and 3403R, and the left eye sees 3401L, 3402L, and 3403L. The three points are perceived exactly as before.

However, as shown in FIG. 33b, to maintain these exact positions during the head rotation (the adjustment of the visual baseline toward the center of gaze) all the projected images must be adjusted. As shown in FIG. 33b, the shift of the left eye from position 3416 to the new, more forward, position 3414 requires a rightward move by the points 3411L, 3412L, and 3413L from their previous projection positions 3411L', 3412L', and 3413L'.

Without such adjustment, the stationary images within a wide field of view may wobble and geometrically distort during head rotations required for adjusting the gaze in taking in a wide field of view. The experience can be disconcerting and interfere with motion stability during, for example, interactive 3-D simulated training events.

Maintaining a fully natural 3-D vision experience during head motions requires instantaneous adjustment of horizontal and vertical disparity, horopter adjustments for off-center views, vertical horopter and tertiary fixation points (the effect of a greater vertical disparity for the closer eye, known as the ipsilateral eye (see also FIG. 33c, described below). All the effects of gaze changes are detectable by the system because it can determine the exact head position, therefore determine the viewer's baseline, frontoparallel plane, the plane parallel to the face, and orthogonal to the primary position of the gaze. Therefore the system can make adjustments to ensure that artifact-free 3-D views are rendered for all vantage points by an auto calibration procedure analogous to the procedure described in the previous discussions of FIG. 29a and FIG. 29b.

Unique retinal structures and eyeball shapes are personal vision abnormalities that in many cases can be and need to be compensated for to maximize comfort when using 3-D images over long periods, for example, in a work environment.

Following is a simple example of the improvement over standard 3-D during an activity such as, for example, watching Avatar in an I-max theatre: A flying object becomes visible in 3-D at the extreme top right corner of the screen. A viewer notices it, his eyes make yoked movements rotating in the direction of the object to fixate on it, then (and only then) he naturally starts turning his head toward it, bringing the object to the center of gaze position (turning the head from previous center-of-the-screen position) toward that upper right corner. The right and left images should change in vertical disparity during this movement. This is currently not the case in the theater.

Figure 33C:
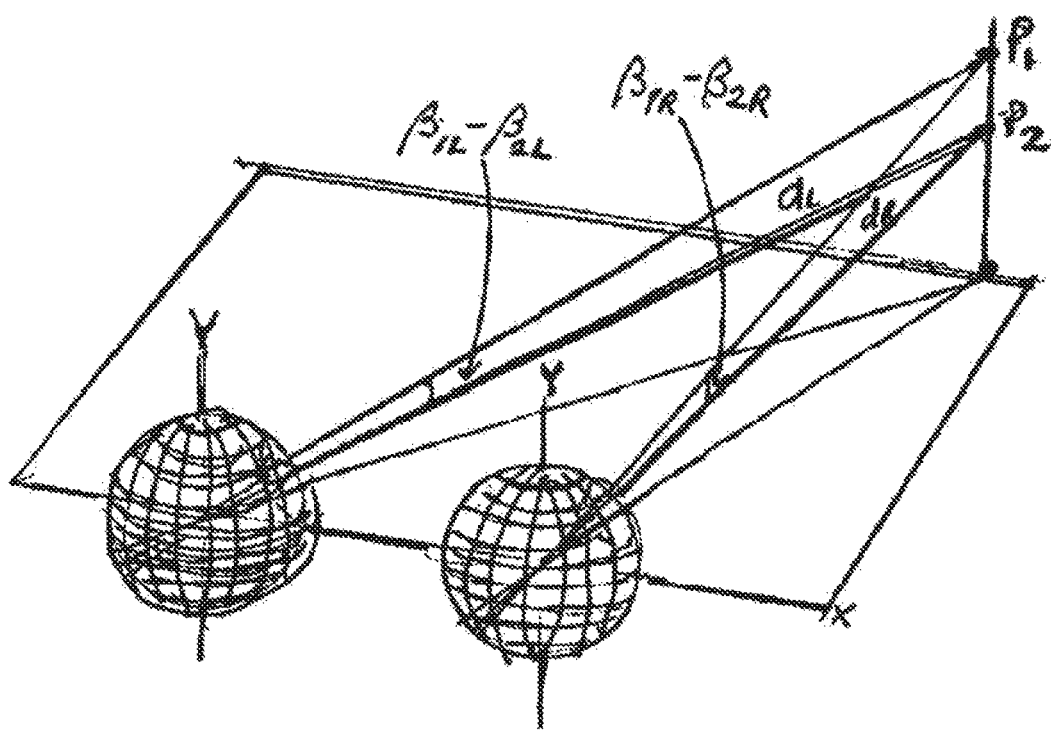

FIG. 33c shows how the relative vertical disparity of two points PI and P2, which, in this example, may be defined as relative vertical disparity=(β1L−β2L)−(β1R−β2R) (see Ian P. Howard, Brian J. Rogers: Binocular Vision and Stereopsis, p. 282), depends on how far the points are angularly removed from the primary center of gaze (the point of fixation when looking straight ahead). Close objects at the outer ranges of binocular view have the greatest vertical disparity. For realistic mobility training, in sports for example, the vertical disparity is an important effect to get right so a viewer can duck a projectile coming from the side. As with horizontal disparity discussed in the description of FIG. 33b, vertical disparity is reduced by the viewer turning toward the object. This head rotation, bringing the object toward the mid sagital plane, reduces both horizontal and vertical disparity.

Embossed Spherical Retro-Reflection Structure

Figure 28:
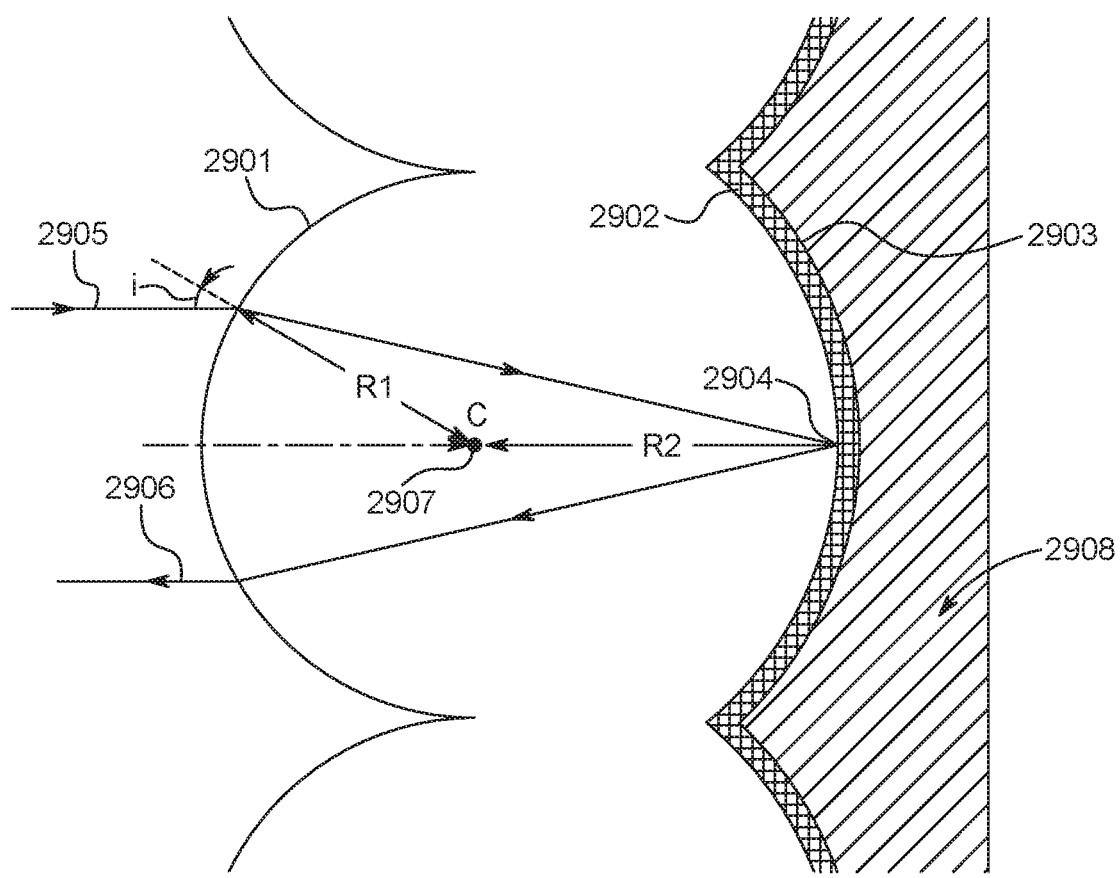
FIG. 28 shows an example of a dual-radius spherical retro-reflector.

FIG. 28 depicts an example of a dual-radius spherical retro-reflector. Light ray 2905 impinges on the front spherical surface of radius R1 with an angle of incidence i of 30 degrees. It is then refracted and reflected at a spherical back surface 2902 with a radius R2 greater than R1 but with the same center of curvature 2907 as the front surface 2901. Choosing the refraction index N of the lens material correctly enables the refracted beam to be directed toward the bull's eye 2904, which is the intersect with the spherical back surface of a line through the spherical center 2907 and parallel to the incoming ray 2905. Reflecting on a reflective coating 2903, the ray symmetrically continues back to the front and exits exactly parallel but in the opposite direction of ray 2906. In this example the ratio R2/R1 is 1.4142 (square root of 2), and achieving perfect retro-reflection at an angle of incidence of 30 degrees requires an index of refraction of 1.65. The advantage of this structure is that the top and bottom surfaces 2901 and 2902 can be molded (embossed) at the same time from a sheet of plastic material, after which the back surface can be coated with a metallic reflector (2903) and optionally with additional structural filler and/or adhesive layer 2808. The light incident at other angles is reflected in the desired "doughnut cone" distribution pattern. The advantage of this design over the prior art of a surface coating with highly refractive microspheres is twofold:

1) This design is moldable as one simple solid form structure, due to the extra distance between the back and front surfaces. By contrast, spherical reflectors with single-radius or dual-shell designs require additional coatings, adhesives, assembly, and many more manufacturing steps.

2) Due to the larger back radius, this design requires a lower refraction angle and therefore can use lower index materials, for example, 1.65 as compared to 1.9 or higher, which materials are more easily sourced and less expensive.

Personal Projection Prompter Mobile Teleprompting Device

Figure 30A:
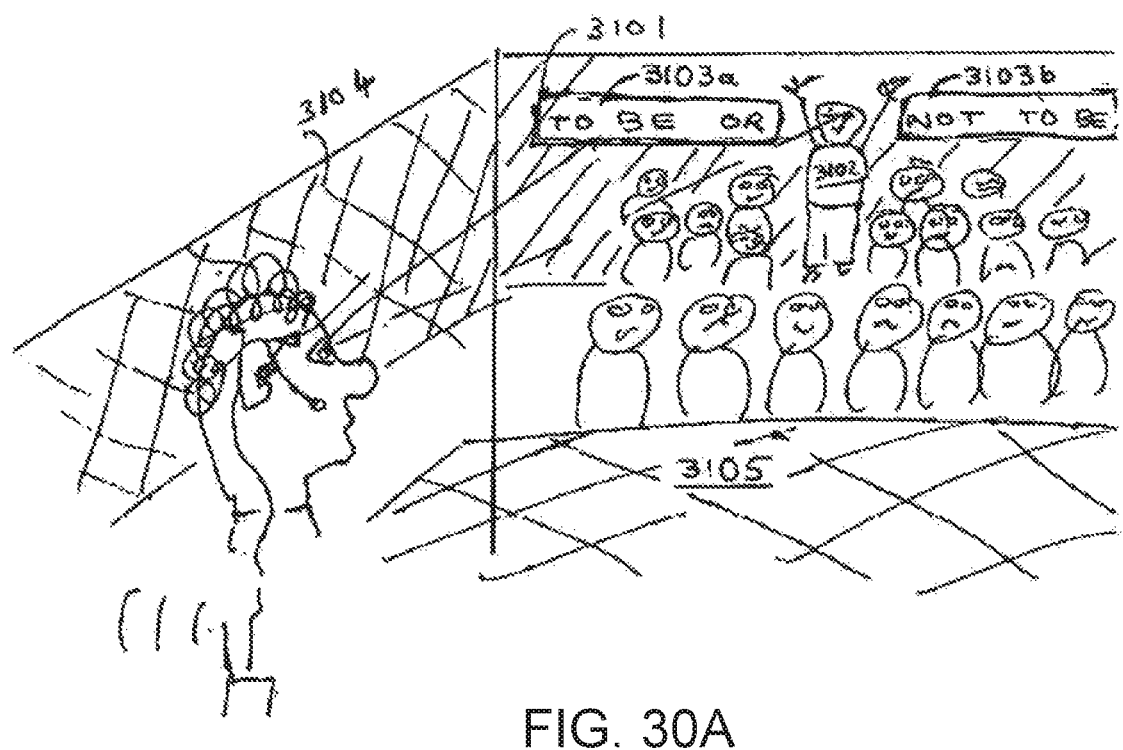
FIGS. 30A-B show how displays on retro-reflective surfaces can be shown to a presenter in a manner invisible to the audience.
Figure 30B:
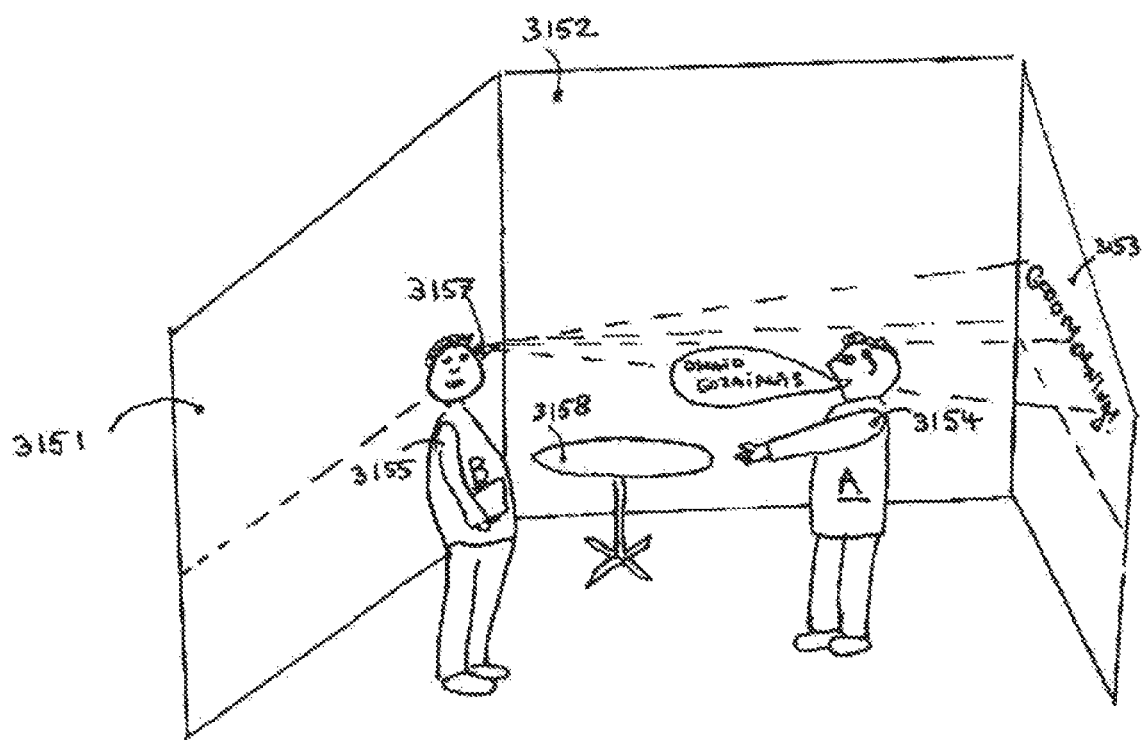

FIG. 30a and FIG. 30b show a system that can, by using retro-reflective surfaces to stealthily display text and images, assist a presenter, an actor, or a conference attendee in a manner invisible to the audience.

In FIG. 30a, the projected text is invisible to the audience, because they are not looking at it from the presenter's exact angle, and it is therefore outside the RR view cone. Due to the high-gain nature of the RR surface, the light budget is low enough to allow a mobile personal projection device no bigger than a clip-on microphone to project readable text at more than 100 feet away in a low-ambient-light environment such as back walls of a theater.

The mobile teleprompting device can receive wirelessly or display from local memory. RR surfaces can completely surround the audience, (walls 3101 and 3104, stage floor 3105, or even a ceiling), and text may be placed wherever the presenter is viewing at that time. Text fields 3103a and 3103b wrap around obstructions in the field of view of the presenter. The presenter can walk around, see his prompts, yet maintain eyeball contact with the audience. Thus a "virtual teleprompter" system is created, which system may be miniaturized to no more than a single 3 mm Eye Stalk attached to or integrated with the existing wireless microphone. The projected text can be big and easy to read at a comfortable (infinite) focal distance. The text may be "anchored" in a fixed position to the RR surface or move with head motion as required. Alternatively, after the presenter changes position or gaze, new prompts may start appearing within the new gaze range.

A beam skip features is used to make the projection and the device's light emissions invisible. The device only emits light, such as bright letters on dark background, as long as the retro-reflective projection surface is detected. This simplest detection mechanism is a fast photocell mounted next to the scan mirror (or in the same path using a polarized beam splitting mechanism). Whenever something is between the presenter and the screen, the projection skips to the next available (unobstructed) screen position. For example, a member of the audience 3102 stands up into the path of the projection. The beam is scanning at least 18 kHz scan rate. Within a millisecond, the projectors, scanning the next line, skip over the area where the obstruction is detected by turning off the visible light. Neither cameras nor the human eye perceive a scanning beam emanating from the presenter's headset. Projecting in both directions permits up to 36,000 lines per second to be drawn. For example, a narrow 300-line text banner can be updated and motion-stabilized at a speed equivalent to 120 frames per second). Care must be taken to minimize or eliminate stray light leaking from the emitter.

Additional mechanisms can prevent the presenter prompter from interfering with a video recording camera. Such mechanism may include, for example, using synchronization for the prompter projector to emit between camera shutter exposure intervals, or using narrow band blocking filters, such as, for example, using a narrow band laser in the projector. Since this band can be less than 1 nm wide, it can be filtered out without causing serious color artifacts assuming broad spectrum studio lighting. In other cases, laser light is naturally highly polarized, while, natural, performance venue, or studio lighting is not. Thus a polarizing filter can be added to the cameras if required to filter out the laser light and prevent it from being seen in close ups of the performer.

A UN-Style Multi-Lingual Conference System with Live Multicast Translation Subtitling FIG. 30b shows an additional novel application for the "teleprompter" head mounted projection system: providing real time translated voice to text. The walls of a conference room 3150 are covered with RR surfaces 3150 and 3152 that allow personal devices to display (for the user's eyes only) a translation (subtitles) of what another party in the conference is saying, translated into the required language. For example, when Japanese party 3154 (A) says "Ohaio Gozaimas," his microphone picks up the audio feed and sends it to a networked translation system that translates it to "good morning," which is then wirelessly relayed as text to the headgear 3157 of the other party 3155 (B). Said headgear projects this text on the wall behind party 3154 as a kind of "text balloon" that is clearly readable to party 3155 from where he is standing. Analogously, when party 3155 answers in English, his speech is translated back to Japanese and converted to text for party 3154. Should either party need help with their presentations, they can be prompted or notified of important personal (private) messages on any RR surface that happens to be in the party's field of view at that moment. Such a system might also be an extension of the stage prompting system, where the surface viewable primarily by the performers on, for example, the stage side walls could have additional RR information spaces, such as on the table 3158.

A further use of such a facility may be for assisting conversations for the hearing impaired.

Open, Flexible Work Environment, Shared Telecommuter Facilities, Quiet Rooms, Libraries and Class Rooms, War Rooms, Control Rooms The system and method disclosed herein may be used, for example by a group of workers sharing a wide open area. They share large work surfaces, both tables and walls (and windows), where they can project all sort of personal views. These views overlap, and through headsets their video and audio is multiplexed. Workers entering and leaving continue seamlessly to use their personal projectors, such as, for example, new 3-D system-enhanced Blackberries or other system-enhanced personal mobile devices that they are already using outside the offices. Now, however, they have full access to all the extra local facilities (fast server access, secure data access, dedicated telepresence high grade QoS networks). In these facilities each person has almost unlimited virtual desk space and virtual personal display space. Most importantly, subgroups can spontaneously start sharing complex data, such as 3-D graphs and images, and collaborate as tightly meshed teams using ad hoc telepresence connections, naturally interacting with each other and with remote teams, with minimal disruption for those not involved. Every surface is used multiple times. This approach reduces the need for dedicated offices, conference rooms, or special facilities, and high-grade, high-cost, HQ-style facilities are optimally utilized. Most importantly, pervasive telepresence and collaboration support fosters both team and personal efficiency, breaks down corporate walls and so-called "silos," and allows for a highly mobile, versatile workforce deployment.

"Invisible" Embedded Retro-Reflective Fiducials

FIG. 31a shows a retro reflective layer 3210 that is embedded on another display surface, which may be a specular (3211), a retro-reflective (3209) or a diffuse (3204) reflecting surface. The retro-reflective layer 3210 in this case is only retro-reflecting certain wavelengths, while it is transparent to others. For example, IR ray 3201 is shown to retro-reflect as beam 3202, whereas visible-light beam 3205 is reflected specularly as ray 3206. Thus for visible light the surface acts in this case as a mirror. Alternatively, the visible light beam 3207 is shown to retro-reflect as a slightly diffused ("donut cone") beam 3208, or, alternatively, projection beam 3203 is projecting a regular image on a diffuse back surface 3204. It should be obvious that combinations of various types of reflective surfaces can be composed in this matter. For example, retro-reflective fiducials might be embedded in a projection surface, in this aspect to help guide the scan and to ensure auto alignment and safety features. A wavelength-selective retro-reflective layer may be constructed by, for example, applying a Bragg-type narrow band reflecting layer to a corner cube structure embossed into a transparent base material. If the material below and above the Brag reflector is optically matched, this approach should minimize unwanted broadband TIR back reflections in the RR structure's back surface, and only light in the narrow waveband of the Bragg grating is retro reflected by layer 3210.

FIG. 31b shows an example of a projection screen 3230, said screen has a main projection surface 3232 and is framed by a retro reflective border structure 3231, constructed as described previously.

FIG. 31c shows a cross section of the frame with the narrow-band retro-reflecting structure 3233 as an additional layer on top of the screen material 3235. Optionally, an additional protective coating 3234 protects both the screen surface and the RR border fiducial 3233. Note that images can be projected on the entire screen 3230 including the RR border 3231.

A Highly Integrated, Compact Femto Projection Multibeam Laser Source

Figure 34A:
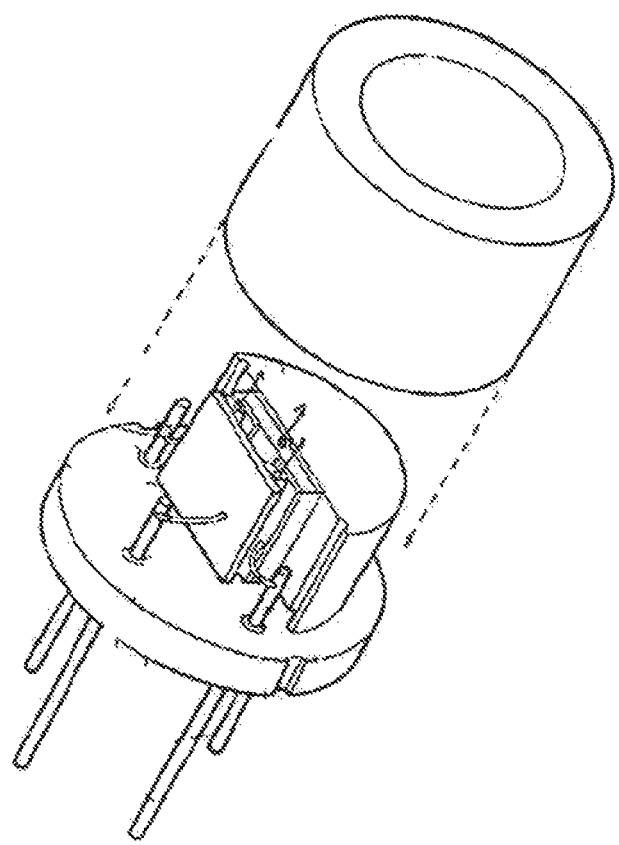
FIGS. 34A-B are reproduced from Sony U.S. Pat. No. 6,956,322 B2, with some modification to show a light-emitting device.

FIG. 34a is reproduced from Sony U.S. Pat. No. 6,956,322 B2. The second embodiment (FIG. 11 in the patent, renumbered here for clarity) teaches "a light emitting device 3500 has the first light emitting element 3501 capable of emitting light in the band on the order of 400 nm and the second light emitting element 3502 having the lasing portion 3503 capable of emitting light in the band on the order of 500 nm and the lasing portion 3504 capable of emitting light in the band on the order of 700 nm."

Figure 34B:
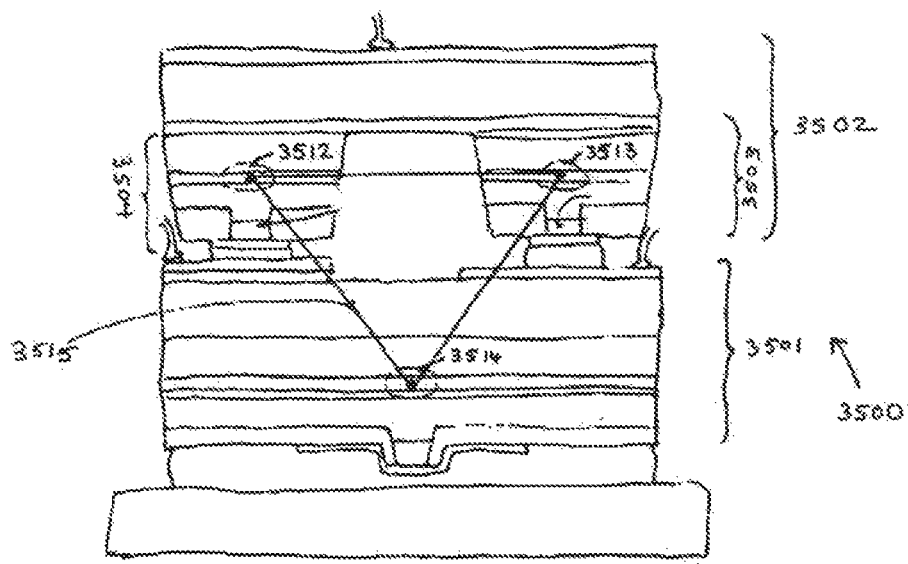
Figure 35:
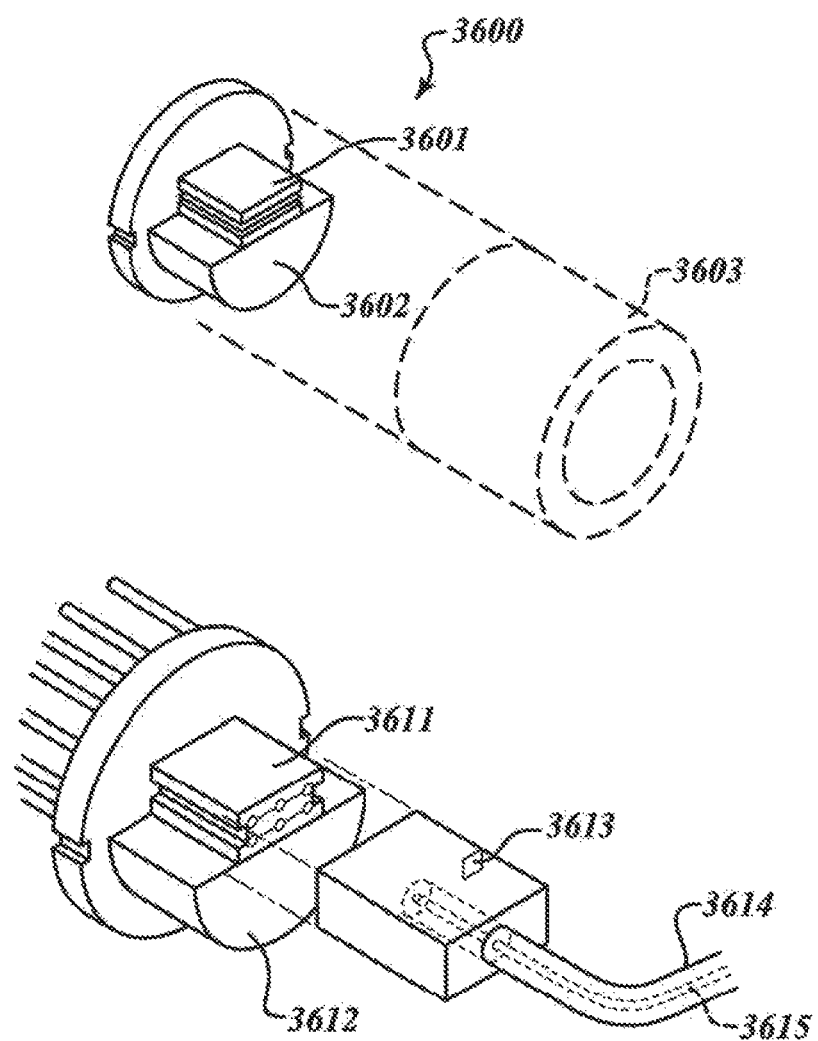
FIG. 35 shows a multi-primary engine with output.

FIG. 34b, also taken from Sony U.S. Pat. No. 6,956,322 B2, has been modified to show light emitting device 3500, which is constructed by stacking two different semiconductor material layers (for example, GaAs and GaN) with one semiconductor layer containing one lasing structure and the second layer containing two lasing structures. Each lasing structure emits light at a different wavelength and can be modulated separately. The patent teaches how a stacked light emitting device emitting light of "three primary colors red (R), green (G) and blue (B)" from three cleaved mirrored facets 3514, 3515 and 3516 can be used as a "light source of not only the optical disk drive but also full-color displays." This design was driven by the need to simplify and cost reduce the light source assembly of a BluRay™ optical disk, since combining the light sources in a litho-graphically exact replicated geometry defined by the triangle 3515 significantly reduces the complexity and cost of the optical assembly.

Improvement on the Above for Constructing a Miniaturized Light Engine for an Ultra Compact Femto Laser Projector or 3-D Image Generating Eye Stalks The design consists of five or more lasing sources mounted on two or more dissimilar layers of semiconductor material. As per the same patent cited above, the advantage of using a stack is that current semiconductor technologies require one type of materials for the long wavelengths, for example, IR, red, orange, and yellow, and another choice of materials for shorter wavelengths such as green and blue.

The design's particular choice of wavelengths is, among others, driven by the following criteria:

1) Luminous Efficiency: Luminous efficiency may be summarized as lumens out per electrical watt in. The goal is the brightest perceived image realized with the least amount of electrical power. Generally there is a tradeoff between luminous efficacy (LM/mW light power) versus so-called "wall plug efficiency" (WPE) of a laser source (mW light out per mW electrical power in, typically specified as a percentage ranging from 5 percent to 45 percent).

2) Color Range: The projector must be capable of a wide range of unsaturated colors (gamut).

3) Cost Reduction: Reducing cost by minimizing complexity of the optical assembly. In optics it means typically fewest alignments.

A scanning projector can scan multiple collimated beams simultaneously off the same scan mirror (or other beam-steering devices, such as electro optical modulators). Therefore, the number of primaries can be greater than three, without unduly increasing the complexity or the cost of the design. This principle is analogous to today's low-cost inkjet printers, which all use more than three colors to realize the best-gamut, highest-color, accuracy with the least ink. By using a single, light-emitting device capable of as many as six wavelengths in the range of 400 nm to 900 nm, a highly efficient and compact design can be realized. Because the high gain of the RR surface significantly reduces the projection power requirements, the individual lasing structures require very modest current and power densities, and therefore they can be packed together at a less than 100 micron pitch. A 1 mm by 1 mm chip can easily accommodate a plurality of such structures at no incremental cost. A light-emitting device stacking two layers with three lasing structures each can emit six different wavelengths individually modulated with picosecond precision.

Five Visible and One Invisible Primary

Laser and LED light sources are available in a broad "palette" of wavelengths, such as, for example, 440 nm (deep blue), 480 nm (blue), 500 nm (blue green), 525 nnt (deep green), 575 nm (bright yellow), 590 nm (orange), 650 nm (red), 680 nm (deep red), 850 nm (NIR). The latter invisible NIR "primary" is optional, but the advantage of adding it is that it serves as a tracer bullet, providing traceability of the scan pattern regardless of image intensity. It also serves as a means of identifying and tracking the location of the screen, any fiducials, and the shadows of hands, fingers and objects.

Why Use More than Three Visible Primaries?

There are several reasons for using more than three visible primaries. First is the almost negligible incremental cost. Given that the aspect ratio of a laser stripe (in an edge emitter) is approximately 1 mm in length, making a laser diode wider than one stripe is necessary for mechanical reasons, thus the extra 2 stripes per layer do not significantly add to the structure's size.

Figure 40A:
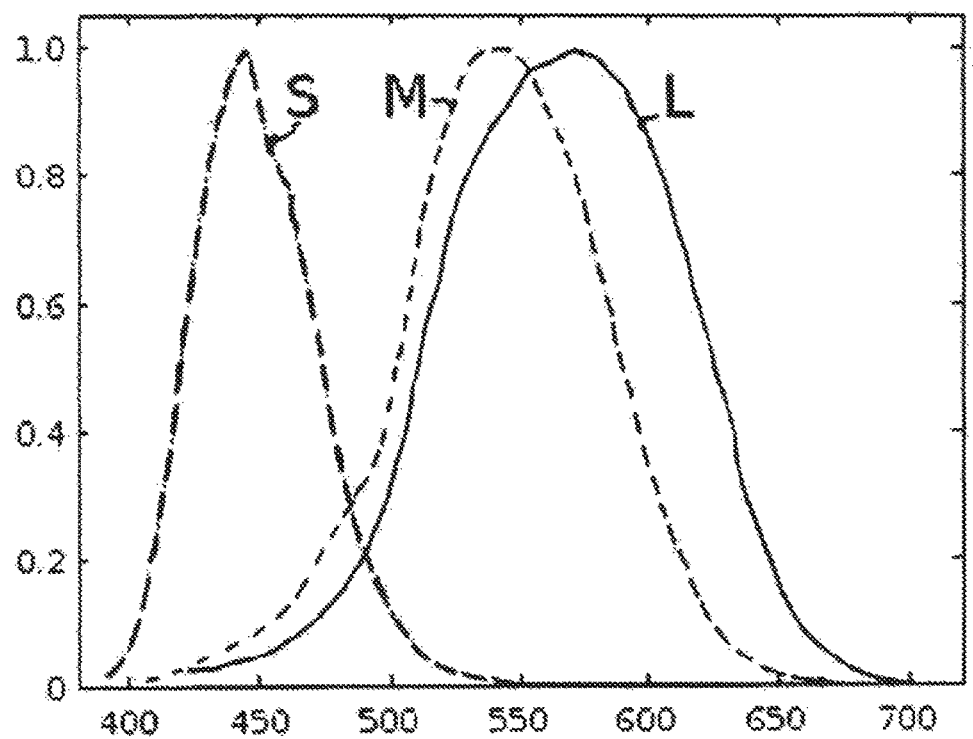
FIGS. 40A-B show maximized efficiency using more than three visible primaries.
Figure 40B:
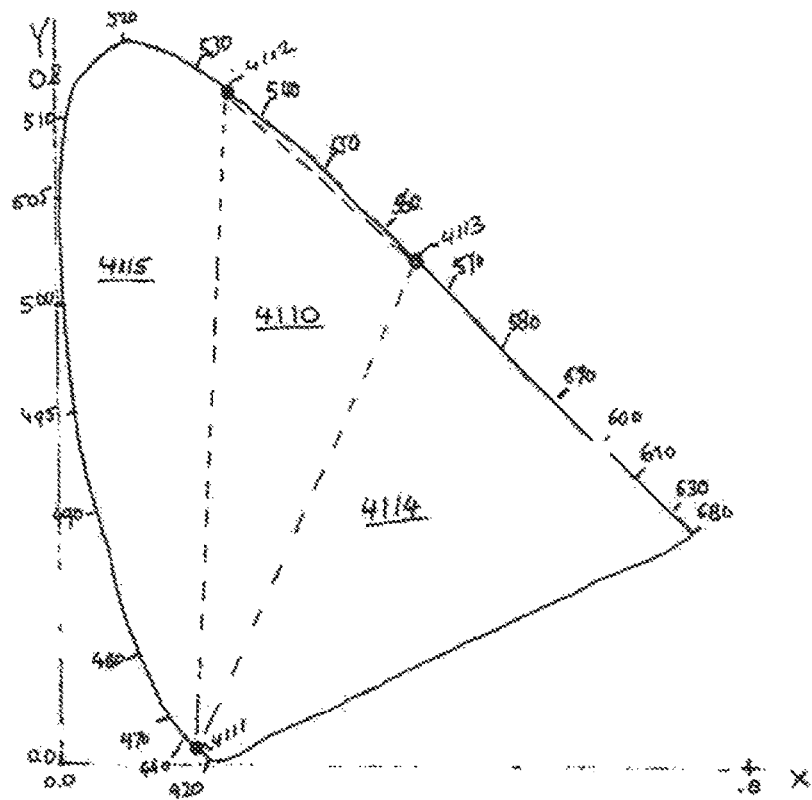

The second reason is for maximizing efficiency. FIG. 40*a* shows a normalized eye cone response curve (source: Wikipedia). Human eye brightness perception (luminous efficacy of perceiving bright images through photropic, that is, daytime, vision) peaks around 555 nm at 6831 m per watt, but the three types of retinal cones have sensitivity peaks at three distinct wavelengths of around 565, 535 and 440 nm, respectively, for the L, M and S type cones. The response maxima of the L and M cones are quite close to each other and their broad sensitivity curves overlap greatly. Primaries in the 535 nm to 565 nm range actually appear bright yellow since they stimulate both L and M cones. Perception of colors such as deep red (toward 650 nm) and deep green (toward 500 nm) require a strong differential in L and M cone response.

The central foveas (normally center of focus) are almost two-thirds L (red favoring) and one-third M (green favoring cones). The "blue" cones are identified by the peak of their light response curve at about 445 nm. They are unique among the cones in that they constitute only about 2 percent of the total number and are found outside the fovea centralis, where the green and red cones are concentrated. Although they are much more light sensitive than the green and red cones, it is not enough to overcome their disadvantage in numbers. However, the blue sensitivity of human final visual perception is comparable to that of red and green, suggesting that there is a somewhat selective "blue amplifier" somewhere in the visual processing in the brain. (Source: Human Physiology From Cells to System, Lauralee Sherwood).

The above implies it would not be advisable to put so much spatial frequency blue at the center of focus (at the image position that is aligned with the fovea centralis) because it is not seen anyway. Maximum spatial contrast would be most efficiently achieved with the yellow range red and green primaries; that is, green, yellow, or red modulation accuracy matters in the place vision fixates. Knowing where human vision fixates is valuable. A good guess would be vergence (3-D disparity) and any moving objects. A system such as described in this disclosure might, for example, maximize red and green high-speed spatial detail contrast generation for moving objects on which the human vision automatically fixates.

To maximize brightness and luminous efficacy, it would seem advantageous to use primaries that closely match these individual peaks in the cones that drive photropic vision, but with only three monochrome primaries matching the conal peaks, the color gamut would be severely truncated on the red side. FIG. 41*b* shows the CIE 1931 chromaticity diagram and the relatively narrow triangular subset 4110 formed by the three primaries 4111, 4112, and 4113 with wavelengths matching the conal sensitivity maxima of S, M, and L cones (440 nm, 535 nm, and 565 nm respectively). Clearly colors that fall in areas 4114 and 4115 cannot be rendered by such a system. Adding primaries overcomes this limitation and achieves a best-of-all-worlds situation. Where and when required, just enough of the deeper color, that is, longer wavelength RED, is added to the mix to render the correct hue. The more efficient primaries carry the bulk of the imaging load in terms of delivering brightness and creating contrast. Note that while the above mechanism for achieving wide-gamut rendering efficiency would work especially well for lasers that tend to naturally emit narrow unsaturated monochrome colors, it also applies when using spectrally more diverse but narrow primaries such as LEDs or hybrid LED laser devices (resonant cavity LEDs, quantum dot lasers, etc).

Another reason for using more than three visible primaries lies in the efficiency trade-offs between device luminous efficiency vs. wall-plug efficiency. At certain wavelengths of high luminous efficacy, devices with acceptable wall plug efficiency (mW light out for mW electrical power in) are not yet available. For example, direct green laser diodes around 525 nm made by Soraa and Osram still have only 3-5 percent WPE. It may, in such cases, be preferable to use, for example, shorter wavelength "bluish" greens because the increase in laser efficiency (WPE: mW out per mW in) more than offsets the concomitant decrease in luminous efficacy (lm per mW out). In general, having primary alternates available in the spectrum results in having more choices for rendering colors of the desired hue and brightness, and it can only help efficiency. The operational power savings from having one or more alternate primaries would depend on something akin to "color demand stochastics," that is, population density of chromaticity requirements as distributed across the gamut. Optimality would be tested statistically by summing the product of probability of a certain color—P (Ci)—with the efficiency of generating that—E(Ci)—with a given choice of primaries—Ci=f (p1, p2, p3, p4, . . . pn)—where typically the closest subset of three (in some cases two) primaries would be the most efficient. It is clear that if deep blue seas and fields of very red roses were seldom in the images, the savings from being able to use more efficient alternate primaries most of the time would be significant.

An additional reason for using more than three visible primaries is to mitigate speckle image degradation, which can be a major problem in projection. It is an inherent problem when using narrow-spectrum, coherent light sources and small aperture optics. Speckle must be mitigated in several ways. Generally, the less source coherency the better; therefore, when possible, it is preferable to increase the bandwidth of primaries, to shift phases, and to increase the number of laser resonance modes. Low power semiconductor laser diodes with narrow stripe structures typically individually produce very coherent light of a single frequency, in single mode. After reflecting off the screen, the light of each such a structure tends toward self-interference, creating peaks and valleys of brightness, known as "speckle." Having more structures that are not coherent and not of the exact same frequency helps to mitigate speckle. A multiplicity of N uncorrelated lasing structures yields a more homogenous image (as perceived by the eye). As N increases for any given time period and retinal position, the sum of N patterns becomes more homogenous (with greater N, speckle "averages out").

Additionally, because speckle is primarily perceivable as a fixed pattern noise, it can be mitigated further by making a slight "scramble" of the pixel positions, for example, by introducing a third-order, somewhat random variance beyond the required x and y periodicity in the scanner's motion. A temporally and spatially scrambled pixel map and a changing scan beam pattern result in the viewer experiencing a time-integrated overlay of multiple speckle patterns, thus reducing the perceptibility of speckle. Note that the output of a lasing structure naturally tends to change slightly in wavelength and phase during its rise and fall. Hence, lighting an image edge, for example, during a left-to-right scan, creates a different speckle pattern than when imaging in the other direction (the return, the second phase of the horizontal scan), so overwriting a left-to-right scan detail with right-to-left scan in the next frame also helps reduce speckle. This overwriting can be done by adding a slight offset (by 1 line width, or a fraction of a line width) in the horizontal scan pixel map, frame to frame. Image "pixel positions" are somewhat arbitrary and can be accurately interpolated by high performance GPU capable of rendering any resolution raster position ad hoc, and within less than one frame delay. The resulting image (as perceived by the eye) is not degraded or blurred by adding this "pseudo random" element to the scan pattern.

A Projection System Using Five Primaries: Efficiency and Other Advantages

Figure 39:
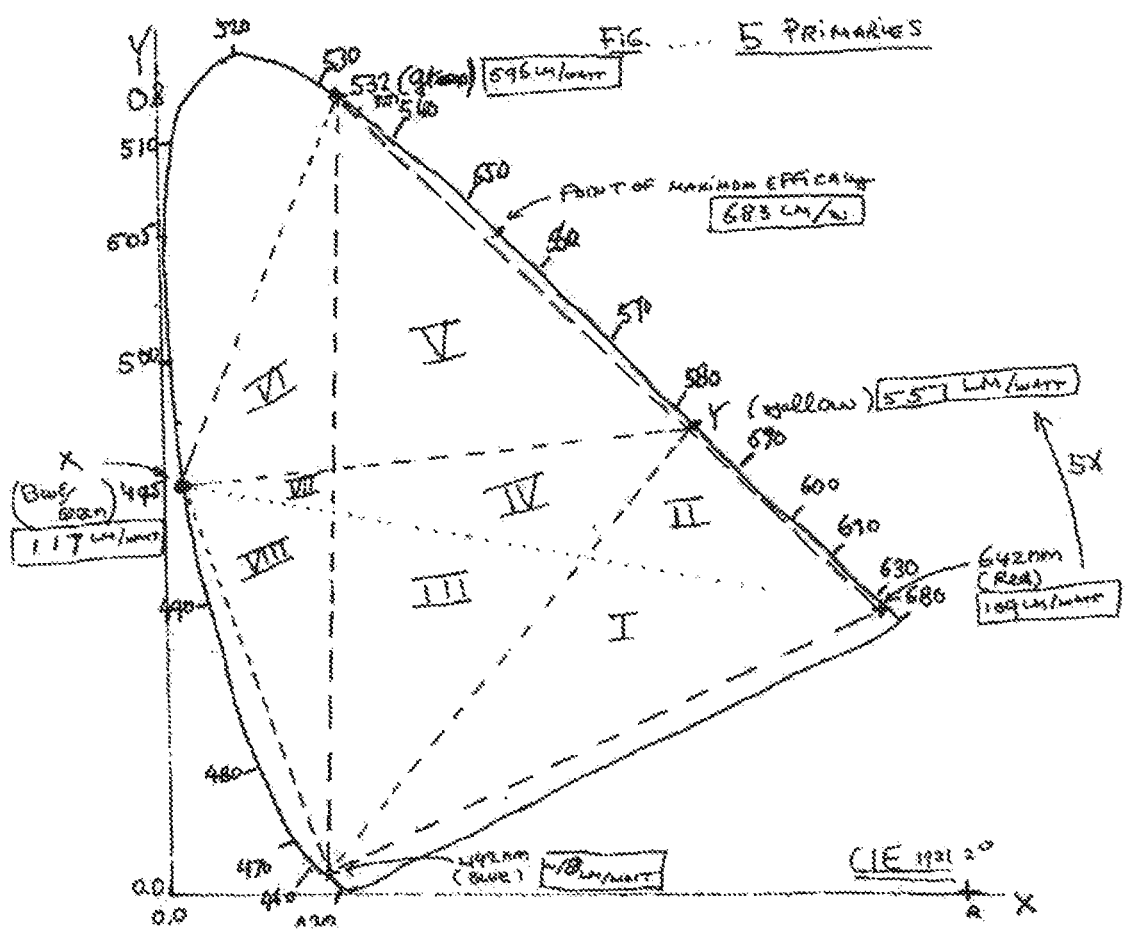
FIG. 39 shows the broad gamut of a five-primary system plotted in a CIE 1931 2° standard observer chromaticity diagram.

FIG. 39 shows a CIE 1931 2° standard observer chromaticity diagram. A set of standard R (642 nm), G (532 nm) and B (442 nm) render a gamut as wide as 150 percent of the NTSC gamut, enabled by the spectral purity of the RGB laser diode sources (the NTSC gamut is based on CRT phosphors, which are less spectrally pure). However, the luminous efficacy (lm per optical watt) of the 642 nm red primary is only 109 lm per watt, and that of the 442 nm blue is a minimal 18 lm/watt. Therefore, colors containing significant amounts of red or blue, such as bright whites and the less saturated colors in the center of SCIE 1931 chart, require a lot of optical power.

The situation changes drastically with two extra primaries, such as Y (yellow) at 565 nm and X (blue green) at 495 nm. These two primaries have much greater luminous efficacies, 557 lm/watt and 117 lm/watt, respectively. Note that, for example, those colors that fall in region V can now be entirely rendered by using primaries X and Y instead of R and B, with a gain 5× in efficacy. Substituting for deep red (long wavelength) and deep blue (short wavelength) with less extreme colors can save up to 80 percent of light. Also note that adding the X (blue green) significantly extends the gamut. Furthermore, for most of the color space, any one color can be rendered from several different combinations of 3, 4 or 5 primaries (known as metamers, colors with different spectral composition perceived as identical). Some combinations might be more efficient than others, but in some cases mixing in a fourth or fifth primary might help improve image fidelity. Inefficient or power-limited sources can be substituted for with proximate primaries. For example, direct green laser diodes still have the relatively low wall plug efficiency (WPE: 3-5 percent). X (for example, a more plug-efficient bluish-green GaN laser diodes) and Y (bright yellow) can wholly or partially substitute for G in five areas of the gamut (all but V and VI). In all cases more spectral diversity—as noted before—minimizes speckle and other artifacts. For example, skin colors are generally rendered more accurately across visual age groups with a four-color system.

Note that the rendering palette can be instantaneously adjusted, switching back and forth between power saving mode and extreme color mode (wide-gamut mode), triggering real time on content requirements. A special "paper white" mode renders bright white-on-black text particularly efficiently. Whites are renderable from several different primary combinations, ranging from highest efficiency, to highest detail, highest brightness, lowest speckle, ease of accommodation, and focus (using a narrowest bandwidth to render white minimizes chromatic aberrations), etc., and any such tradeoffs can be made within the images (partial fields) based on the GPU advance knowledge in the rendering pipeline, and/or based on detecting the image requirements themselves and optionally from feedback from the rendered images. Since speckle becomes more visible in objects such as, for example, homogeneous bright objects under fixation in the fovea, ex ante image analysis (by GPU software in the rendering pipeline, for example) and determination of the primary focus of gaze (for example, by detecting head movements denoting fixation on the object in the view plane) determine if speckle mitigation measures such as spectral diversification are warranted.

Guiding Light

Among many, there are two possible simple approaches for guiding light:

First, the light-emitting element may be integrated close to or with the scanning optics. In case of the Eye Stalk dual-projector design, this approach requires two separate optical sources, each with its own packaging and supporting electronics.

Second, all the required light sources may be co-located in one package, possibly integrated into a single semiconductor device with 6-10 (or more) modulated beam outputs, and two combined beams are guided toward separate scanning mirrors via an optical waveguide, such as a fiber.

The advantage of the first approach is that all the optical-mechanical assembly is contained within the Eye Stalk, and only electrical signaling and power needs to be provided externally by, for example, a wire as with ear buds from a host device.

The advantage of the second the approach is that all of the power and heat (losses of laser diodes) is kept away from the Eye Stalk, reducing the complexity and possibly the size of the Eye Stalk, adding to the comfort of the wearer. However, alignment and coupling of the fiber on both ends is required. Such alignment may be achieved, for example, by using conventional fiber optic coupling technologies, such as by V groove or ferrule insertion.

FIG. 35a shows the multi-primary engine 3600, similar to the one described in the discussions of FIG. 34a and FIG. 34b. The laser diode stack 3601 is mounted on a D-shaped heat sink 3602 that can be fit in a TO package with a ferrule type of optical combiner lens element 3603 that slips over the assembly. The output is a single collimated beam (not shown) combining all primaries, or, as shown in FIG. 35b, a waveguide or ray optics type of combiner-coupling element 3613 that couples light output of the multi primary diode stack 3611 into the core 3615 of a fiber like waveguide 3614.

Figure 38A:
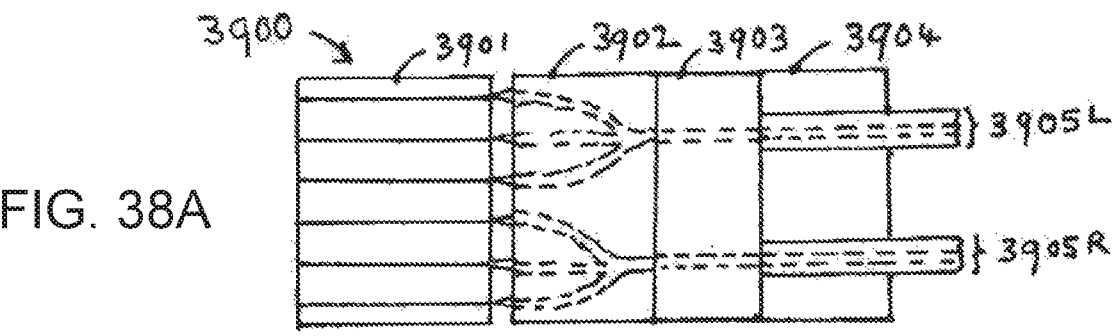
FIGS. 38A-B show a wave guiding beam combiner system.
Figure 38B:
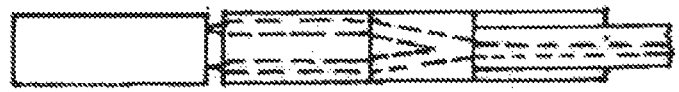

FIGS. 38a, 38b and 38c show examples of using a refractive collimation of a six-tripe diode stack, as described earlier in the descriptions of FIG. 35a and FIG. 35b (for example, five visible primaries and IR).

Figure 37A:
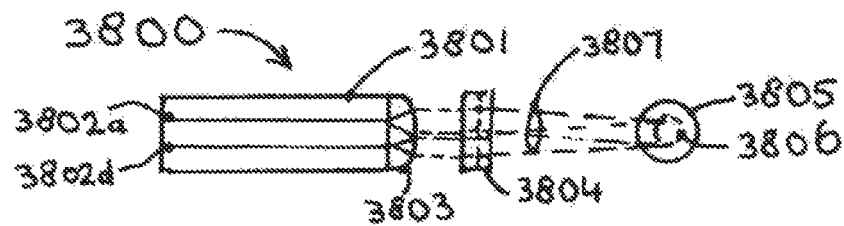
FIGS. 37A-C show a refractive collimator and beam combiner for a multi-emitter diode stack.

FIG. 37a shows a side view of the six-diode system 3800, comprised of a two-layer stack 3801, with each layer containing three laser stripes (only lasing structures 3802a-3802d are shown in the side view). A fast cylindrical lens 3803 collimates the fast axis, followed by a slow cylindrical lens 3804 collimating the slow axis. The resulting six collimated beams 3807 converge into a single spot 3806, for example, within a scanning mirror 3805.

Figure 37B:
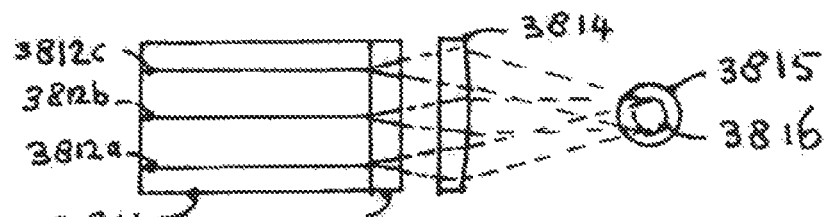

FIG. 37b shows the top view of the same configuration. Lasing structures 3812a, 3812b, and 3812c of the top layer of the six-laser diode stack 3811 are shown. A fast cylindrical lens 3813 collimates the fast axis, followed by a slow cylindrical lens 3814 collimating the slow axis. The resulting six collimated beams converge into a single spot 3816, for example, within a scanning mirror 3815.

Figure 37C:
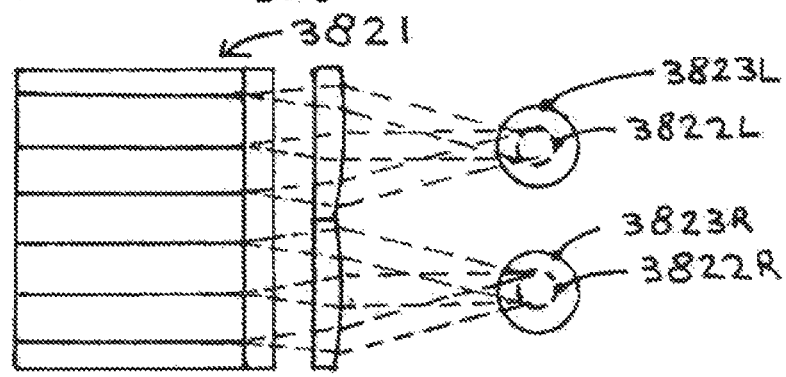

FIG. 37c shows the top view of a dual system 3821 with two sets of six primaries (a total of 12), where the collimated outputs of each set are coupled into the cores 3822L and 3822R of flexible waveguides 3823L and 3823R. This arrangement allows all the light sources to be contained within a single semiconductor-optical structure away from the rest of the projection scanning optics, minimizing the physical dimensions of the Eye Stalks.

FIG. 38a shows the top view of a dual system 3900 with another possible beam combiner embodiment using an optical waveguide structure with a plurality of refractive index waveguide channels in a merging combiner pattern. The system consists of a diode stack 3901, a horizontal combiner 3902, a vertical combiner 3903, and a ferrule or v-groove type of fiber alignment structure 3904 leading to two fiber waveguides 3905R and 3905L.

FIG. 38b shows the side view of the same system 3900. Note that because the dimensions of all the components are precisely controlled and aligned in the same directions, assembly is simplified.

Scrambling Light in a Slightly Irregular Array of Retro-Reflective Cubic Corners There are basically two types of standard (perfect) cubic retro reflectors. In the first type (see the discussion of FIG. 45g), the three sides of a cube are cut diagonally at a 45 degree angle, so that the base of the trihedral pyramid is shaped as an equilateral triangle (three equal sides with 60 degree angles). When all cube corners are in oriented the same direction these equilateral triangles tile into a regular polygon.

In the second type (see the discussion of FIG. 45a) the cube sides are square and the tips of the three sides extend upward from the plane so the base, as seen from an angle, looks like a hexagon, or as an array it looks like a honeycomb. Note that the base is actually not flat, but jagged.

As noted earlier, in some cases is desirable to open up the reflection cone somewhat so the reflected beams from a near-the-eye-projector are more easily seen. The resulting pattern is described as a doughnut or hollow cone reflection. For a cube corner type retro-reflector this change can be made by varying by a small angle Alpha away from perfect orthogonality. For example, adding 1 degree would make the angle between at least one set of the three reflecting planes 91 degrees instead of 90 degrees. Thus the two types of RR cube corners can be modified and the base patterns also become slightly irregular. For example, if a small angle is added to only one of the planes in first type, the base pattern cannot be a perfectly equal sided triangle, so tiling the pattern into a regular polygon becomes more complicated. However there is a significant additional benefit from adding such an irregularity to the RR array: the irregularity can be used to scramble the coherency of incoming waves and reduce the speckle that might otherwise be seen by the observer of the image.

Figures 45A, 45B, 45C, 45D, 45E, 45F, 45G, 45H:
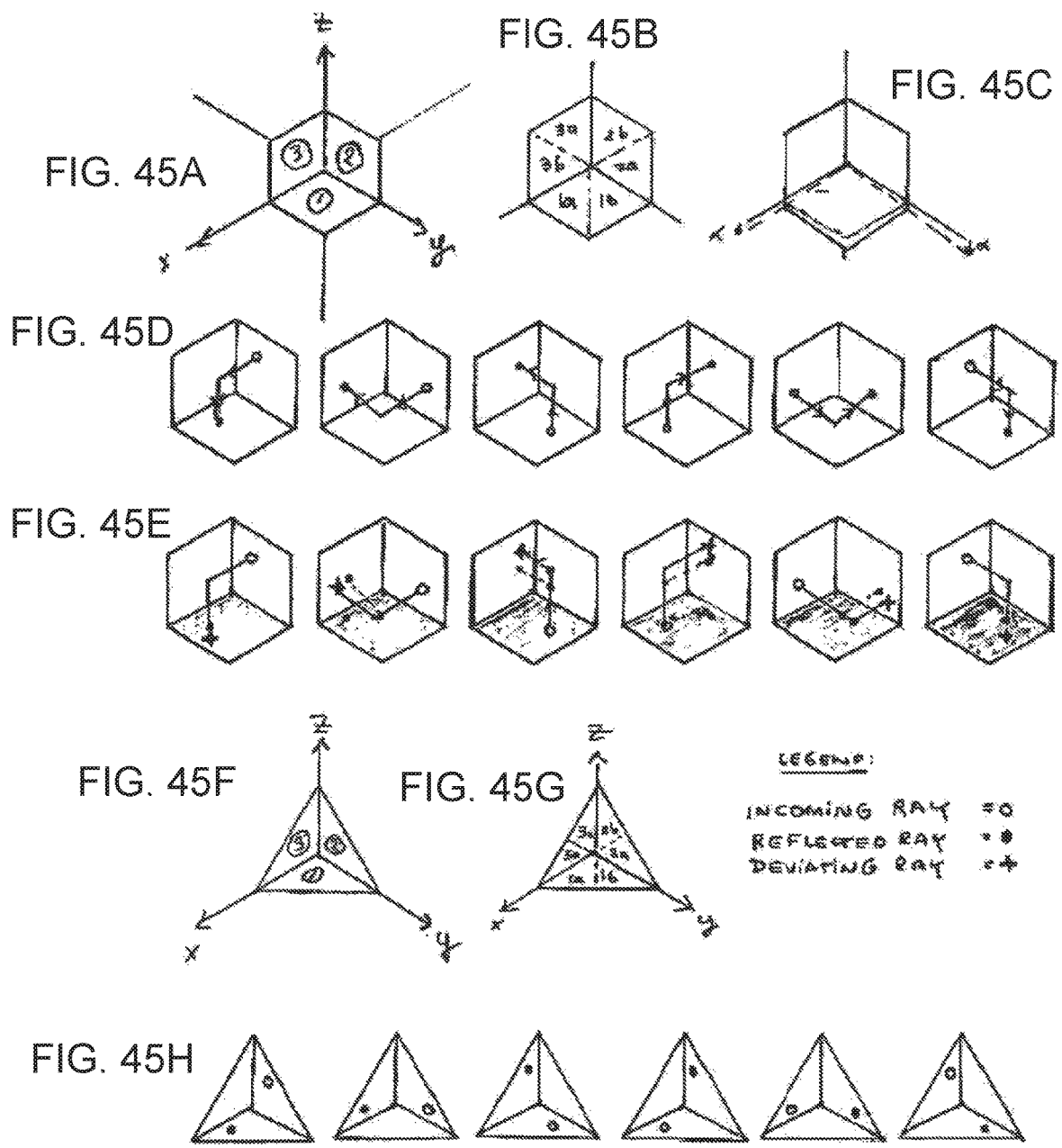
FIGS. 45A-G, and H show examples of cubic retro reflectors with deliberate slight irregularities that improve the perceived image quality.

A perfect RR corner cube of type 2 has three planes to every facet. FIG. 45a shows planes 1, 2, and 3. Incoming light can land on any one of the three planes. From there it can travel to one of two adjacent planes. In total, each facet has six sub-apertures, shown as 1a, 1b, 2a, 2b, 3a and 3b in FIG. 45b. FIG. 45d shows the six different optical paths after the first reflection on one of the cube corner planes. As described previously, any one of the planes can be rotated slightly by a small rotation angle α, as shown in FIG. 45c, to modify the light reflection angle from pure retro reflectivity to create a wider, more diffuse doughnut reflection pattern. FIG. 45e shows six equivalent paths slightly deviating from the pure retro reflecting paths shown in FIG. 45d.

In a perfect retro reflector as shown in FIG. 45d, a coherent wave front going through three successive reflections travels the same distance and experiences the same phase shift. Due to symmetry, the lengths of the paths are identical, both in type 1 and type 2. When the retro-reflecting structure is altered, as it is in the altered irregular structures shown in FIG. 45c and FIG. 45e, this is no longer the case.

A variation of one or more of these factors in the RR-faceted array can consist of the following:

a) Angular offset (varying the size of alpha; the small angle added).

b) Varying which and how many (1, 2 or 3) of the RR cube angles are not 90 degrees.

c) Orienting the cube corners' main axis away from orthogonality with the main plane describing the array. Offsetting or slightly misaligning the angles of these axes also increases the RR surface acceptance angle beyond the acceptance angle of the individual facets, thus softening the energy peak as described in prior art (see U.S. Pat. No. 3,817,596). But another significant advantage is this approach is that it scrambles the parts of the incoming wave front. The wave front hits facets at many different angles, and since the path traveled varies (in the high N material) this approach results in a quasi-random phase shift of the wave front, helping to reduce speckling artifacts.

d) Various other slight variations in the shape of the sides of the cube corners, either of type 1 or type 2, are possible. The sides can be divided into facets themselves, with a slight angle between two facets. For example, in a full cube corner, the three squares of planes 1, 2, and 3 can be divided in two triangular parts (by dividing one of the squares along the diagonal, for example) with slightly different orientation (again, small offset a of perhaps 1 degree).

Figure 46A:
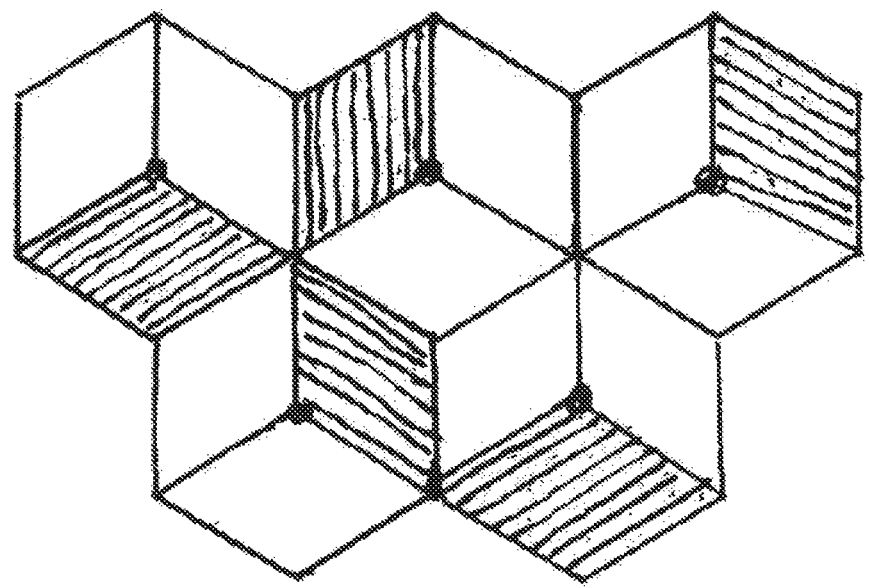
FIGS. 46A-B show a tiled configuration of altered type 1 and type 2 retro-reflecting facets arranged into an array introducing deliberate degree phase diversity.

FIG. 46a shows a tiled configuration of type 2 retro-reflecting facets arranged in a plane, with each facet slightly modified by one or more of the methods described previously in the description of FIG. 45, above. In the example shown, the shaded areas with a slight orientation rotation a are out of perfect orthogonality with the adjacent planes.

Figure 46B:
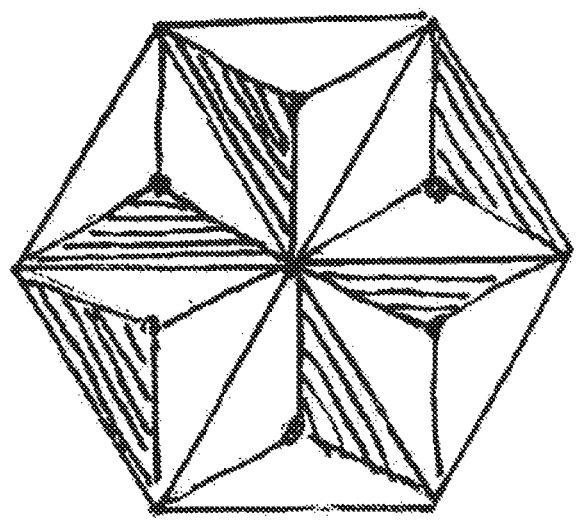

FIG. 46b shows a tiled configuration of type 1 retro-reflecting facets arranged in a plane, with each facet slightly modified by one or more of the methods described previously in the description of FIG. 45, above. In this example, the shaded areas with a slight orientation rotation a are out of perfect orthogonality with the adjacent planes.

Use of a Square Fiber as a Multimode Scrambler to Reduce Speckle

A square fiber works as a mode scrambler, reducing spatial coherency of laser diode light coupled into the fiber. The shape of the core of the fiber guiding the light from the diode stack (see the previous discussion of FIG. 37c for more details) therefore can be used to modify the guided light to reduce speckle.

Virtual Hands: User Interface Facilitating Hand-Eye Coordination in Augmented Reality It is desirable to be able to naturally interact with virtual objects projected within our reach. Hands are the most natural way to do so. Our hands have superbly evolved 3-D motion and manipulation abilities that cannot be bestowed on a mouse or other novel pointing devices. Opposing thumbs come with advanced hand-eye coordination, allowing us to thread a needle and catch a ball. Our binocular depth vision is acute in the range our hands can reach. We have strong motor feedback to the relative position and motion of our fingers, but only by seeing our fingers with both eyes do we get good spatial clues in terms of where our fingers are with respect to objects not yet touched.

It is easy to fool the brain to see our hands transposed in an image in a position that is not their actual position. This transposition can be exploited to solve the shadow and occlusion problems that occur when out real hands move between our eyes and the projected image. A real hand occludes a virtual ball when the hand is reaching behind it, when in fact the ball should occlude the hand.

The solution is to observe the user's hands in a position outside the direct view cone in which the object appears and project a set of "virtual hands" in stereo 3-D and allow these hands to manipulate the ball. The virtual hands can be approximate or exact copies of the actual hands as observed by a camera or scanning device, or they might be more cartoonlike images that motorically mimic the actions of the real hands. The virtual hands appear to the viewer to move and touch exactly like the viewer's real hands. The virtual hands are perceived as an extension of the body, turning the hands into perfectly natural pointing and manipulation devices. One example of how this phenomenon might be instantiated is described below, in the discussions of FIG. 44a through FIG. 44c.

FIG. 44a shows a user 4500 who sees the 3-D image of a ball 4503 floating approximately half way toward the screen 4502. His hands 4504 and 4505 are being scanned by a pair of projectors 4506 and 4507, casting strong 1R shadows 4510 on the lower section 4502a of the screen 4502, while images of the ball 4503 and the virtual hands 4508 and 4509 are projected in the upper part 4502b of the screen 4502.

FIG. 44b shows the front view of the screen 4512 with the upper section 4512b with virtual hands 4518 and 4519 and the lower section 4512a with 1R shadows 4514 and 4515 of the hands, invisible to the viewer but clearly seen by the photocell feedback system of the projectors (not shown), as described throughout herein. The viewer sees the hands in the same pose, with the same scale and precise finger motions, and thus has a completely natural visual feedback. The virtual fingers can touch the ball from behind, while the ball is moving forward, without interfering with the correct occlusion. (Parts of the fingers and hand are behind the ball and each eye sees the correct relative occlusion, which occlusions are quite different due to the large disparities at close range).

FIG. 44c shows a top view of the viewer's view cone projected on the upper section of the screen 4522. The left and right images 4521a and 4521b of the ball are projected by projectors 4526 and 4527 respectively onto the screen 4522. (The images are drawn with an incorrect front perspective rather than a top perspective for clarity). The viewer's eyes 4524 and 4525 fixate on these images, and his binocular vision fuses them into one 3-D image 4523. Similarly, the projectors render 3-D images of both the left and right hands (shown here only as index fingers 4528 and 4529). Note that the real hands in the line of projection would have created multiple shadows and would have occluded much of the ball. This problem is entirely eliminated while fully naturalistic looking "virtual hands" are correctly inserted in the 3-D view.

Figure 44D:
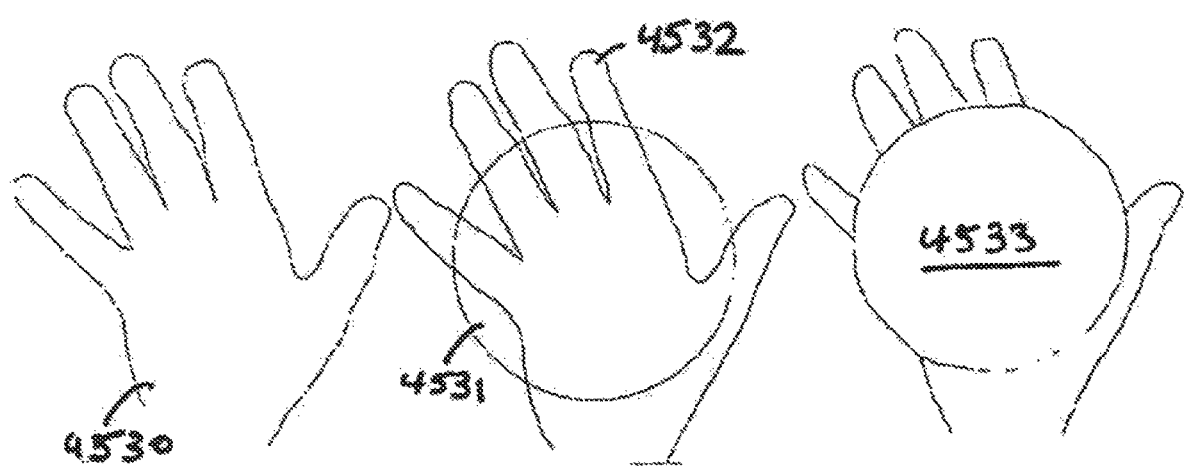

FIG. 44d shows how a real hand 4530 catches a virtual ball 4531. The real hand's motions during the catch are transposed to the virtual hand 4532 into the projected image. The graphics rendering system ensures that the virtual ball 4532 correctly occludes the catching hand in the composite image 4533. Note that while not shown in stereoscopic 3-D, there are two images, one for each eye, each image rendered from a slightly different perspective. In each view different parts of the hand and the ball are seen and occluded.

It is clear that many modifications and variations of this embodiment may be made by one skilled in the art without departing from the spirit of the novel art of this disclosure.

For example, in some cases the system may project a user-viewable, computer-generated or -fed image, wherein a head-mounted projector is used to project an image onto a retro-reflective surface, so only the viewer can see the image. The projector is connected to a computer that contains software to create virtual 2-D and/or 3-D images for viewing by the user. Further, one projector each may be mounted on either side of the user's head, and, by choosing a retro angle of less than about 10 degrees, each eye can only see the image of one of the projectors at a given distance up to 1 meter from the retro-reflective screen. The retro angle used may be reduced with larger viewing distance desired. These projectors may use lasers to avoid the need for focusing, and the projector may use highly collimated LED light sources to avoid the need for focusing. Also, at least one camera may be mounted near a projector on the user's head and may be used to adjust the image or used to observe user interaction with the projected image. In addition, a beam and sensor may be added in an invisible wavelength, and the retro-reflective surface may have fiduciary markings in color not visible to the human eye, but contracting in the invisible wavelengths, and the sensor may be able to recognize the retro reflection or its absence, thus being able to read human invisible fiduciary markings. Further, a user, interjecting objects, may create a disruption of the reflected invisible beam, and detection of such interruptions can be interpreted by the system as commands for actions, including but not limited to navigation in a virtual environment, launching of programs, manipulation of data, and so forth.

In addition, the user interface of the system and method disclosed herein takes into account the natural use of hands and objects by means of "virtual" hands, simple auto calibration, and alignment with natural 3-D vision, without the need to "transpose" like most pointing devices. It offers personal adjustments to actual eye positions and actual intra-ocular distance, as well as correct horizontal and vertical disparity, correcting for inclination (for example, a user lying on a couch looking sideways) and changes during viewing and interaction.

By allowing fiduciary marks to be read on each scan line, not just full image scans, and using fiduciary markings that contain full location information, a very fast feedback is provided, typically around 500-1000 times the frame speed currently used by conventional methods with full frame cameras, for example, including but not limited to, Kinect and Sony PS3 EyeToy and 3D Systems. Those typically use cameras that introduce frame, shutter, and/or frame buffer serial delays, creating human-noticeable latencies.

Further, by use of direct first-person view, the trip to screen and back can be computed instantly and accurately, using a 500-1000× faster and near zero latency instantaneous detection of first-person motion detection. The projector and screen observing sensors are at the same vantage point and in a fixed relationship to each eye. Thus the degree of uncertainty is greatly reduced because of not doing successive estimations, each with both an error and one or more frame delay. Additionally, the system adjusts for changed head and eye position; i.e., vantage point detection, making adjustments for both horizontal and vertical disparity, head rotation, head rotation in response to fast moving objects (such as following a ball, dodging or ducking a ball in a motion sport simulation or augmented reality games).

The construction of the device disclosed herein is simplified with integration of only a few parts, low weight, and low power cost, enabling ultra-light, affordable Eye Stalks.

By employing screen corner cube array diversity (pseudo randomness, deliberate avoidance of excessive periodicity) the notion of speckle and interference patterns can be vastly reduced.

Combinatorial efficiency of multiple primaries (four or more) with feedback from the screen, from observed response is different from prior art that typically uses diversity as a deterministic solution, regardless of actual image and artifacts occurring. Further, the observed response can be used to switch between various schemes to find optimum trade off and varying them based on a combination of real time instantaneous observed screen response (e.g., speckle in certain areas, at certain screen scan angles, with certain color mixes, at a certain brightness). Furthermore, each primary can be adjusted for observed intensity versus intended intensity.

Multi layer screens (two and three ways) can combine multiple retro-reflective functions with specular (for virtual panning) and diffusion (for illumination and pointing devices) and absorption (for high contrast suppression of ambient light).

Further, the system can be switched to allow any combination of 2-D and/or 3-D projection within a same field of view and based on vantage point.

In some cases, rather than use a full head-mount system, the parts that need to be placed near the eyes can be implemented as "parasitic" clip-on users glasses frames and can connect to a mobile phone (smart phone) as a computing device.

These modifications and variations do not depart from its broader spirit and scope, and the examples cited here are to be regarded in an illustrative rather than a restrictive sense.

Therefore, comparing to the conventional approaches, the described systems and processes project relative and absolute positions of various users and elements faster and more cost-effectively.

What is claimed as new and desired to be protected by Letters Patent of the United States is:

1. A head mounted display device, comprising:
    an eyewear frame, including:
        one or more light projectors that are configured to scan one or more light patterns, wherein a portion of the one or more light patterns are visible light that is scanned inward from the eyewear frame onto a retina of one or more eyes of a user, and wherein another portion of the one or more light patterns are non-visible light that is scanned outward from the eyewear in an opposite direction of the retina of the one or more eyes; and
        one or more sensors that are configured to detect one or more of a hand gesture or a finger gesture of the user based on one or more reflections of the outwardly scanned non-visible light from one or more of a hand or a finger of the user; and
    a user interface that generates a virtual display of one or more interactions of the user with one or more virtual objects based on detection of the one or more of the hand gesture or the finger gesture.

2. The head mounted device of claim 1, wherein the user interface further comprises:
    providing a three dimensional generation of the virtual display in real time for the user.

3. The head mounted device of claim 1, wherein the user interface further comprises:
    modifying the virtual display based on one or more of a relative position or an occlusion caused by the one or more virtual objects and a line of sight of the user.

4. The head mounted device of claim 1, further comprising:
    one or more retro reflective lenses for the eyewear frame.

5. The head mounted device of claim 1, wherein the detection by the one or more sensors further comprises:
    stereoscopically determining a three dimensional image of the one or more of the hand gesture or the finger gesture of the user.

* * * * *